(12) United States Patent
Bennett

(10) Patent No.: US 10,915,930 B2
(45) Date of Patent: Feb. 9, 2021

(54) SYSTEM FOR SELLING

(71) Applicant: Jethro Bennett, Liverpool (GB)

(72) Inventor: Jethro Bennett, Liverpool (GB)

( * ) Notice: Subject to any disclaimer, the term of this patent is extended or adjusted under 35 U.S.C. 154(b) by 590 days.

(21) Appl. No.: 15/065,844

(22) Filed: Mar. 9, 2016

(65) Prior Publication Data

US 2016/0189120 A1    Jun. 30, 2016

Related U.S. Application Data

(63) Continuation-in-part of application No. 13/906,321, filed on May 30, 2013, now abandoned.

(60) Provisional application No. 61/652,893, filed on May 30, 2012.

(51) Int. Cl.
| | |
|---|---|
| *G06Q 30/02* | (2012.01) |
| *G06Q 20/10* | (2012.01) |
| *G07C 13/00* | (2006.01) |
| *G06K 19/06* | (2006.01) |

(52) U.S. Cl.
CPC ... *G06Q 30/0279* (2013.01); *G06K 19/06009* (2013.01); *G06Q 20/10* (2013.01); *G06Q 30/0207* (2013.01); *G07C 13/00* (2013.01)

(58) Field of Classification Search
None
See application file for complete search history.

(56) References Cited

U.S. PATENT DOCUMENTS

| | | | | |
|---|---|---|---|---|
| 2002/0174063 A1* | 11/2002 | Major | ............... | G06Q 20/10 |
| | | | | 705/39 |
| 2006/0089848 A1* | 4/2006 | Townsend | ........... | G06Q 30/02 |
| | | | | 705/329 |
| 2009/0192873 A1* | 7/2009 | Marble | ............... | G06Q 20/10 |
| | | | | 705/14.1 |
| 2012/0078762 A1* | 3/2012 | Valin | ............... | G06O 30/0239 |
| | | | | 705/30 |
| 2013/0232030 A1* | 9/2013 | Gockeler | ............ | H04L 67/22 |
| | | | | 705/26.8 |
| 2016/0104187 A1* | 4/2016 | Tietzen | ............. | G06Q 30/0233 |
| | | | | 705/14.33 |

\* cited by examiner

*Primary Examiner* — Jan P Mincarelli

(57) ABSTRACT

A method of funding comprises a purchase being made by a user, wherein funding is incurred as a result of the purchase being made by the user, wherein there is a first level of funding, and a second level of funding, wherein: for the first level of funding, funding is dispersed to at least one cause not chosen by the user; and for the second level of funding, funding is dispersed to at least one cause selectable by the user, as a cause for second level funding, at a time prior to, and a location other than, where and when the purchase is made; wherein the second level of funding partially or wholly overrides the first level of funding, a portion or a whole of the first level of funding being directed to the second level of funding, instead of the first level of funding. If, for the first level of funding, there are a plurality of causes not chosen by the user, there may be provided a cause choice for the user, to choose at least one cause out of the plurality of causes, for funding.

24 Claims, 18 Drawing Sheets

SYSTEM FOR SELLING

CROSS REFERENCE TO RELATED APPLICATIONS

The present application is a continuation-in-part of application U.S. Ser. No. 13/906,321, filed May 30, 2013, which in turn claims benefit of priority to US application U.S. 61/652,893, filed May 30, 2012, the priority of both of which is claimed for the present application.

The present invention relates to a system for selling, and, more particularly, in particular embodiments, a system for dispersing via selling.

COPYRIGHT

The present applicant claims copyright of all written and drawn matter in the present application, including unique terms utilised.

Definition of Terms

Term: 'entity' is used to describe any of a person, a group of people, a company or any other element of any type. Term is intended to be broad and in no way limit scope of the invention.

Term: 'seller' may be a vendor, a manufacturer, both, or any other seller.

BACKGROUND

There are two significant problems with political and economic systems in the West, though not limited to the West, and particularly with present democracies.

A first problem is that democracies (and many other political systems) are prone to a rise and fall, peak and trough pattern.

One of the reasons for this is that 'growth' is seen as king in western democracies. If an economy is in 'growth' it is said to be healthy. In reality growth is often a precursor for recession, especially where the growth is 1) Excessive
2) Not based upon firm foundation.

Driven often by greed in some sectors, and by need or thirst to secure votes in other sectors, an economy may be driven toward excessive or high growth.

Typically, in such times of high growth, politicians believe and/or state that they are doing excellently in terms of economic health and prosperity.

In countries such as the United Kingdom, the United States, and others, previous to the economic crash of 2008, politicians believed they were doing positively since economies had been experiencing significant growth trends for some time.

In reality, the economy was set up for recession because the growth was either excessive, or not based on correct and/or firm foundation. Money had been borrowed excessively.

A universal rule is that what goes up must come down—if growth is not based upon sure and real foundation, it is destined not only to fall, but to come crashing down. Such a crash was experienced in the economic crash of 2008.

But this trend of rise and fall; growth and recession has been going on for some time. Most major western democracies have experienced, over the last 20-30 years, at least 2 or 3 rise and fall trends, with growth, followed by recession. No solution has been found.

The poor (or non-wealthy) suffer most during recession; a billion dollar company (or billionaire) may individually lose more money (such as 500 Million dollars, for example), but a billionaire (or corporation) losing 500 Million dollars still leaves the billionaire with 500 Million dollars or more, and little in the way of lifestyle change.

However, if a poor (or non-wealthy) person loses 50% of what they have, they may (or will) struggle to eat correctly, may have to take on more work, and during such economic crises, workers tend to lose their jobs.

Thus it can be seen that the poor pay a heaviest cost during a recession, and that western economies continue to rise and fall at expense, for the most part, to the non-wealthy.

A second problem is that modern western democracies, whilst they pride themselves on being described as democracies, could be argued to be running an outdated version of democracy, and that, furthermore, democracy does not define a modern western culture; Capitalism is at an epicentre of modern western culture.

A democracy is often thought to be defined as a country where voters freely vote for a leader. This is a weak understanding; democracy does not mean voting for the people (although that is a crucial element of a democracy; democracy means power to the people. (That the people rule)

Democracy originated in Athens, Ancient Greece more than 2000 years ago. At the time, it was considered radical, mad, and perhaps even dangerous by other provinces of Greece. But it was not the voting that was considered radical, it was the fact that it was a new system, where, as defined by Aristotle, "the poor rule the rich".

The democracy in Athens was arguably more radical than our democracy today. There was more voting, on a far more regular basis, and regular public meeting where 'the poor' could take part and have their say. To define what a democracy is, Aristotle states:

"Democracy is when those who do not own much property, but are poor, have authority in the system of government", An uneasy fact is that it is very possible that a scholar from time of origin of democracy may not consider what we have in modern western countries as democracy. We have freedom, but not power. The poor do not govern. The poor are subject to decision by others.

The reality is that democracy has become a carrier; a carrier for a powerful economic doctrine, and one that, in some part, has served the economy well: Capitalism.

Capitalism defines our every day far more so that democracy. Commentators may state that it is democracy that gives us our freedom. However, that is wrong. The present weak understanding of democracy is that it is defined, for the most part, as a nation that votes for its leader. Democracy though, is not only about freedom (which is an element of democracy), it is about power, and that the poor (non-wealthy) have the most power because, as one individual, they may not be as influential, fancied, powerful, etc, but as a whole, they are more powerful. This is not simply in terms of ability to vote.

The question must be asked—are the poor powerful? Do the poor have the resources to rule? If not, this is not a democracy. If the poor feel disempowered, democracy is not vibrant. If democracy is vibrant, the poor are empowered more than any other. (This is the opposite of recession, where the poor are disempowered more than any other).

In a sense, it could be said that democracy, at present time, simply facilitates Capitalism.

SUMMARY

The present invention seeks to provide a solution to this, by providing, according to one aspect of the invention: a method of funding, comprising: a purchase being made by a user, wherein funding is incurred as a result of the purchase being made by the user, wherein there is a first level of funding, and a second level of funding, wherein: for the first level of funding, funding is dispersed to at least one cause not chosen by the user; and for the second level of funding, funding is dispersed to at least one cause selectable by the user, as a cause for second level funding, at a time prior to, and a location other than, where and when the purchase is made; wherein the second level of funding partially or wholly overrides the first level of funding, a portion or a whole of the first level of funding being directed to the second level of funding, instead of the first level of funding.

If, for the first level of funding, there are a plurality of causes not chosen by the user, there may be provided a cause choice for the user, to choose at least one cause out of the plurality of causes, for funding.

According to a first aspect of what is claimed, there is provided: a method of funding, comprising: a product being sold to a user, wherein funding is incurred as a result of the product being sold to the user, wherein there is a first level of funding, and a second level of funding, wherein: for the first level of funding, funding is dispersed to at least one cause not chosen by the user; and for the second level of funding, funding is dispersed to at least one cause selectable by the user, as a cause for second level funding, at a time prior to, and a location other than, where and when the product is sold to the user; wherein the second level of funding partially or wholly overrides the first level of funding, a portion or a whole of the first level of funding being directed to the second level of funding, instead of the first level of funding; wherein the method of funding further comprises: at a time prior to, and a location other than, where and when the product is sold to the user, a proximity alert being provided by a portable computer device of the user, to alert the user that they are in proximity to a cause that can be selected, for second level funding; the cause the user has been alerted to, via the proximity alert, being selected by the user, as a cause for second level funding, via the portable computer device; the product being sold to the user; funding being dispersed to the cause the user was alerted to, via the proximity alert, as a result of the second level of funding partially or wholly overriding the first level of funding.

According to another aspect of what is claimed, there is provided: a method of funding, comprising: a product being sold to a user, wherein funding is incurred as a result of the product being sold to the user, wherein there is a first level of funding, and a second level of funding, wherein: for the first level of funding, funding is dispersed to at least one cause not chosen by the user; and for the second level of funding, funding is dispersed to at least one cause selectable by the user, as a cause for second level funding, at a time prior to, and a location other than, where and when the product is sold to the user; wherein the second level of funding partially or wholly overrides the first level of funding, a portion or a whole of the first level of funding being directed to the second level of funding, instead of the first level of funding; the method further comprising: at a time prior to, and a location other than, where and when the product is sold to the user, the user selecting a cause as a cause for second level funding, via a scannable element being scanned, the scannable element being scannable by a portable computer device of the user, to facilitate selecting the cause as a cause for second level funding, the method thus comprising the scannable element being scanned by the portable computer device of the user; the product being sold to the user; funding being dispersed to the cause selected by the user, via the scannable element being scanned, as a result of the second level of funding partially or wholly overriding the first level of funding.

According to another aspect of what is claimed, there is provided: a method of funding, comprising: providing a user account to a user; a future purchase being made by the user, wherein funding is incurred as a result of the future purchase being made by the user, wherein there is a first level of funding, and a second level of funding, wherein: for the first level of funding, funding is dispersed to at least one cause not chosen by the user; and for the second level of funding, funding is dispersed to at least one cause selectable by the user, at a time prior to, and a location other than, where and when the future purchase is made; wherein the second level of funding partially or wholly overrides the first level of funding, a portion or a whole of the first level of funding being directed to the second level of funding, instead of the first level of funding; at a time prior to, and a location other than, where and when the future purchase is made by the user, a proximity alert being provided by a portable computer device of the user, to alert the user that they are in proximity to a cause that can be selected, for second level funding; the cause the user has been alerted to, via the proximity alert, being selected by the user, as a cause for second level funding, via the portable computer device; settings of the user account of the user being altered, to reflect that the cause the user was alerted to has been selected by the user, as a cause for second level funding; the future purchase being made by the user; funding being dispersed to the cause the user was alerted to, via the proximity alert, as a result of the second level of funding partially or wholly overriding the first level of funding.

According to another aspect of what is claimed, there is provided: a method of funding, comprising: providing a user account to a user; a future purchase being made by the user, wherein funding is incurred as a result of the future purchase being made by the user, wherein there is a first level of funding, and a second level of funding, wherein: for the first level of funding, funding is dispersed to at least one cause not chosen by the user; and for the second level of funding, funding is dispersed to at least one cause selectable by the user, at a time prior to, and a location other than, where and when the future purchase is made; wherein the second level of funding partially or wholly overrides the first level of funding, a portion or a whole of the first level of funding being directed to the second level of funding, instead of the first level of funding; at a time prior to, and a location other than, where and when the future purchase is made by the user, the user selecting a cause as a cause for second level funding, via a scannable element being scanned, the scannable element being scannable by a portable computer device of the user, to facilitate selecting the cause as a cause for second level funding, the method thus comprising the scannable element being scanned by the portable computer device of the user; settings of the user account of the user being altered, to reflect that the cause selected by the user, as a cause for second level funding, via the scannable element being scanned, has been selected by the user, as a cause for second level funding; the future purchase being made by the user; funding being dispersed to the cause selected by the user, via the scannable element being scanned, as a result of the second level of funding partially or wholly overriding the first level of funding.

To provide a solution to both problems: the rise and fall, growth and recession trend of the economies, and the problem that democracy no longer defines everyday life, and has, for the most part, become a carrier for Capitalism, there is provided, according to another aspect of the invention, a system for selling, comprising: allowing an item to be purchased by a user; providing a dispersement indicator to indicate to the user that purchase of the item liberates a dispersement amount for dispersement to at least one cause; dispersing the dispersement amount to the at least one cause. Preferably there is provided a dispersement amount indicator for indicating to a user amount that is dispersed when item is purchased.

There may be provided a cause dispersement indicator so that it is indicated to a user what cause(s) is dispersed to when item is purchased.

In a preferred embodiment, there may be provided a user account for the user, to which dispersement details are relayed, so that user may view dispersement amounts, details, and information within their account, which is still more preferably password protected.

The system may allow a payment method to be integrated so that a user can attach, for example, a bank account to user's user account, which facilitates relaying of dispersement information to user account when purchase is made via the, for example, bank account. The system may incorporate its own payment method and/or system.

In a preferred embodiment, for some items, user may be given a choice of dispersement causes. It is feasible dispersement choice may be made after purchase, via user account.

The system may allow an entity to create a cause, and may relay information to the cause regarding dispersement information via a cause account. Bank details or the like may be required from a cause in order to facilitate dispersement to the cause.

The system creates an interactive element to buying whereby a dispersement amount is liberated when an item is purchased.

Sellers may be provided with an account within which they may be allowed to choose cause(s) to associate with items for selling.

According to another aspect of the invention, there is provided a system for selling, comprising: allowing a user to purchase an item; allowing a plurality of causes to be associated with the item, so that when the item is purchased by the user, a dispersement amount is dispersable to at least one of the causes; providing cause choice for the user, wherein cause choice for the user is choosable at least one of: before purchase via a smart device; substantially during purchase; after purchase via a user account.

It is feasible an interlocuting element, such as a scannable card, is required in order to facilitate relaying of dispersement information to user account, or to facilitate dispersement to a cause.

For any aspect of the system, user dispersement settings may be alterable by the user through user account, or by other means.

According to another aspect of the invention, there is provided a system for financing, comprising: allowing an entity to create a cause; allowing the entity to display a dispersement indicator; allowing a user to connect with the cause via smart device; providing a PUSH protocol so that the cause can be pushed by the user; altering settings of the user so that the cause is pushed by the user, settings thus altered to bias user dispersement to the cause. In such an embodiment, an aspect of the invention may be used even when a purchase has not been made. A user may connect with a cause (preferably via a smart device) which may connect via a connecting facilitating element, such as a scannable code. User is provided with option to PUSH a cause, which creates a bias in user settings to disperse to the cause. Future purchases by the user may now incur dispersement to the cause, even if the cause is not associated with purchase of the item. PUSH functionality may be usable in any embodiment of the invention.

Similarly, there may be provided a LINK option, whereby a user, preferably only when a cause has been dispersed to by the user, may allow a LINK to be formed between user and cause. This may facilitate cause in sending information to user, such as updates, for example, when a milestone has been reached due to dispersement amount.

The present invention will now be more particularly described, with reference to the accompanying drawings, by way of example only and in no way limiting the scope of the invention, in which FIG. 1 is a simplified graph (for representational purposes) of a rise and fall, growth and recession trend of a United Kingdom economy over 20 years;

FIG. 7 is a dispersement cause selection screen which may be shown on a computer device and the like;

DETAILED DESCRIPTION

Figure 1:
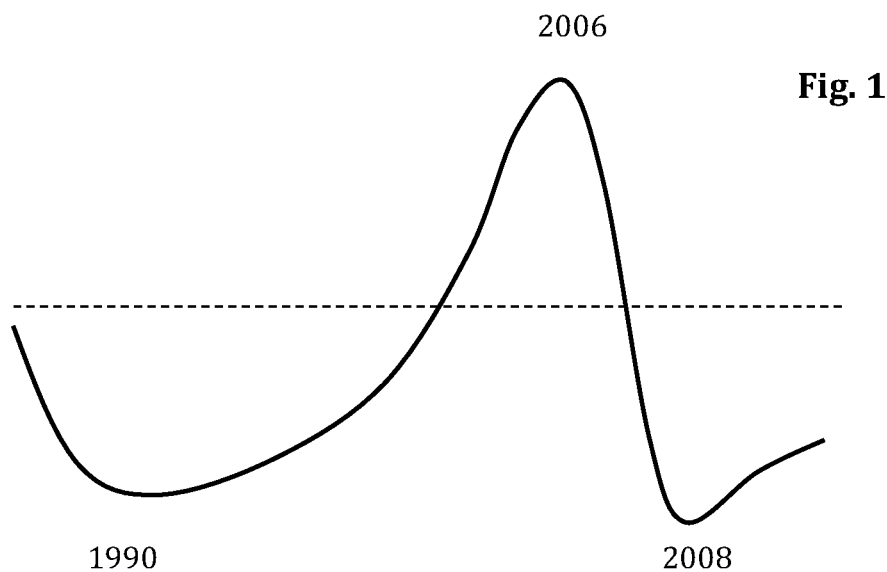

Referring to the drawings, there is shown in FIG. 1 a simplistic peak and trough graph of a British economy, (used for representational purposes), displaying a recession in the early 1990's, an excessive growth period in the mid 2000's period, and a second crash/recession of 2008. Thus a pattern can be seen of a relationship between growth and recession, and more particularly, excessive growth and recession.

Figure 2:
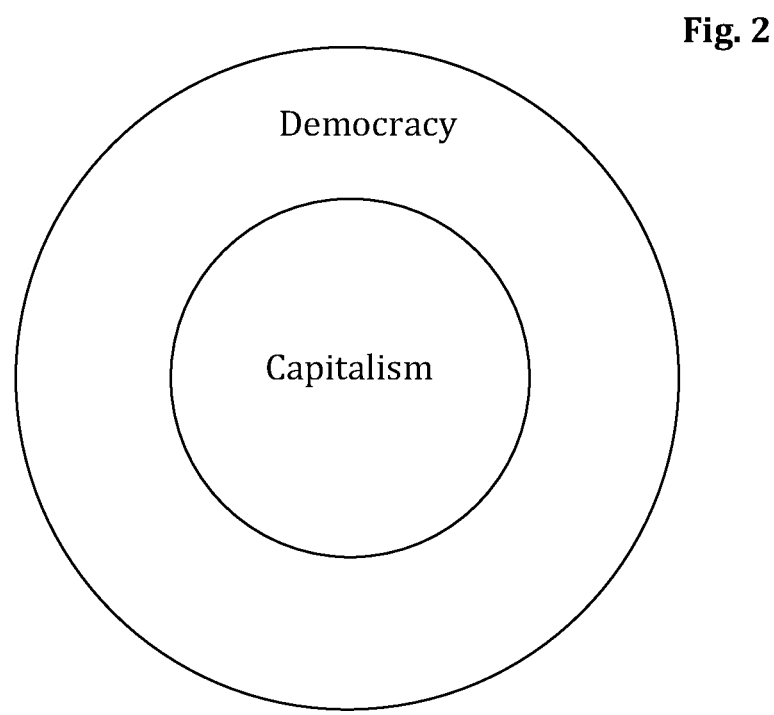
FIG. 2 is a diagram representing democracy as a carrier for Capitalism, showing Capitalism plays a central role.

In FIG. 2, there is shown a circular diagram that represents a socio-political nature of a western society, where, whilst loosely translated as being a democracy, in truth, democracy is a carrier for Capitalism, where Capitalism plays a central role in society, and democracy, whilst nonetheless being a defining factor, is on a periphery. As aforementioned, this causes problems and may be a leading factor in a pattern of rise-and-fall, growth and recession.

Figure 3:
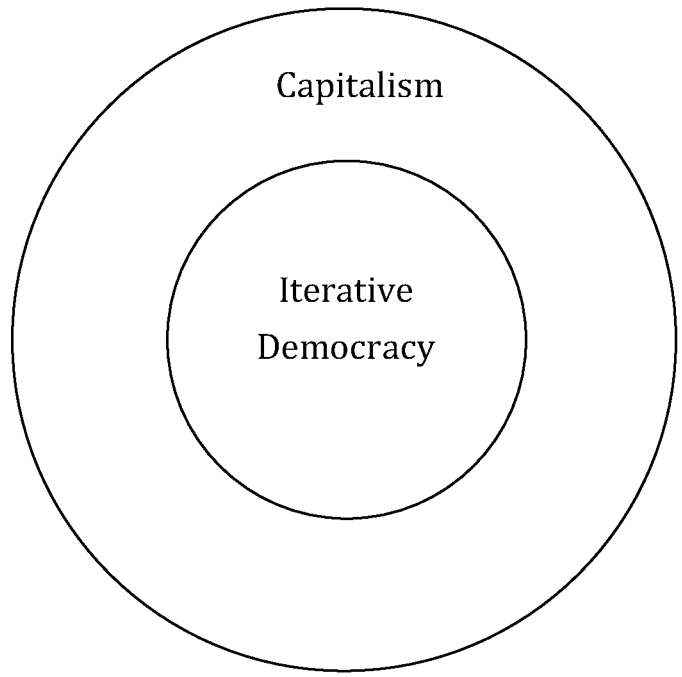
FIG. 3 is a similar diagram where the present invention is in use, where democracy again plays a central role in a life of a citizen; roles are reversed and Capitalism becomes a carrier for democracy.

In FIG. 3, there is shown a similar diagram, where the present invention is utilised. Thus democracy (termed here 'Iterative Democracy' as it is at the epicentre of life, both for the one, and for the all), again plays a central role in a life of a citizen.

Roles are reversed—Capitalism is 'used' or 'harnessed' and becomes a carrier for democracy, rather than democracy being a carrier for Capitalism.

Whilst not replacing 'voting', dispersing of liberated amounts will be shown to be a form of democracy where the poor (non-wealthy) are powerful. This may be more representative of democracy in a Capitalist age, and more empowering.

Because there are greater numbers of the poor, it will be shown, the poor, in a sense, govern.

Due to the unusual (and abstract) nature of the invention, it is thought a best way to demonstrate the invention is with particular examples.

The invention may be particularly of use (although it is not limited to use) with cities of significant, but not excessively large, size. For example, there are cities, such as London, Rome, etc that may have many millions of inhabitants. Whilst this gives tremendous scope for the present invention, in smaller (but still significantly sized) cities, there may be a communal spirit which is less evident in larger communities.

For example, a city such as Liverpool, England, has a population of 440,000. At almost half a million, inhabitants, it is significantly sized (which is useful for the present invention), yet, in part because it is not excessively sized, there is a community spirit within its citizens which may be less evident in some larger cities (or countries for example). Nevertheless, the present invention (which is a system for selling and dispersing), may be used in any community of any size, whether that be a town, city, area, country, group, etc, and may be used in extremely large cities, countries, or on a global level.

Thus there will be shown an example of the invention in use in a city such as Liverpool, England. For the present example, the invention is shown when used for selling an item in a physical location, such as a shop and the like.

'AUTO' Setting

Figure 4:
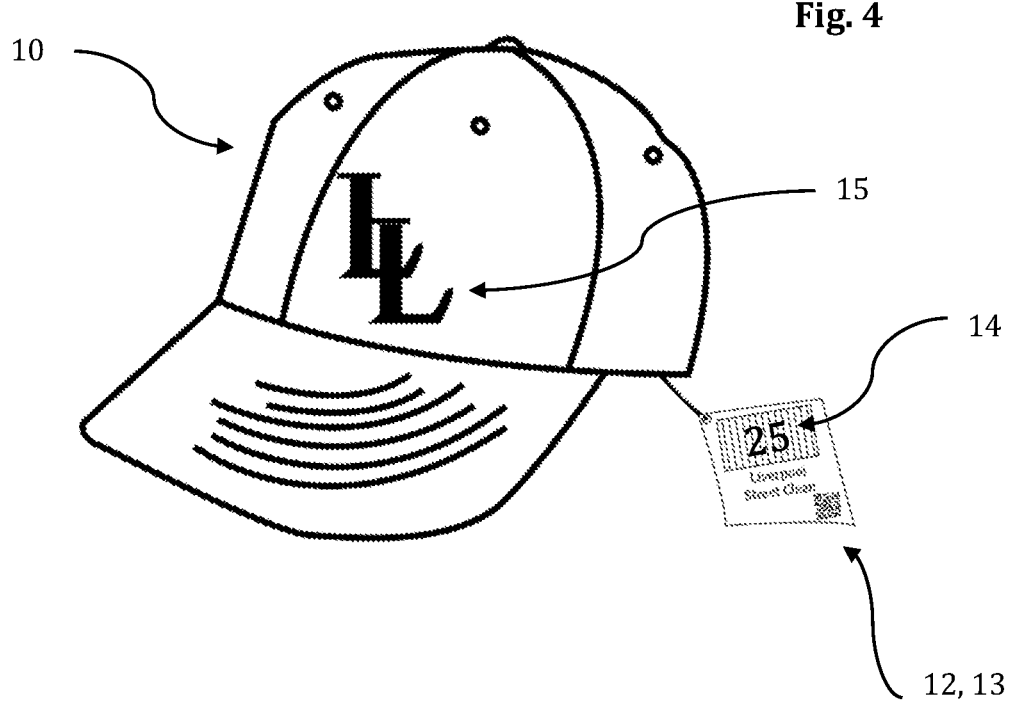
FIG. 4 is an example of an item for sale where there is provided a dispersement indicator and information, indicating to a user that purchasing of the item liberates a dispersement amount.

There is shown in FIG. 4 a purchasable item 10, (which is here a baseball cap but may be any item, product, element for sale, etc) that liberates a dispersement when purchased. There is shown a tag 13 attached to the cap 10, which is a dispersement indicator 12, since it indicates to a user that the item liberates a dispersement when purchased. The dispersement indicator 12 incorporates a dispersement amount indicator 14 that indicates a dispersement amount for when the item is purchased.

A dispersement indicator 12 is an indicator that indicates purchasing of an item liberates an amount for dispersement. A dispersement indicator 12 may simply be an icon, logo, symbol, etc if the symbol, for example, is recognisable to a user and indicates to a user that purchase of an item liberates a dispersement. Thus, the dispersement indicator may, for example, simply be signage outside of a shop, indicating to a user that purchasing of an item(s) inside the shop liberates a dispersement. Preferably the indicator incorporates a dispersement amount indicator 14, thus providing further dispersement information to the user.

An indicator 12 may be provided on the item 10, or, for example, on a rack of a shop, or anywhere that is intended to provide dispersement information to a user about the item 10. (If the item 10 is sold via a website and the like (shown on a computer screen), an indicator 12 may simply be an indicating element appearing anywhere in proximity to the item 10). A dispersement indicator 12 need not be a number and may simply be a symbol. Purpose of the dispersement indicator 12 is to at least denote to a user that purchasing of the item liberates a dispersement. Preferably, the dispersement indicator also indicates to a user amount of dispersement liberated by purchasing the item 10.

It is feasible there are multiple separate indicating elements. (For indication that purchasing of an item liberates a dispersement; for indicating amount liberated by purchasing the item; and feasibly also for indicating cause or causes liberated amount is dispersed to by purchasing). Nevertheless, such multiple indicating elements can be said to be incorporating elements of a multi-partheid dispersement indicator. As stated, it is feasible that the dispersement indicator 12 is simply a symbol, if the symbol is recognisable to a user as indicating that purchasing of the item liberates a dispersement.

There is shown a logo 15 on the item 10. Branding may be of particular importance in a range of purchasable items that incur dispersements about a given community when purchased within a particular community. A brand logo, name, etc, if it becomes recognisable to a user as a brand that uses the present system, may itself be a dispersement indicator 12, since it indicates to a user that purchasing of the item liberates a dispersement.

Figure 5:
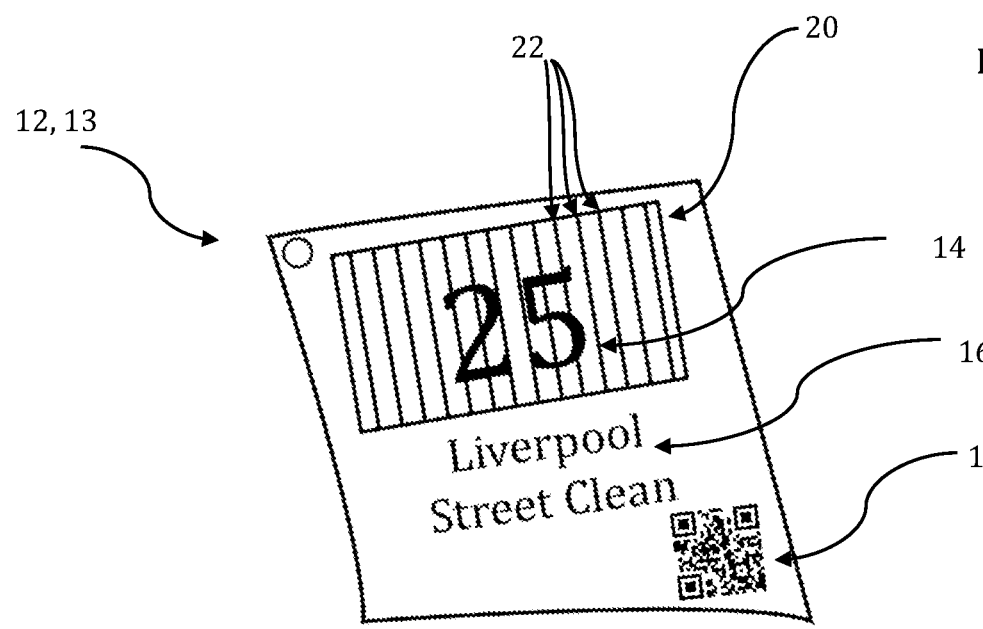
FIG. 5 is a close-up view of the embodiment of a dispersement indicator which incorporates a dispersement amount indicator and a named dispersement cause.

The indicator 12 (which is here a tag 13) can be seen more clearly in FIG. 5, where it is shown in close view. There is clearly shown a dispersement amount indicator 14 on the tag 13, which, in the example (which is also a preferred) embodiment, is a percentage amount that indicates that 25% of all profit generated from sale of the item 10 is liberated for dispersement when the item 10 is sold. (The percentage sign is not shown as it is thought that if use of percentages as a dispersement amount indicator is used widely for the present invention (which is a system for selling), it will be understood by users that a '25' indicates that 25% of profit generated from selling of the item is liberated for dispersement). In a preferred embodiment, the percentage amount indicates to a user that 25% of all profit generated from selling of the baseball cap is liberated for dispersement when the cap is purchased. However, it is feasible amount liberated on sale of the item 10 may be provided by other means, such as a total amount etc. Thus the dispersement amount indicator 14 may be a lump sum, rather than a percentage.

In a preferred embodiment, as shown, item is labelled with the indicator 12. However, if a large amount of, for example, caps are placed on a shelf of a shop for selling, it is feasible there may be provided an indicator for the whole rack, rather than each individual item. Thus the indicator is not limited to being on or attached to the item. Similarly a whole shop may have a standard dispersement figure for all items. Thus if all items sold in a shop liberate 25% of profit for dispersement when purchased, the shop may simply use signage, for example outside of the shop, to indicate such a fact, the items themselves not being tagged with indicators. Thus signage in the said example, even though it is not placed directly on or about the item 10, is a dispersement indicator 12. Anything that indicates dispersement information to a user is a dispersement indicator 12. A dispersement indicator may feasibly be digital, or shown by digital and/or electronic means. In another example, writing on a blackboard may be a dispersement indicator 12 if it indicates dispersement information and/or values to a user.

Thus, for the present example, if the baseball cap sells for £6.99, and the cost price for selling the item (which may include a plurality of factors, such as cost of materials, cost of manufacture, cost of delivery, and may also include further dynamic costs, such as staff wages, rent paid on shop property (if the item is sold at a shop), etc) is £3.03, then the profit generated from selling the item is £3.96.

(It will be obvious to those with skill in the art that if factors such as wages, rent, etc and all costs are calculated as part of a total cost price of the item, there is significant scope for error and/or over-calculation of true cost price. Preferably there is provided an industry-wide standard for how to calculate cost price (or true cost price) of an item in order to deter improper calculating of cost price of an item(s)).

Thus, as stated, if the sales price of the cap is £6.99, and the cost price is £3.03, £3.96 is generated from selling of the cap, and if (as in the present example), 25% of the profit generated from selling the item is liberated when the item is sold, then £0.99 (or 99 pence) is liberated for dispersement when the item is sold.

As shown on the tag in FIG. 5, there is also shown a dispersement cause 16 that the dispersement amount is dispersed to. In the present case, the cause is noted as 'Liverpool Street Clean'. This indicates to a user that the dispersement amount (99 pence) is dispersed to help clean the streets of Liverpool when the baseball cap is purchased.

It is also feasible that the dispersement amount is indicated as a lump sum, such as simply denoting '99p'. However, if pricing of the baseball cap changes, the said amount may prove incorrect. A percentage indicator is preferred. Feasibly both may be provided.

A dispersement indicator 12 may also be provided inside the cap, or incorporated unto the cap in some way (such as sewn in, etc). A dispersement indicator may simply be writing or text since any dispersement information indicated to a user is a dispersement indicator 12.

The dispersement amount indicator 14 (here 25%) is shown as part of an icon 20 (which is not essential). The icon 20 is intended to be recognisable to a user and depicts bars 22 that are imprisoning the dispersement indicator amount 14. This indicates to a user that, in the present example, 25% of the profit of the item is imprisoned, and can be liberated by purchasing the item 10. In alternative embodiments of such an icon 20, there may be shown an imprisoned stick-type character, with the '25' number emblazoned on the character. Such an icon may be important since a number (such as '25'), in and of itself, is not particularly outstanding to a user, since tags on items for sale, or signage in shops, or websites, often include numbers (such as a price tag).

(The icon may bouble up as a scannable element, either for shop keeping, or user (buyer), which may be used as part of a shop price keeping system, or may be used for a user to connect with via smart device to extract further dispersement information about the item).

Thus a recognisable icon 20 to denote liberation amount may be important for recognisability to a user. The tag 13 may include other information such as price of item, definite dispersement amount, etc.

There is also shown on the tag 13 an optional feature of a scannable code or icon 18. It is feasible the code 18 can be scanned by a user, such as, for example, by a smart phone or smart device of a user, which may provide information to the user about dispersement. For example, there may be shown added information, such as an image, message, logo, or video about the cause to which the liberation is dispersed. Intent of the scannable icon 18 is that a user can gain information about any of: the item, dispersement amount, dispersement cause, etc. Such a code/icon 18 may itself be deemed to be (and therefore be) a dispersement indicator 12, as it feasibly may incorporate any or all of the dispersement information as seen on the tag 13, and thus may be used to indicate to a user that purchase of the item liberates a dispersement, especially if the code/icon 18 is recognisable to a user as indicating that purchase of the item liberates a dispersement.

Such technology is well known to those with skill in the art. A QR-code (or the like) may be provided. Thus a user may be directed to, for example, a website with added information about the dispersement cause via a, for example, smart device. Since a video or any other information, such as an image, etc can easily be uploaded to a website (thereby gaining a URL), it would be easy for a video, image, etc to be displayed to a user when they use the scannable code.

It will be obvious to those with skill in the art that present technology allows connection with a smart device in this way without necessarily requiring 'scanning'. Thus term 'scanning' is used in a broad sense to denote that a change is initiated on the smart device, providing further information to a user as aforedescibed, the term 'scannable' in no way limiting a scope of the invention).

A benefit of such codes is that they can be dynamic—they are alterable. Thus if a seller of the item (who may be a brand manufacturer of the item or a vendor, or both), may be allowed to alter dispersement information (such as dispersement amount 14 and/or dispersement cause(s) 16 to disperse to), without the item 10 or indicator 12 having to be re-labelled. This is especially useful if the code 18 is configured to relay user to a webpage and the like.

The term 'scannable' is here used broadly since it is feasible future technologies will not require 'scanning' of a code, and may use proximity or any other method to display information to a user. The term 'scannable' is used broadly and incorporates any means by which information can be provided to the user via a smart device and the like, from the item and/or tag, or from any other means.

When the item is purchased, 25% of the profit is dispersed to the cause 16 of keeping the streets of Liverpool clean.

Preferably both dispersement amount indicator 14 and dispersement cause 16 information is provided to the user.

This is an example of the invention in a basic embodiment, where the system for selling is used in an automated ('AUTO') manner—such that the dispersement is predetermined to go to a pre-determined cause before the purchase is made. (No choice for the user).

In such an embodiment, no account is necessarily needed for the user—they may simply purchase the item 10 as normal and dispersement of the liberated amount may be carried out by the seller (e.g. the shop) or the system (provider) or both. Since there may be two sellers (manufacturer of the item 10 who sells wholesale to the vendor, and the vendor themselves), both may be termed a 'seller'. The vendor may implement (or be provided with) systems that acknowledge sale of the item, and accordingly denote the sale within a system, so that it is acknowledged that the item 10 has been sold and a dispersement amount has been liberated.

Thus it can be seen that, if a whole range of, for example, clothing was provided to a user for sale, cause(s) 16 for dispersement could be pre-determined for each item 10. Similarly dispersement amounts 14 could also be predetermined, so that, for example, whilst 25% of profit from sale of the baseball cap 10 is liberated on purchase, 50%, for example, of profit generated from sale of a shirt 10 may be liberated, and the cause 16 may be different. As will be shown, a seller may feasibly be provided with a seller account and/or interface to choose and decide such dispersement information.

In such a way, a range of clothing dedicated to (and branded for) a community, can be sold to the community, thus resultant in liberated amounts being dispersed about the community. This, in effect, puts political and economic power in the hands of the people. Whilst a rich person may spend more, and therefore may feasibly, individually, liberate more dispersements, the poor (or non-wealthy) are more numerous by far. Therefore the non-wealthy have more power with the present system since, in number, the amount liberated for dispersement by the non-wealthy will far outweigh the amount liberated for dispersement by the rich.

Since, even in a recession, vast amounts of money are spent on clothing, an interesting effect of the system (and such a, for example, clothing range), is that it may substantially (or wholly) immunise a community from recession, since it ensures vast amounts of dispersements are dispersed about a community.

Thus even in times which would today be called recession, many millions of items (or far more) of clothing may be sold and purchased each year in such a community. Thus vast amounts of dispersements may be liberated, which may be used to invigorate the community, finance new projects, buildings, etc.

Whilst the system may be suited to selling clothing items, it is in no way limited and may be used for selling any item, product, etc.

Usually (without the present invention), profit from a sale of a, for example, item of clothing, goes to the seller or to the seller and brand manufacturer of the clothing.

With the present invention, much of the profit is dispersed back into the community.

The system also has an ability to evolve—as it is seen what is required to help, create, grow the community, liberated amounts may be dispersed into according areas. The system may also intelligently disperse in this way, recognising areas where dispersement is required and dispersing to such areas accordingly.

Furthermore, in a case of a disaster, or problem that hits a community—for example a cyclone, typhoon, earthquake, etc, the system can easily be altered so that all, or a part of, dispersements can be dispersed to a cause (or bank account) for help with the disaster, problem etc. (This may use similar or the same protocol(s) as a 'PUSH' protocol for the system which will be demonstrated proceedingly). As will be shown, either the seller, and/or the provider may be able to alter settings for the system in such a way, or to alter the system to allow users to alter settings to 'PUSH' liberation amounts to a cause.

The system is not limited for use with a clothing range, and may feasibly be used with an array of items for sale, such as cutlery, mugs; any retails items under the Sun. It may be used for selling of non-physical items, such as digital programs. Anything for sale is deemed to be a 'product'. The present invention may be used to sell any product. Nevertheless, the present invention (system for selling) may be particularly useful for use with selling clothing. In such a situation, a noticeable brand may be set up for recognition by a community.

It is feasible users in one community may be able to buy items that incur a dispersement to a different community, group, and/or area. (It is also feasible that such action may be limited or blocked either partially, or wholly by the present system).

In such an example as shown in FIG. 4 and FIG. 5, where a baseball cap 10 is sold and a 25% of profit generated from selling the item 10 is liberated and dispersed to a cause 16 (street cleaning), a system is required for dispersing the liberated amount to the cause(s) 16. In a basic embodiment, this can be achieved by the cause 16 having a bank account, which bank account details are received by and incorporated into the system, so that liberated amount(s) can be dispersed into bank account of the cause 16. This may be done with substantially immediate effect, or may be done, for example, at the end of a month or period of time.

A card (or the like) may be required by a user to allow dispersement and/or to relay dispersement information to a user account and/or cause and/or seller account. Such a card (or the like) may be termed an interlocuting element, since it is facilitates flow of information between a purchase (or the purchase vendor system) and the present system for selling. Interlocution means communication between.

If there is integration with a particular bank account, for example or a method of payment is used that is incorporated as part of the system, then an interlocuting element may not be required. If this is not the case, if purchases of items 10 that liberate dispersement are made at a vendor, it is feasible, once items have been scanned and processed through a till, a card (interlocuting element) or the like may be required to be scanned in order for dispersement information to be transferred from vendor to the present system. A card is given by way of example and any such interlocuting element may be used, An interlocuting element may not require scanning for use. An interlocuting element may be scanned (and the like) before, after or during purchase. It may facilitate dispersement and/or relaying of dispersement information.

In the example as set forth, the provider of the system may also be the seller, so that the proprietor of the present system (and technology) for selling also makes, designs, manufactures and sells the item. However, it is also feasible, for another example, that the provider provides the system for use by a seller. The seller may be a brand manufacturer of the item, or may be a vendor, or may be both, (or any other seller).

Thus there may be four party elements involved in transaction process using the present system: Provider (provider/proprietor of the system for selling itself), Seller (who may be a brand manufacturer, or vendor, or both, or any other seller), User (who purchases an item 10), and Cause (to whom a liberated amount is dispersed when an item 10 sold using the system is sold). This will be described at greater length shortly, with reference to account creation.

In a case where the provider is not the seller, the seller may either be granted use of the system for selling, or may be provided with an account within the system, which may be set up with technology (such as, for example, but not limited to, software) to facilitate use of the system by the seller, which may, for example, facilitate setting up dispersement amounts for items, apportioning causes for items, linking bank account details of the causes to the items, etc, thus facilitating use of the system.

It is feasible fees may be incurred for use of the system, payable to provider.

Preferably, as will be seen, there is provided an account for a user, so that information of dispersements may be viewable by the user. This may require further information from the user be provided to the system, which will be shown.

Thus it can be seen, in the shown example, that the system can be used on an AUTO setting, where causes that liberated amounts are dispersed to is automatic, such that there is no choice for the user as to where the liberated amounts are dispersed to. This may be a most simple way to use the present invention.

It can also be seen (or understood) that in a community of 440, 000, a vast amount of dispersements can be made. This is a form of democracy since it puts power in the hands of the people. Furthermore, it satisfies foundational definitions of democracy as, because the 'poor' of any community are more numerous than the rich, it gives power to the poor more than any other. In reality, the system does not differentiate between rich and poor, but due to numeration alone, it gives more power to the poor.

Still furthermore, the present invention reverses the roles of democracy and Capitalism, as shown in FIG. 2 and FIG. 3; whereas democracy, in western democracies and many others, has become a carrier for Capitalism, where Capitalism is at the centre of daily life and of society, democracy in many ways facilitating Capitalism (FIG. 2), now, with the present invention, Capitalism has in fact become a carrier for democracy, where the buying of things has taken on another dimension, empowering the people, and giving the people power to create and affect society. As stated, democracy has been thought by some to mean 'voting' for the people. This is a weak translation. Democracy means power for the people. As will be shown with reference to the invention in an 'OPEN' setting, the system may be configured so that there are many choices and options for the user. Such 'choices' (choosing), may on some level be deemed to be a type of voting.

'OPEN' Setting

The invention will now be shown and described with reference to an embodiment where it is not set to AUTO, but is on an 'OPEN' setting, where there is provided choices of cause 16 for dispersement for the user.

Figure 6:
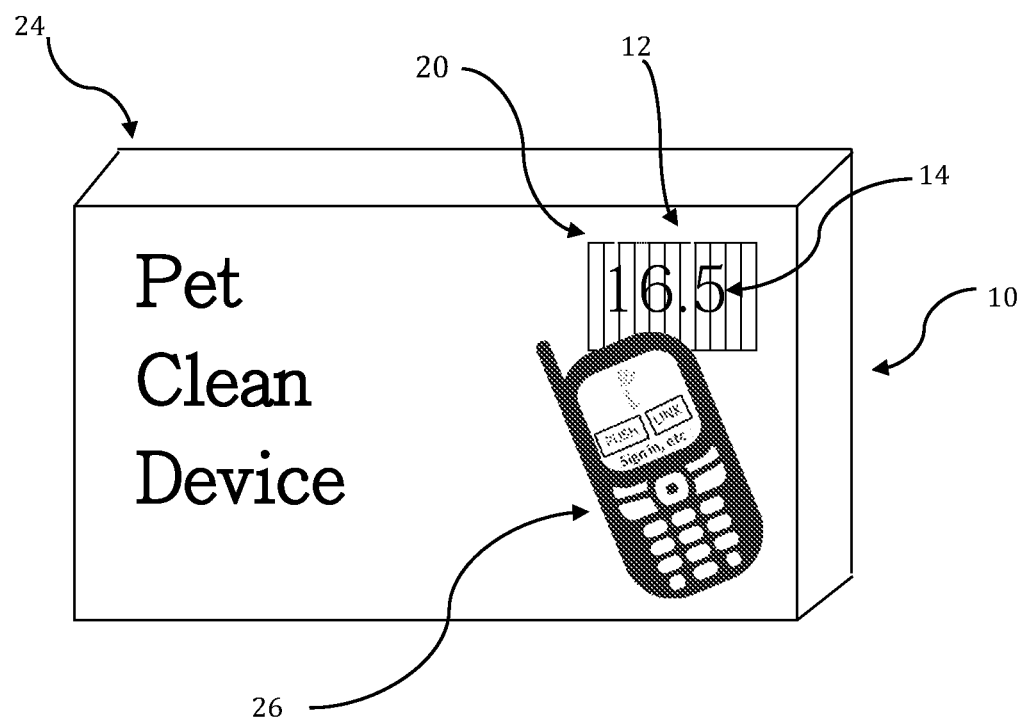
FIG. 6 is an example of a different item for sale where dispersement information and/or connection can be accessed by a user via a smart device.

There is shown in FIG. 6 a box 24 which has an item 10 inside for sale. This item may, for example, be sold at a shop. As will be shown, it may also be sold via a website, or any other sales venue, virtual or real. For the sake of the present example, the item 10 is sold at a shop. The item 10 inside the box 24 is a pet cleaning device 10 (although it could be any item). The system may have particular benefits when used for selling an item(s) particular to a community or group that are biased towards a cause(s).

For example, users who own a dog (and thus buy dog products) tend to be extremely passionate about dogs (and animals). Users would like nothing better than to liberate dispersements to causes associated with helping dogs. Such causes may, for example, provide health care for dogs, may operate on dogs who have eye diseases, or any other ailment, may finance better homing for homeless dogs, or any other cause. As will be obvious, there may be hundreds or thousands of worthwhile causes for helping dogs. Dog owners tend to be very passionate about such issues. In such a situation, users may want more active involvement with the cause(s) dispersed to, and certainly may want choice as to where liberated amounts are dispersed to. They may, for example, want to stay in touch with the cause.

There is shown in FIG. 6 a dispersement indicator 12 on the box 24 to indicate how much profit from selling of the item 10 is liberated for dispersement. In the present example, the dispersement indicator 12 may simply be a print on the box 24. 16.5% dispersement amount indicator 14 is shown. Thus, upon purchase, 16.5% of profit generated from sale of the item 10 is liberated for dispersement—a significant amount if the item 10, for example, retails for $89.99.

If the item 10 is sold by a vendor, for example at a shop, which vendor is not manufacturer of the item, the dispersement amount 14 may be indicative of profit generated by the manufacturer, rather than the vendor. Thus if the manufacturer sells the item 10 at wholesale to the vendor at $30 per unit, and the unit is sold for $89.99 by the vendor, the item 10 may, for example, have had a total cost price per unit for the manufacturer of $19, in which case $11 profit is generated from each unit sale for the manufacturer. (This is in theory since in reality the unit is most likely sold in bulk to the vendor if the vendor is of significant size, therefore manufacturer has already received their profit when an order by the vendor was completed).

Thus, if the dispersement indicating element 14 is 16.5%, $1.82 is liberated. It is feasible vendor may also be configured so that a portion of profit generated from sale of the item by vendor is liberated for dispersement. However, price-point is a key concern for vendors, who, rather than offer dispersements, may want to keep prices as low as possible. Thus it is feasible that the dispersement indicating element 14 (which is also a dispersement amount 14) may be indicative only of a dispersement figure with regards to profit generated by the manufacturer, and not the vendor. However, it is feasible figure represents dispersement by both manufacturer, and vendor, or even that the dispersement indicating element 14 indicates dispersement amount with regard to profit generated from selling of the item by the vendor alone. It will be obvious that some vendors also sell their own brand items. Thus they are brand manufacturer as well as vendor of such items. Such items may be sold using the present invention, whereby a dispersement amount is liberated when the item is sold.

Provider may be manufacturer and vendor as well as provider simultaneously, manufacturing an item 10, selling the item 10, and providing and utilising the system for selling.

In the shown example, there is shown a smart device 26 held over the dispersement indicator 12 icon. It is feasible the dispersement indicator 12 is itself scannable (and the like) to provide information to a user via the, or any, smart device. (Smart devices may not be limited to smart phones, tablets, etc in the future, and may include, for example, computer goggles). Information may also be provided to the user via the smart device simply from proximity to the item 10 and/or code/icon, rather than a scannable icon.

When a smart device is used in such a way to gain information about an item 10, for the sake of the present application, it is termed 'connection', or 'connecting'.

There are shown elements on the phone reading 'LINK', 'PUSH' and 'sign in'. These will be discussed proceedingly.

As aforementioned, it is feasible media and/or any information is shown to the user, such as a video, via the smart device 26. (This is 'connecting'). For the present example, it will be presumed that there is provided a choice of causes that the liberated amount may be dispersed to when the item 10 is purchased by a user. (Not shown in FIG. 6)

Thus information relating to causes may feasibly be relayed to the user via a smart device 26. Cause(s), as aforementioned and shown, may also be indicated to a user via a tag, sticker, signage and the like, any of which is a dispersement indicator 12.

It is feasible that choice of cause for dispersement may be choosable by the user prior to buying the item (perhaps via the smart device 26). This may require integration with an account for the user. Thus if a choice is made for cause to disperse to, the choice may be stored on the user account, which account may be configured to recognise when the item 10 has been purchased by the user, and then accordingly disperse the liberated amount to the chosen cause. This may require significant computer and information database actions and/or storage by the system, implemented by computer.

In future retail systems, it may be feasible that the item can itself be bought simply via a smart device by the user—at the present moment, and over the last several years, more computerised tills are being utilised by large vendors, whereby an item is bought by a customer and scanned through a computer, rather than a manned till, thus not requiring a member of staff. In future settings, it is feasible payment may be makeable by a customer directly via a portable smart device (such as a smartphone 26) in the shop itself, and that there are provided systems by the vendor so that if a customer leaves only with item(s) they have purchased via the, for example, smartphone 26, no alarm is triggered and they may freely leave the shop with their item(s), and so that if they have any items that have not been paid for, an alarm is triggered. Such a system may incorporate an alarm gateway (similar to an airport scanner), whereby a user walks through a gateway (or terminal) that includes technology for checking if items have been paid for. This may require interaction with local computer systems and technology to be incorporated, so that substantially immediately when a purchase is made by a customer via a smart device, the item is recognised as sold by the vendor and alarm system, the system configured to thus not trigger an alarm. Use of such a system may necessitate use of a camera to film customers leaving the gateway and/or sales venue, and a doorman.

Thus it can be seen that, feasibly, choice of cause for dispersement may be made by a user before or during purchase of the item 10.

Returning to a more traditional method of purchasing the item 10 as shown in FIG. 6, purchase of the item 10 may be made via a computer till (which are used in many supermarkets and the like), or via a manned till, where a staff member uses a till to process the payment.

Figure 7:
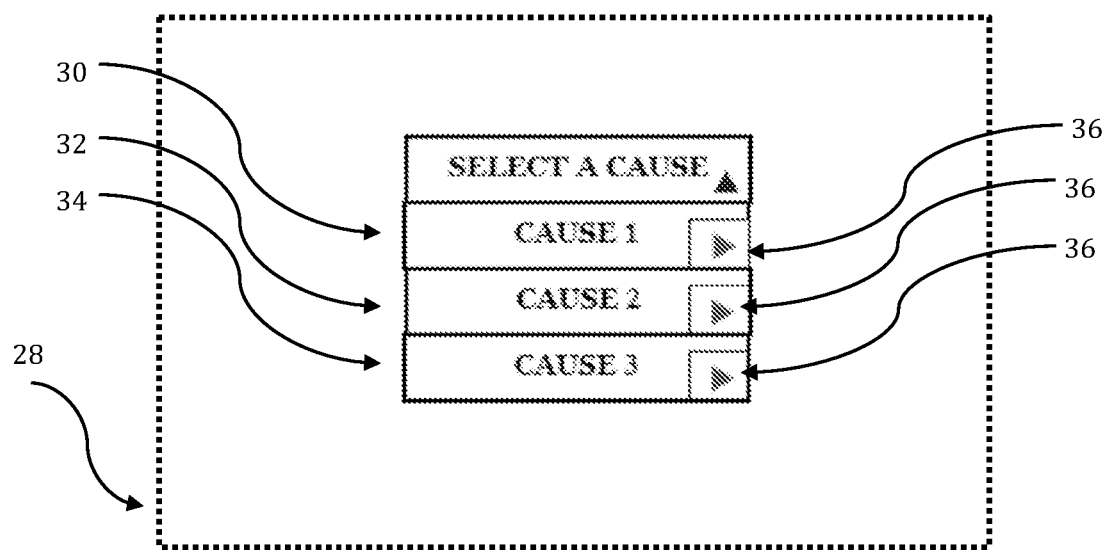

If the sale is processed via a non-manned computer till, the computer may provide a screen for the user so that choice can be made by the user as to which cause to disperse a liberated amount to. There is shown in FIG. 7 a basic embodiment of a choice screen, which may be provided on a computer till for a user (or feasibly on a PC, smart device, etc dependent on what platform user is purchasing the item 10 from). For the sake of the example, names of causes are shown as 'Cause 1' 30, 'Cause 2' 32, and 'Cause 3' 34. In action, the causes have names, such as 'dog care home', 'new veterinary surgery', 'poaching lookout post'.

If the computer till is touch-screen, choice may be made by the user by touching the screen (and the relevant choice). A similar such choice screen may also be provided if purchase of the item is made online, in which case choice may be made by a user via point and click using a cursor, mouse, etc and the like. If such a choice screen is provided on a computer till, the computer will require information as to which causes can be dispersed to by buying of the item. This may be done manually so that the choices are inputted into the computer system, or it may be done automatedly, via a computer system. Such a system may be achieved in many ways that will be obvious to those with skill in the art. Such information may be included on, or triggered by scanning of the sales scan code of the item. Typically, in order to process sale of an item at a shop, supermarket, etc, an item is scanned, which scanning is acknowledged by a computer system which either holds information, or is delivered information about the item, such as name of the item, price etc. This information is later used to generate a receipt, total cost, and may also be used for accountancy and stock reasons by the vendor.

In such like manner, information pertaining to dispersement cause(s) for an item may be either delivered to the system via scanning of the item 10, or may be held on the system and triggered by scanning of the item, scanning of scannable element, for example, used in a similar way to regular purchasing to extract dispersement information.

It is feasible that computer systems for all locations that sell the item are provided with information that pre-configures their computer systems to provide correct cause choices for the user and/or correct and global dispersement information. This information may be drawn from the present invention system, the system incorporating a data storage facility for dispersement information and any other information.

The item having been recognised as an item that incurs liberation of a dispersement amount when purchased and has a cause choice for the user, choice is provided to the user. If payment is made via unmanned computer till at, for example, a shop, or on a computer at home (for example whilst buying via the internet), there is preferably provided a choice screen as shown in FIG. 7. (Dotted line 28 represents a computer monitor screen, terminal screen and the like), although such a choice screen may also be provided on a PC, smart device or any other platform purchase of item 10 is made upon.

If payment is made by card at a manned till, it is feasible that cause choice can be made by the user via credit card reader port/terminal (which is a port for processing a credit card transaction, into which a credit card can be inserted and which tends to have screen relaying commands to a user such as 'key in PIN number'). Thus a message may be provided on the card reader port/terminal requesting user to choose a cause, which may be choosable by pressing of relevant buttons, etc, similar to screen as shown in FIG. 7, or may be touch-screen.

It is feasible cause choice etc is not provided at point of sale, and that dispersement information is relayed to a user account, which may, or may not, require scanning (and the like) of an interlocuting element, such as, for example, a card.

If there is media associated with the causes (such as a video by the cause to explain merits of dispersing to their cause), there may be provided clickable or touch clickable links 36 for a user to view a, for example, video. This may not be conducive to quick selling at a sales venue such as a shop. Therefore such an option may only be afforded for selling via the internet when the purchase is made online.

If payment is made at a manned till, it is feasible an added step is required, such as till staff member asking user which cause they would like to choose, or till staff member asking user to choose cause via a computerised terminal, (which may be a (modified) card reader port/terminal, or may be a different unit altogether).

Thus it can be seen that choice of cause can be made by the user at time of purchase.

However, it is also feasible that dispersement cause may be choosable by a user after purchase has been made.

Figure 8:
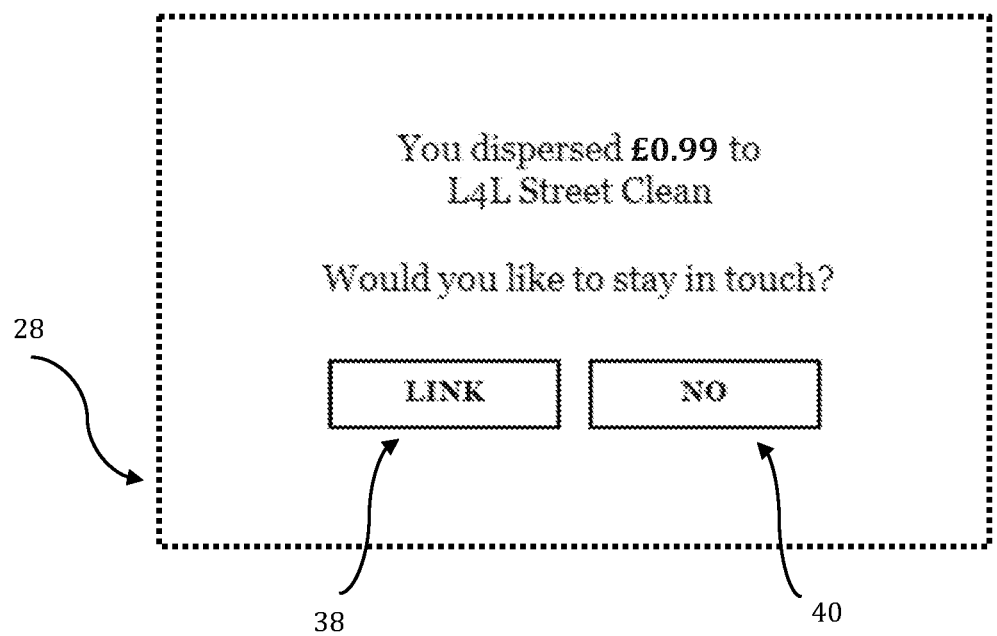
FIG. 8 is a LINK screen, which provides facility for user to LINK with a cause.

There may be provided a 'LINK' protocol. As shown in FIG. 8, user may be provided with an option to 'LINK' with cause they have liberated a dispersement to. This may be provided via a screen (on a PC monitor screen, smart device screen, computerised till, terminal, or the like). For this and other reasons, it may be desirable to provide a user using the present system to buy an item an account. Preferably the LINK is set up so that the user is contactable by the cause, so that, for example, an email may be sent to the user by the cause when a limestone has been reached.

Thus by clicking and/or choosing 'LINK' option 38, user and cause are linked, and by choosing 'NO' option 40, user and cause are not linked.

User Account

In order to facilitate this (and for other reasons), it may be desirable if there is provided an account for the user. An account may be useful for several reasons.

If an account can be created by the user via the selling system (or a (computer) system integrated with the system for selling), information of the user can be stored by the system. Such information may include name, bank details, etc.

The account may include (or be used in integration with), a data storage facility so that data regarding dispersement of funds is viewable by a user and/or provider, and/or stored.

A payment system may be integrated into the system, so that, for example, a user can integrate a credit card(s) with the system, whereby when they make a purchase for an item (such as the item as shown in FIG. 7) with the credit card, the system acknowledging that an item that either has incurred, or may incur, a dispersement, has been purchased, and relays that information onto the account of the user.

One benefit of providing users with an account is that cause choices may be made after a purchase has been made. Thus, for example, a user may log in to their account, where information regarding dispersements may be viewable.

Figure 9:
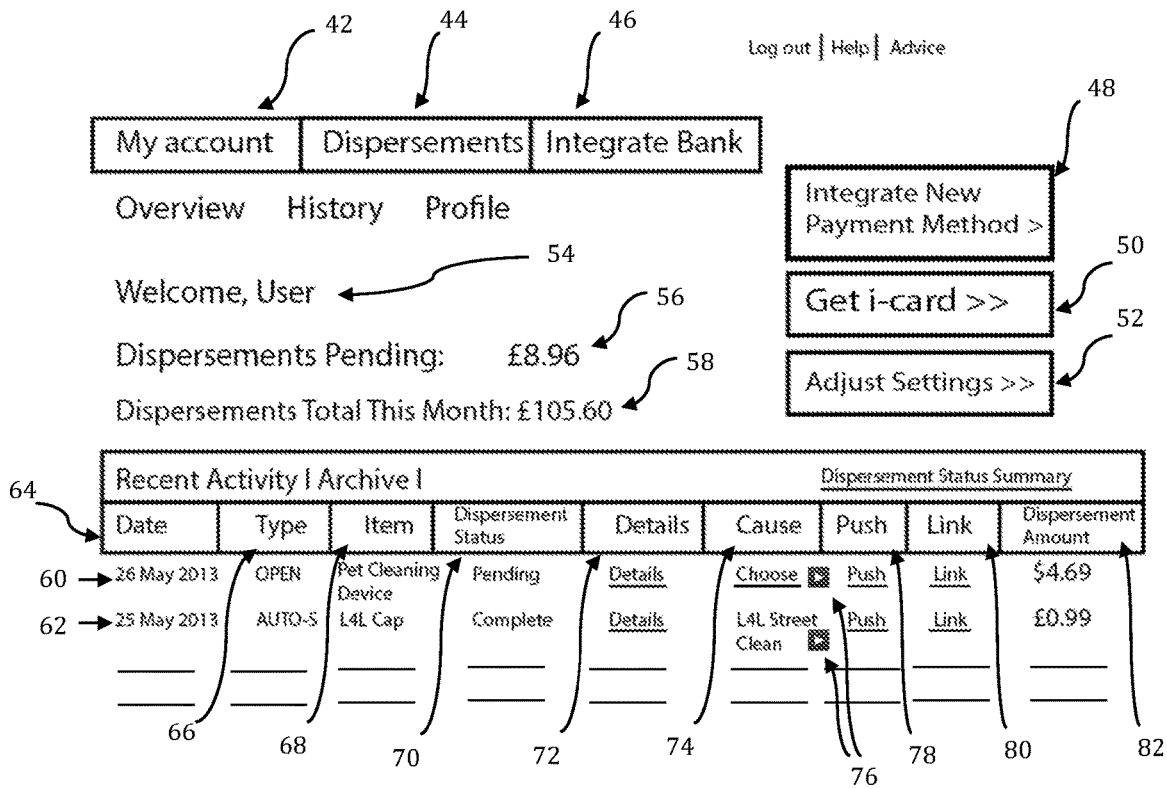
FIG. 9 shows an embodiment of a user account homepage where dispersement information may be provided to the user.

There is shown in FIG. 9 an example embodiment of a webpage (and the like) viewable by a user when they have signed in to their account.

Preferably, similar to Paypal-type systems, user may use an email address as their main username. This has benefits as sending information to the user by email may be desired and/or required. Preferably such an account is password protected so details and information of the user are protected.

There is shown in FIG. 9 a plurality of clickable buttons and information on the page. Basic information is stored on the system, and displayed for the user.

As is standard for such interfaces, there may be provided clickable headers 42, 44, 46 to direct to useful and/or important pages within a user's account. There may be provided a My Account page header 42 (the 'My Account' page presently viewable as FIG. 9), a Dispersements page header 44, where information pertaining to dispersements made or pending by the user are viewable, and an 'Integrate Bank' header 46, whereby a user can integrate a credit card, bank account, (and feasibly Paypal account and the like), etc with the system. This is a possible means by which integration can occur whereby a purchase made via credit card, bank account, etc of an item that incurs liberation of a dispersement of a user is recognised by the present system and information pertaining to dispersement is received by the system.

There is also shown an 'Integrate New Payment Method' button 48, which can be chosen by a user to integrate a new bank account with the system or a new method of payment so that liberated dispersements are recognised by the system and the information relayed to user account.

There is shown a 'Get i-card' link 50. Feasibly the system incorporates its own payment system, or has a system whereby a card or the like is provided to a user which can be scanned and the like when purchases are made at a vendor. Such a card may intelligently verifiy user so that dispersement information is recognised and received by the system, which information may be viewable by a user on their account.

Thus, for example, if the pet cleaning device is purchased by a user at a vendor by credit card, cash, or any other method, it may be necessary for an i-card of the user to be swiped (and the like) so that dispersement information is stored and recognised by the system. Thus i-card acts as interlocutor between purchase and user account. This may be necessary dependent on system infrastructure for allowing a user to make post-purchase cause choices. In such an i-card configuration, system of vendor may recognise purchases that incur a liberation, but may require scanning (and the like) of a user card (and the like) in order for dispersement information to be relayed onto user account.

Thus it is feasible that user may be provided with a relaying element (such as a card but not limited to a card), which can be scanned (and the like) for relaying information to account of the user. Such information may also be stored on the system and/or user account.

It is also feasible the 'i-card' is a payment system all of its own, and that the system incorporates its own payment system. Thus the 'i-card' may function similarly to a credit card.

There are other clickable links: 'Overview', 'History', 'Profile', which are not unusual for such accounts.

There is provided an 'Adjust Settings' tab 52, which may take user to settings of user's account and allow user to alter settings of the account. This may alter purchasing and dispersements experience and may limit (AUTO) or expand (OPEN) choices for the user when using the system. This will be discussed in greater detail with reference to Account Settings.

There is provided a welcome message 54 for a user. (Preferably the word 'user' is replaced with name of the user).

There is provided 'Dispersements Pending' information 56. This indicates to a user a total amount that has been liberated, but not yet been dispersed to a cause(s) by the user, as a result of purchases made where a cause has not yet been chosen by the user.

There is shown 'Dispersements Total This Month' 58, where total of all liberations and/or dispersements made in the month are shown. (This may also appear as (and/or be) 'Liberations Total This Month', a total thus being shown of total amount liberated via purchases for a month).

There is shown details of two purchases 60, 62 that incurred a liberation amount, and various details and options which will now be described. Details of liberations resultant from purchase of the Pet Cleaning Device 60 are shown in substantially linear fashion across a page.

Date 64 of purchase is shown.

Type 66 of purchase is shown as 'OPEN'. This denotes selling setting of the item 10 and that cause choice is, or was, provided to the user.

Item 68 name is provided, which in this case is 'Pet Cleaning Device'.

Dispersement status 70 is indicated, which, in the present example, is 'Pending'. This indicates that an amount has been liberated by the purchase, but that dispersement has not yet occurred. This may be because a cause has not yet been chosen by the user.

A 'Details' 72 link is provided. Underlining denotes that the word 'Details' is clickable by a user so that more details about the purchase and/or dispersement can be viewed by a user.

Cause 74 column is provided, where cause dispersed to is indicated. In the present example, user is indicated to 'Choose', indicating that a cause has not yet been chosen to disperse the amount to. A play icon 76 is provided by the clickable 'Choose' link, indicating to a user that media is provided, which media may be a video or videos of potential cause(s) that the liberated amount can be dispersed to. Thus the 'Choose' (underlined) link can be clicked by a user, media can be viewed, and a choice can be made by the user so that the dispersement amount is dispersed.

There is provided a 'PUSH' 78 column and link for pushing a cause. Pushing a cause alters settings on a user account to bias dispersements toward a cause. There are multiple uses for such a protocol; if a cause is particularly important for a user, they may want to bias their account settings to disperse liberated amounts from purchases to the cause. 'PUSH' may be a local setting, or a global setting. For example, if user chooses a cause related to item Pet Cleaning Device, which cause is a home for injured dogs, with, for example, a mission to complete to improve habitation of dogs in the home, user may want to 'PUSH' the cause to help cause fulfil its mission.

Thus, if a cause it chosen, or viewed, there may be provided a 'PUSH' option, button, etc for a user. If the cause is pushed by the user, amounts may be dispersed to the cause even for purchases where the cause is not chosen for dispersement, and even for purchases where the cause is not a choice for dispersement.

As aforementioned, 'PUSH' may alter user settings locally, or globally. For example, a user may PUSH the said example cause locally, which alters settings so that, for example, all dispersement items purchased by the user in the similar or same field of dogs and dog care disperse a portion of the liberated amount to the pushed cause. Thus the cause is pushed further in its goal.

In the given example, if a cause 'dog care home' is pushed, if an item 10 is purchased by the user at any time whilst settings are set to push the cause, even if the cause is not a choice of dispersement for an item, a portion of the liberated amount from purchasing the item may be made available for dispersement to the cause, or may be substantially immediately dispersed to the cause. It is feasible a cause can be pushed wholly, so that all liberated amounts are dispersed to the pushed cause. However, preferably a portion of dispersements, (rather than whole dispersements), are dispersed to the pushed cause. If the cause is pushed locally, then only items purchased that liberate dispersements in the or related fields to the cause may incur a pushed dispersement to the cause. If the cause is pushed globally, then it is feasible all items purchased that liberate dispersements in any field (including fields wholly unrelated to dog care, animal care, etc) incur a pushed dispersement to the cause.

Thus there is provided significant means for user to establish and alter settings for their account and experience.

Preferably Push protocol is carried out intelligently by the system via programming that is globally available to users. Fairly significant and complex programming may be required in order to achieve such setting alteration.

It is feasible multiple causes can be pushed.

There is shown a LINK 80 column and link. Once a cause is chosen for dispersement, LINK protocol allows cause to have access to user (preferably via email) so that news, information, updates, etc may be provided by the cause to the user. There may be provided regulations by the provider to causes, so that, for example, a cause may not repeatedly message users for added dispersement. It is feasible added financing by the user for the cause may be allowed. Preferably the system has integration with at least one, and feasibly many payment methods and systems, such as credit card, Paypal, etc. It is also feasible an in-house payment system is incorporated into the system, which may also be usable for the user in any other purchase of any item, not limited to items that liberate a dispersement when purchased.

Preferably LINK protocol is only provided to a user once they have dispersed to a cause so that LINK can only be established to causes user has dispersed to. It is feasible any cause can be linked to.

Preferably login to user account is achieved by the user by entering an email address and a password, user account thus password protected. Using email address for login has several advantages; it is easy to remember for the user; the email address can be used by provider of the system to contact user; and email address of the user can be used to set up LINK to a cause. Thus preferably an email address is provided by the user in opening an account. User may provide a separate username, and may create a password.

There is shown a dispersement amount 82 column to show liberated amount from purchase of the listed item that can be dispersed. For the present example, $4.69 has been liberated for dispersement by purchasing the pet cleaning device. User is now free to use the system to disperse the amount to a cause.

There is shown a second purchased item 62 (the baseball cap as shown in exemplary fashion in FIG. 4), that has incurred a dispersement. Date is shown of purchase. Type column reveals purchase is categorised as 'AUTO-s'. This is shorthand for 'AUTO-SYSTEM' or 'AUTO-SELLER', which indicates that the cause that the liberated amount was dispersed to was not chosen by the user and was AUTO-dispersed to a pre-determined cause set by the seller (or feasibly the provider). The type of purchase is indicated as 'AUTO-S' and not simply 'AUTO' because 'AUTO' setting can also be set by user to decline from making decisions as to where liberated amounts are dispersed. Shorthand for this is 'AUTO-U', which is shorthand for 'AUTO-USER'.

Thus there are two forms of AUTO setting:

AUTO set by seller, where seller has pre-determined only one cause that liberated amounts can be dispersed to. (Example: cap where dispersement is automated to 'Liverpool Street Clean'). When seller has set dispersement to AUTO, even if user has set their account to OPEN setting, dispersement is made to the cause without choice from the user; and AUTO set by user, where user has chosen a setting of AUTO for their account (and therefore experience) where no (or substantially no) choice is provided to the user as to where liberated amount is dispersed to when purchase is made. This may be beneficial for users who prefer to buy quickly and do not want a particularly interactive and/or time consuming experience with the system.

Seller may be able to set AUTO dispersement to multiple causes when an item is purchased. For example, dispersement may be split on AUTO between three causes. Nevertheless, if the dispersement is set to automatically be dispersed without choice from the user, it is said to be set to a setting of AUTO.

Seller may be provided with facility, even it item sale is not set to AUTO, to choose where/how liberated amounts will be dispersed for users that have set account settings to AUTO. In another example, the system (the present invention) may choose intelligently where liberated amounts are dispersed to in cases when an OPEN setting item is for sale (so that a choice of causes is provided for a user) and item is purchased by user who has set account to AUTO.

It is feasible settings are available that gradient between OPEN and AUTO, so that, for example, user can set account settings so that they are provided with choice of causes on OPEN set items for sale (where there is a choice of cause) but only provided with a choice on 50% of such occasions, or 70% of such occasions, etc. Thus user experience is optimisable for the user via alteration of settings. As will be shown, it is feasible settings are user settings are dynamically adjustable via use of the system on external websites.

Thus there is shown a purchase 'Type' of AUTO-S for purchase of the baseball cap since the dispersement cause was predetermined by the seller. (It is feasible dispersement cause may be chosen by entity other than seller).

Item name is given.

Dispersement status for the cap is shown to be 'Complete', which would be expected on an AUTO-S item, since dispersement cause was pre-determined.

Details link is provided.

Cause is shown. A play icon 76 denotes that media can be viewed by a user about the cause. It is feasible that under, for example, a video provided by the cause to view (which the user may be redirected to when the 'play icon' link is click), there may be provided options to PUSH and LINK. PUSH and LINK options, button, etc are not limited to user account pages, or websites, and may appear anywhere, including the external world; for example, posters, etc, which may then be read by a smart device.

There is shown dispersement amount, which, for the present example, is 99p. It is feasible different currencies are shown if user has purchase items in different countries and/or currencies.

Thus dispersement information is provided to a user via an account, which is preferably password protected and allows user to alter account (and therefore dispersement) settings.

It can be seen that £0.99 has been dispersed to Liverpool street clean via purchase of a cap on 25 May 2013.

(Lines underneath the two examples are an artistic representation intended to indicate that there may be shown more items that have been purchased by the user and have liberated dispersements).

It is feasible there is a significant social media aspect to the system, whereby users can connect, comment, take part, interact, send to friends, invite friends, etc.

Spontaneous Cause Creation

There may be provided further options for users or 'entities'. For example, there may be provided a 'Create a Cause' option and/or button. Such a button may be provided anywhere about a user account or anywhere on any website, and feasibly on a poster etc that can be read with a smart device; thus not limited to being provided only on the user account. Thus users may create a cause, and feasibly begin to use the system as a Cause.

There may be regulations required (and enforced) by the provider in order to set up a cause. For example, a video may be required explaining the cause. Such videos may be monitored and regulated for quality, or may not be. It may be necessary for bank details to be supplied by the new cause so that liberated amounts can be dispersed to the cause, or for information to be provided that facilitates the system in relaying dispersements to the cause.

Thus a user, or group, may spontaneously create a cause. A cause may include a mission to fulfil.

Thus it can clearly be seen that there are feasibly four party elements involved and using (or subject to) the system:

Seller;
User;
Provider; and
Cause.

Each may have an account or separate account set up. Account types may be different for users, sellers, and causes. Therefore a login page for a seller may look significantly different to a login page for a user (as shown in FIG. 9).

Figure 10:
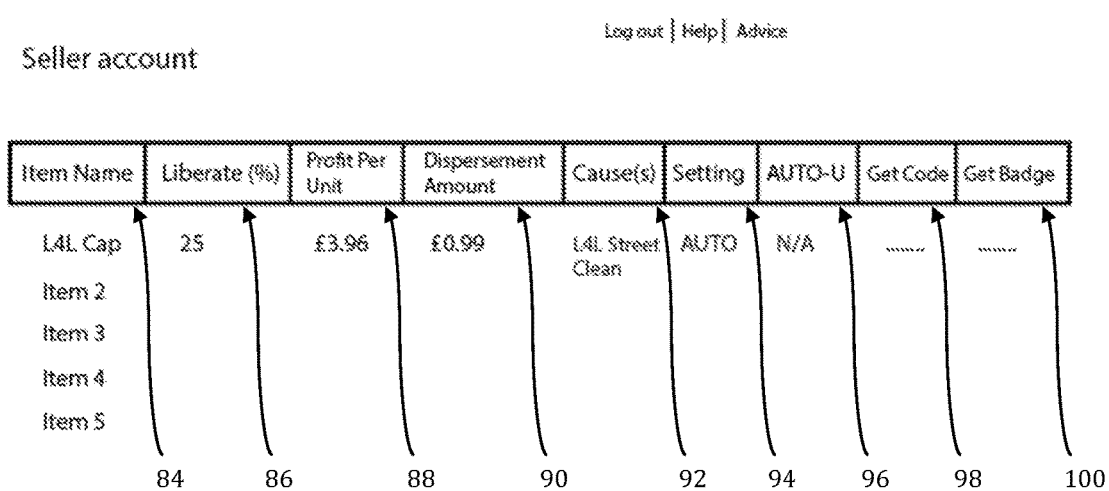
FIG. 10 shows a basic embodiment of a seller page, where seller may be provided with tools to set dispersement choices and parameters for users.

There is shown in FIG. 10 a basic skeletal representation of a seller page, where a seller can set up dispersement parameters (and other information) for dispersement items.

Preferably the seller account is password protected, and may feasibly require a separate password and/or protection system that a user account. It is also feasible that a user may have a user and seller account with the same password and/or protection.

Seller may, for example, be a manufacturing company who sells to retail vendor(s) at wholesale price. Example is shown of the cap as shown by example in FIG. 4. Information has been provided by the seller, columns of the table filled out.

There is provided an 'Item Name' 84 column, where name of the item has been filled out by the seller.

There is provided a 'Liberation (%)' 86 column. A 25% of profit liberation amount has been decided by the seller. Preferably, as shown in the example embodiment of FIG. 10, the liberation amount is a percentage of profit when item is sold. However, it is feasible liberation amount is a set amount, rather than a percentage, and a drop-down menu and the like may be provided so that such an option for set amount for liberation may be provided by the user, whereby an amount, eg $6.00 can be filled out by the seller. This feature may be important for goods that sell at high prices (and profit) where less units are sold.

There is provided a 'Profit Per Unit' 88 column, where a profit-per-unit amount has been filled out by the seller. In the present example, total profit per unit has been filled out by the seller as £3.96.

There is provided a 'Dispersement Amount' 90 column. Preferably, with such parameters set, the system calculates the dispersement amount from the figures provided by the seller. For the present example, dispersement amount per unit is £0.99.

There is provided a 'Cause(s)' 92 column, where a cause or causes can be chosen by the seller to which liberation amount is dispersed when item is purchased. There may be provided a search box/function and significant help for seller in finding and choosing a cause(s). Once decided, seller may input cause(s) into the 'Cause(s)' column. If only one cause is selected for dispersement, 'Setting' 94 column is automatically set to AUTO since there in no cause choice for a user (buyer). If multiple causes are chosen, seller has choice whether to set selling setting to AUTO (liberation amount is dispersed to all causes with no choice for user), or to OPEN, whereby user is able to choose to which of the causes to disperse the liberation amount.

(If the user sets AUTO when there is more than one cause, it is feasible a menu may be provided whereby percentages of the dispersement amount can be allocated to each cause individually, so that, for example, one cause receives more dispersement than another when an item is sold).

There is provided an 'AUTO-U' 96 column. As stated, is user has set account settings to AUTO, even if the selling setting of the item is OPEN, their dispersement will be automated, without choice from the user. In the AUTO-U (AUTO-USER) column, seller can define (if there are more than one causes for dispersement) where/how the dispersement will be allocated if buyer (user) has buying settings set to AUTO. Seller may set AUTO-U setting to default, in which case dispersement may be shared equally amongst dispersement causes, or may allocate any other setting, such as only one cause being dispersed to by AUTO-U buyers, or percentage allocation, etc.

For the present example, AUTO-U column has been defaulted to N/A by the system, since there is only one cause for dispersement. Thus there is no need for an AUTO-U setting.

There is provided a 'Get Code' 98 column. Once all details have been filled out, there may be provided a code for the user. This code may, for example, be usable on a website and integrate with a payment system, payment cart, payment button, and the like, and may automatedly carry out the dispersement when a purchase is made. The code may be an HTML code, javascript, iframe code (and the like) that automatedly carries out the function of separating the dispersement amount from profit of the item sold, which code may also send dispersement information to user (buyer) account when item is purchased. Thus it can be seen that code may be provided to seller for selling the item and executing commands relevant to liberation amount dispersement, and feasibly executing commands relevant to relaying of dispersement information to a user account.

In an alternative embodiment (which may be provided alongside the previously mentioned 'Get Code' protocol), the code may be for creating of a QR code (and the like) or a dispersement icon for attaching, printing, etc, and applying to goods for sale at retail. If a QR code is provided (which may in fact be a QR-icon which may be downloadable, copyable etc for the seller), the QR code may be usable on a website, poster, may be printable for use on a retail product, etc.

It is feasible such a method may be used to create a dispersement indicator 12 for a product, which can be applied to the product to indicate to a user dispersement amount information, feasibly thus also being a dispersement amount indicator 14 and/or icon 20. This may also have use for vendors and may be sent by sellers to vendors, or may be provided to sellers via a seller account on the system or by integration features in the system between seller and vendor if they are different entities.

There is provided a 'Get Badge' 100 column. This may provide seller with a badge, icon, indicator, etc that can be used on a website or a physical product as a dispersement indicator 12 to indicate to a user that an item liberates a dispersement when purchased.

Thus it can be seen that badges, icons, indicators, code etc can be generated via an automatic, or substantially automatic computer implemented method and/or system.

Figure 11:
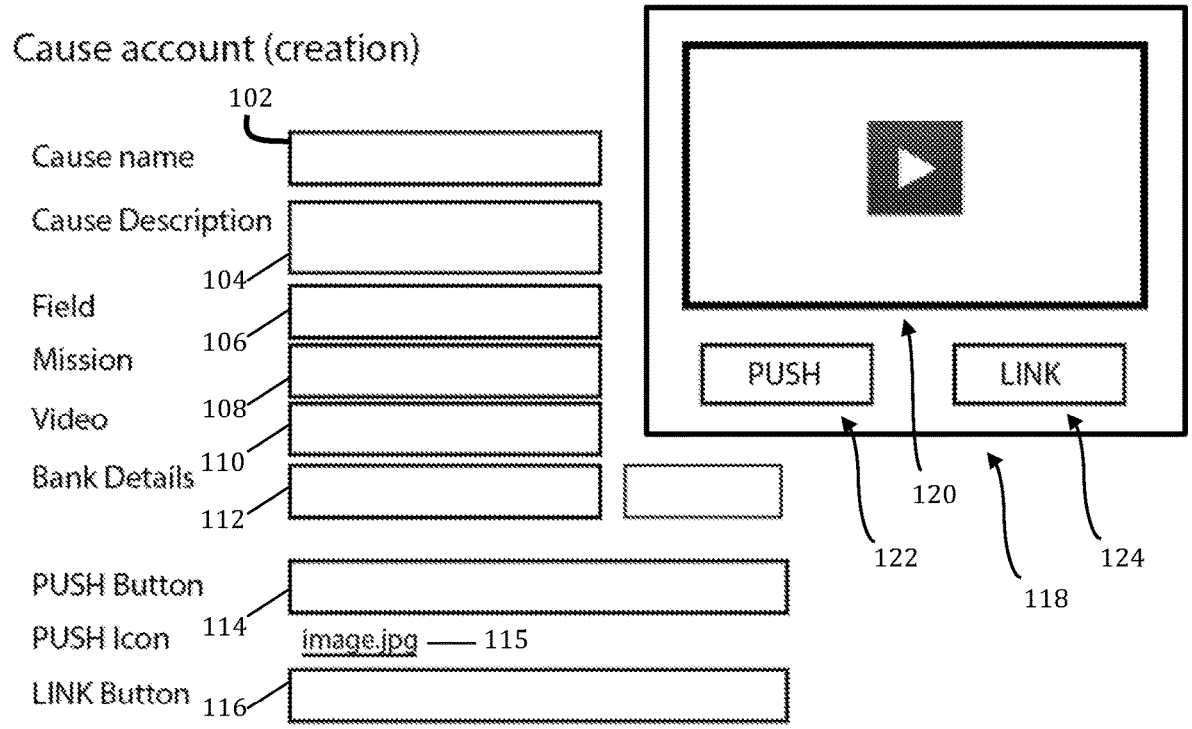
FIG. 11 shows an example (and basic) embodiment of a cause page, where a cause for dispersement may be created by a user and/or entity of any sort.

There is shown in FIG. 11 a basic embodiment for a cause creation page (and cause account creation).

As stated, it is feasible any entity and/or user can set up a cause (or cause account). Bank details (or similar information may be required for liberation amounts to be dispersed to. It is feasible Paypal-type accounts (virtual bank accounts) or any other such account details may be provided. Thus liberation amounts can be dispersed to the cause. It is also feasible there is provided a virtual bank for the cause.

Information such as 'Cause Name' 102 may be required. The embodiment is provided by way of basic description and example only.

There is provided a 'Cause Description' 104 box for a cause to fill out.

There is provided a 'Field' box 106 which may incorporate a drop-down menu so that a field or category for the cause may be provided, such as 'animals and pets', 'health', 'music' etc. There may be provided sub-categories so that an exact filed can be provided by the cause.

There is provided a 'Mission' box 108, where either a cause can state its mission statement, or provide a mission the cause aims to fulfil. Thus, when liberated amounts are dispersed to the cause, it can fulfil its mission, at which point a new mission may be created, or dispersements may be ceased.

There may be provided a 'SEND LINK' box, which facilitates a cause in sending a (video) message to users who have linked with the cause. However, this option may not be available at first screen for cause creation. There may be provided dedicated tools, software and the like for facilitating a cause in sending a LINK message to users.

There is provided a 'Video' Box 110. A URL of a video from a video hosting site may be provided in the box so that the video can be uploaded and/or shown to promote the cause. Video is a particularly entertaining and informative media platform. Thus it may be required for a video to be provided by the cause for users to view.

There may also be provided a video upload button so that video files (such as MP4 and the like) can be uploaded to the system, the system hosting the video.

There is provided in the example embodiment a bank details box 112 so that bank details (or virtual bank account, etc) can be provided by the cause so that there is provided an account for liberated amounts to be dispersed to.

(When a cause has been set up, there may be provided a tracking page where all details of how much liberated amounts have been dispersed to the account, how many purchases incurred the dispersements, total to complete mission, etc are provided, so that cause dispersement information can be tracked by the cause.)

There is provided a PUSH button box 114 where code (HTML, etc) may be generated by the system for cause to use as a PUSH button on a webpage and the like.

There is provided a PUSH Icon image 115, which may be automatically generated by the system and may provide a, for example, QR-type code which can be used on a poster and the like so that a user (who may or may not be a buyer) may aim a smart device at the icon (or scan it and the like) in order to facilitate pushing of the cause by a user. Such an icon may, for example, relay a page viewable on user's smart device, which includes a button to PUSH the cause. Such a screen may include a call-to-action for a user to create a user account for the system if they do not have one, so that they can PUSH a cause. The Icon may be provided as a high quality image download, or may be a code, programming language, and the like. The PUSH icon image could be said to be a connection facilitating element, since it may facilitate connection with a user(s) via a smart device.

There is provided a LINK button box 116, which may generate and provide code for a LINK button for the cause, which code may be used on a website, etc.

There may be provided a LINK icon box.

There is provided a preview window 118, where the cause video 120, which has been uploaded or embedded onto the site, is previewable, along with PUSH 122 and LINK 124 buttons, which may be testable by the cause.

There may be provided a Homepage and/or website for the cause (such as a template), where cause video, push button, link button, etc can be viewed by user. Such a page may be simple, featuring just video, and PUSH and LINK buttons and feasibly a call-to-action for users that do not yet have an account so a user account can be set up, which may be required in order to PUSH and/or LINK a cause. Such a page may be automatedly generated by the system when cause has been set up.

Thus it can be seen that the system may incorporate four party elements:

user; provider; seller; and cause, and that there may be any number of users, sellers, and causes, the system being scalable.

PUSH when No Purchase is Made

The present invention opens up opportunities for financing, even when a purchase is not made.

It will be well known that many communities have run down areas and/or sites.

As has been shown the present invention may be particularly useful in communities.

In many communities, for example, there is a park(s) with an outdoor tennis court usable by the public. Such courts are typically made of gravel, are not well kept, and may have weeds and plant matter growing on the court. They typically have nets that droop, and are not well kept. Many such courts become substantially unusable and are regularly seen unused.

This is just one example of a run-down area in a community.

In such an example, a cause may be set up, for example by a resident. It is feasible the cause can be set up spontaneously via similar means as aforedescribed, with particular reference to PUSH function. A video may or may not be required to set up the cause. If a video is required, it may simply be filmed on smart device and uploaded immediately to the system, or uploaded to a well-known video platform and either embedded onto the system via code, or shown via URL.

As shown, (and described with reference to FIG. 11), cause for the tennis court may be created and PUSH, LINK buttons and preview may be generated and shown in the preview window. As stated, a QR-type image may be created and downloaded from the cause creation page, as well as a PUSH image (for a poster and the like) and feasibly a dispersement indicator image to indicate to a user that dispersements can be made.

Thus a poster and the like can be placed at the scene, perhaps on the gratings of the court, visible to passers-by in the community, indicating that the tennis court is now a cause dispersements can be made to. The dispersement indicator 12 may simply be a symbol which is recognisable to users as a symbol which means a dispersement can be made to the cause. Primary intent is to get users to PUSH the cause, which, as stated, may feasibly be done locally or globally by the user.

Figure 12:
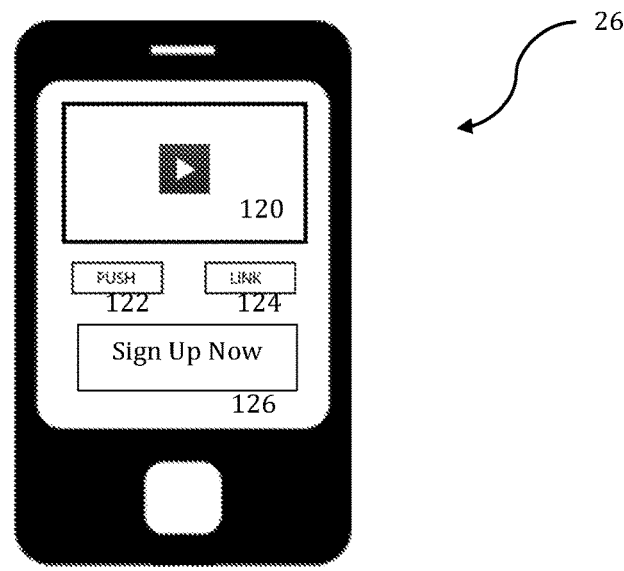
FIG. 12 is a front view of a smart device which has connected with a cause, most preferably for pushing the cause.

The poster may include the PUSH image which may be a connection facilitating element, and may be a QR-type element. Thus, if a user is in proximity to the printed element, or scans the code and the like, there may be shown on their smart device a screen as shown in FIG. 12, the user thus connected to the cause via the smart device. The screen is substantially identical as the preview window in the cause creation page of FIG. 11.

There is provided on the smartphone screen the cause video 120 (which may have been recorded by the cause creator via smart device), a PUSH 122 button, and a LINK button 124. User can watch the video to see what the cause is about, and what mission of the cause is. User may be able to post comments, upload a response video, etc. If user hits the PUSH button and the user has a user account for the invention as shown in FIG. 9, user may be prompted to choose whether they would like to PUSH locally, or globally. Settings for user account are accordingly altered to bias dispersements to the cause.

If the user has not yet signed up for a user account, they can choose the 'Sign Up Now' button 126 and create an account.

Thus when user purchases items that liberate dispersements, a portion of dispersement may be dispersed to the cause. If cause is pushed locally, a limited amount of dispersements may be dispersed to the cause. If cause is pushed globally, a portion of substantially all dispersements may be pushed to the cause.

Thus it can be seen that a cause can be pushed where there is no sale initially made, and the PUSH function can be used to finance a project, via quick and spontaneous cause creation.

Figure 13:
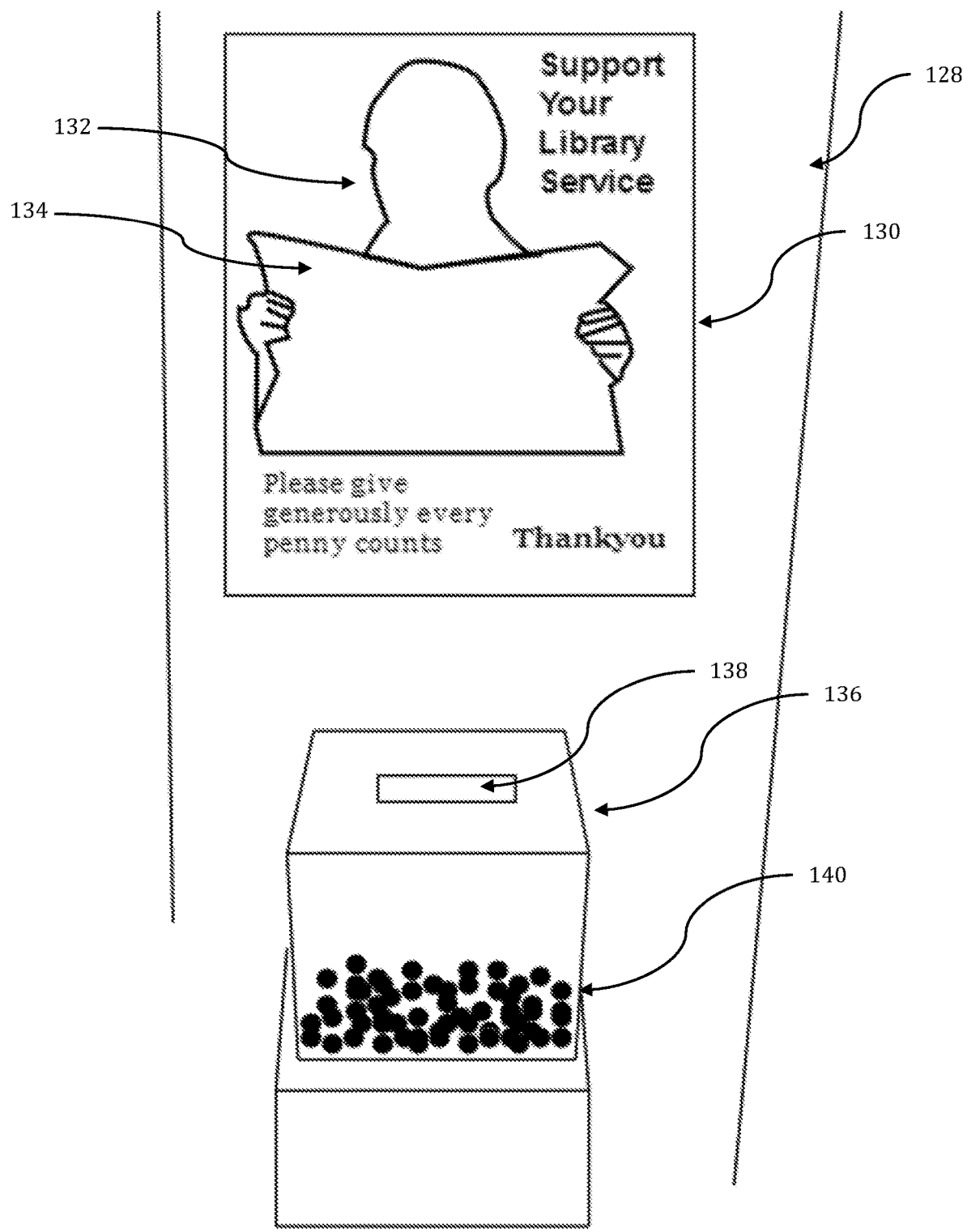
FIG. 13 is an example of an attempt to create financing for a library using traditional methods and not using the present invention.

In a similar community example of where PUSH function of the present invention can be used where there is no sale initiating the process, there is shown in FIG. 13 an attempt to raise funds which has been shown throughout many industries to be significantly unsuccessful. In FIG. 13, the present invention is not used. FIG. 13 is used as a comparative example to FIG. 14 where the invention is used.

There is shown in FIG. 13 a wall surface 128, situated near to an exit of the library so that it is seen by all those leaving the library. There is provided a poster 130 on the wall with a call to action for users of the library to 'support your library service' and give money to the library. There is shown on the poster a miscellaneous picture of a man 132 reading a newspaper 134.

Under the poster 130 there is provided a glass or transparent plastics box 136 which has a slit 138 money can be placed in. There is shown pennies 140 in the box. The poster reads 'every penny counts'. The poster is a call-to-action for users to place money in the box to help finance the library. Some people (over a long period of time) have placed pennies in the box. However, the system is extremely unsuccessful, and despite tens of thousands of people passing by the attempted financing system every year, extremely little financing is received and achieved.

A particular problem with the shown system (which does not use the present invention), is that it asks people to 'donate' money—that is to give money out of their own pocket—financing that is outside of their normal spending. Humans are genetically equipped to act in their own interest and to the benefit of their own survival (and prosperity). This is not to say that humans do not (or cannot) also act in the interest of others. However, donation of money outside of normal spending is equated by many with loss of money, which is against the interest of the user.

The call-to-action is extremely vague—it would be desirable if the call to action specified where financing would be driven, and suggested a result tangible for the user. It would also be desirable if the user were able to finance the project with no spending outside their normal spending—that is, at no cost to them.

Figure 14:
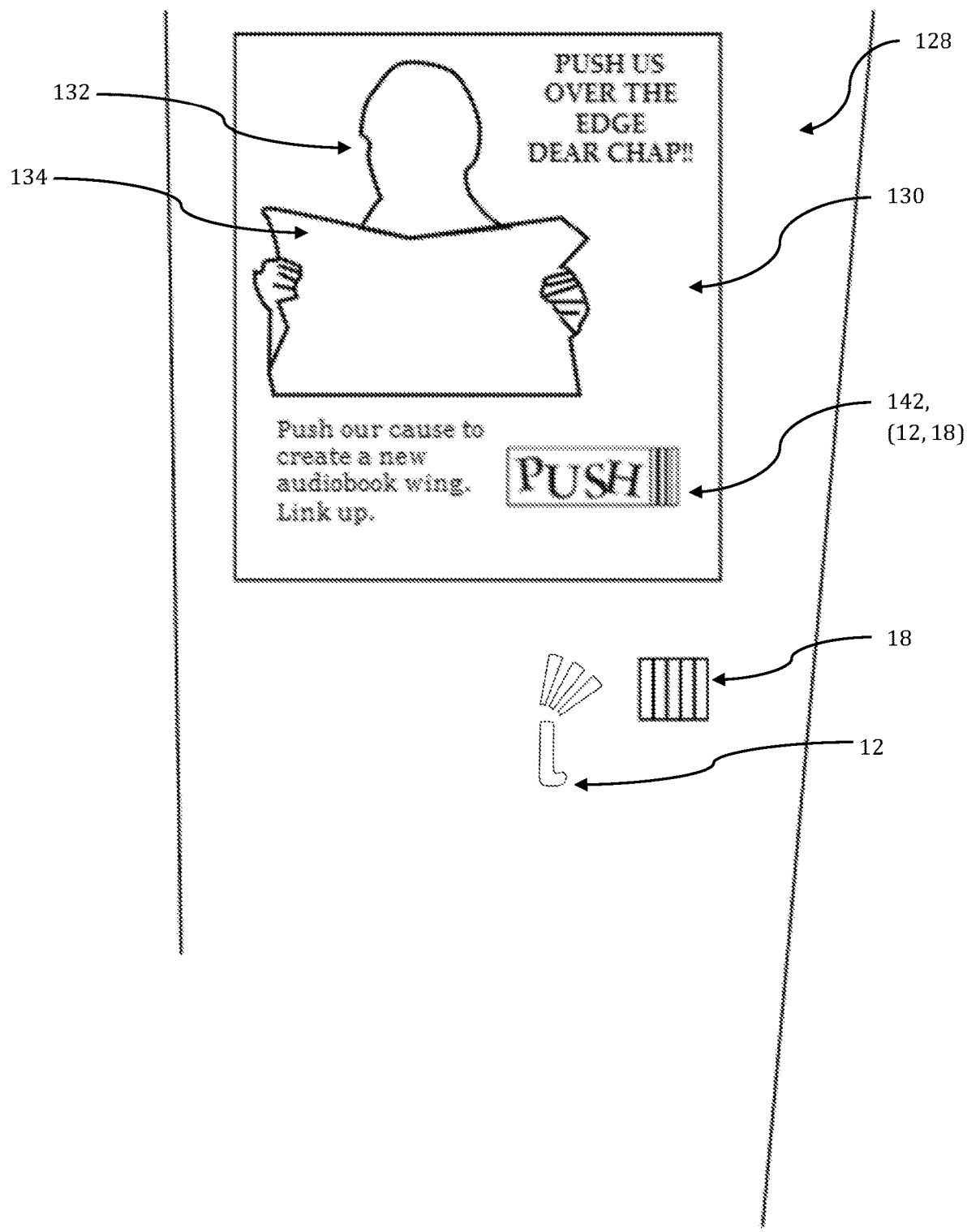
FIG. 14 is the financing attempt as shown in FIG. 13, wherein, rather than traditional methods, the present invention is used.

There is shown in FIG. 14 a modification of a same scenario as that seen in FIG. 13, where the present invention is being used, particularly with reference to a PUSH function of the present invention.

There is shown the same wall, and a similar poster, with a man reading a paper. There is clearly shown a 'PUSH' icon 142 (this may be a dead image that has no technological function, or may be a scannable (and the like) element 18 that initiates and/or facilitates a PUSH function for a user with a smart device. The PUSH icon itself is also a call-to-action for the user, and may be deemed a dispersement indicator 12 if it is recognisable as such to users.

There is shown a call-to-action which reads 'Push our cause to create a new audiobook wing. Link up'. This is far more desirable as it defines to user benefit both for library and user—they will receive a new audiobook wing if the cause is pushed successfully. This could be said to be a 'mission' of the cause. This mutual benefit aspects significantly assuages 'loss' issues for the user, who may feel that pushing the cause is in their own interest. There is shown an amusing call to action 'Push us over the edge dear chap!!' which plays on the meaning of 'PUSH', and further implores user to use PUSH function top finance cause.

The PUSH icon 142 itself (which may simply be a printed image), may act as a scannable element and the like, or there may be provided a separate QR-type code and the like, which is configured to initiate an ability for user to PUSH and/or LINK with the cause. It is feasible that no scannable element is required and that proximity to the cause poster, icon, etc initiates facility for user to interact with cause via a smart device.

The push icon image 142 may have been created (and printed) via the cause creation page of FIG. 11. Similarly a scannable (and the like) element 18 may have been provided by the system and/or created (and printed) via the cause creation page as shown in a basic example embodiment in FIG. 11.

There is shown a scannable element 18, if required, and if the PUSH image, icon 142 etc is not itself a scannable (and the like) element.

There is provided a dispersement indicator 12, which here is a symbol, (which here is symbolic of the present invention) which may be a logo and the like that is recognisable to users as a symbol that indicates that dispersement to a cause can be initiated at this place/via the symbol. The symbol itself may be a scannable (and the like) element, which, for example, when a smart device is held close to it, facilitates a connection between user and cause via smart device. Such technology is well known to those with skill in the art.

No money box is provided. Intent is for user to use smart device to PUSH library cause so that, preferably with no payment made by the user outside of their normal spending, settings of user account (as shown in FIG. 9, etc) are altered to bias dispersements to library cause via purchasing of items that liberate dispersements.

If cause is pushed by user, purchasing of items that liberate a dispersement, even if library cause is not a cause choice (and feasibly even if selling setting is set to AUTO), may disperse a dispersement (or a portion of a dispersement) to the cause. It is also feasible that PUSH dispersement is handled on a time period basis, so that, for example, a portion/percentage and the like of all dispersements over a monthly period are tallied, with a portion of total dispersements of a user dispersed to a pushed cause of the user. Such calculations may be handled intelligently by the system and/or user account, which user account may be said to be an incorporated part of the system. (Intelligent pushing by the system may involve system recognising how much financing a cause requires and intelligently deciphering priority on a user account as to how much should be pushed to a cause. For example, if a cause mission is fulfilled, system may intelligently stop dispersement by a user even if cause is pushed by the user, dispersements thus being pushed to other causes being pushed by the user).

Similarly, system may recognise (and calculate) how much financing a cause (and/or cause mission) requires, and how many users the cause is presently being pushed by, and may prioritise dispersements accordingly.

An App and the like may be required for the user for smart device connection.

Preferably, when user connects to the cause via the smart device, for example hovering the smart device over a scannable (and the like) element, they are met with a screen similar to that as seen in FIG. 12, where there is provided a video by the library (if there is provided a video, a simple name of the cause may be provided), with a PUSH button and a LINK button. Intent is for user to PUSH the cause, which, if done, may elicit a further request from the device as to whether to PUSH locally, or globally, or to adjust and/or configure settings for how to PUSH the cause. (This may involve prioritization, which may alter user account settings).

Preferably, a LINK protocol can only be initiated with a cause that has been pushed. Therefore, if user has not pushed the cause, and selects LINK option, preferably a message appears on screen informing user that LINK can only be established with cause if cause is PUSHED and whether user would like to PUSH cause.

If user has a user account with the system (an aspect of the present invention), user may be required to sign in, or may already be signed in. If user does not already have an account with the system, they may choose the 'Sign Up' button in order to create a user account for the present system, which may involve providing information such as an email address, a password, and either integrated with a payment option (such as a credit card previously owned by the user), or using a payment system incorporated as part of the system.

This achieved, a cause can be pushed by the user.

Intent is that dispersements from purchased items that liberate a dispersement will be partially syphoned to the cause. Thus it can be seen that PUSH function can be initiated by the user with no payment made, and that the cause can be pushed (and thus financed) with no spending outside a user's normal spending—if they leave the library and pay standard retail price for an item that liberates a dispersement, a dispersement may be dispersed to the cause (which may be a substantially immediate dispersement, or may be tallied from a dispersement total of the user's account/activity).

User may be able to send details of cause to friends etc, and may be able and/or facilitated to create groups with friends and the like to help causes. Social media and sending buttons etc may be used for this.

As described and shown in FIG. 11, library cause may have been set up quickly and substantially spontaneously. Video may have been recorded, either professionally or simply by a staff member using a, for example, smart phone to record video. Basic description of cause may have been provided, with mission etc, which information may be provided and viewable when user holds smart device to scannable (and the like) element. Cause may also be searchable on the smart device for the user. For example, cause name may appear on the poster. Thus user may go to account/system on smart device, and search for the cause manually, which may facilitate pushing, etc.

Once cause has been pushed, user may be asked if they want to LINK to cause, as shown in FIG. 8. It is thought that approximately 100 times as many people will finance the cause via this method rather than the unsuccessful traditional method as shown in FIG. 13.

There may be provided limitations on a user account as to how many causes can be pushed. Such limitations may be handled intelligently by the system, and may include calculations as to how much dispersement is made by user, for example, per month.

User may be able to unlock features in their account, such as ability to PUSH more causes. System may intelligently stop pushing a cause by a user after a particular amount of time. For example, pushing may have to be re-confirmed every month; message may be emailed, or sent to smart device of user to ask for confirmation that cause should be pushed by user approximately every month. This may help to limit amount of causes being pushed by user and ensure causes is not continually (and forgetfully) pushed by a user, thus freshening pushed cause data for a user.

Thus it can be seen, both in a case of a run-down tennis court, and in a case of a library financing for an audiobook wing, that the present system can be used in a community (or any) setting to arouse economic and socio-politic change, giving power to the people (which could be seen as democracy), the form of democracy being iterative in that it is carried out by the one, and affects the whole. The present system (and invention) gives power to the 'poor' (or non-wealthy) because, simply by virtue of number, the non-wealthy vastly outnumber the wealthy, thus dispersing vast amounts of money, which creates sociological change. In truth, system does not differentiate between wealthy and unwealthy, rich and poor, and is usable for any user.

The system may be infinitely scalable. Thus there may be, for example, hundreds of thousands of causes synchronised to the system, and configured for dispersement to; there may be billions (or any amount of) users. Preferably the system is configured so that most or all actions are carried out by the system, which may require significant programming.

Referring back to purchase of item 10 as shown in FIG. 6, if the pet cleaning device is purchased by the user with a credit card that has been integrated with the system (and integrated with their user account), the purchase (and purchase information, dispersement information) may appear on their account, as shown in FIG. 9. This opens up several possibilities; for example, it is feasible cause choice is selectable after the purchase is made, so that, for example, a user can log in to their account and decide cause to be dispersed to after they have purchased the item. It is also possible, if the credit card they have paid with is integrated with their account, that they may be messaged immediately after making a purchase, for example, via a smart device, so that user can choose a cause for dispersement.

Message to smart device may be achieved in many ways, such as via phone number. It is also feasible that a message is sent to user via email (which email user may have provided as part of setting up a user account). In such a case, user may be sent an email to a smart device, or may receive (and open) the email via a PC and the like, at which point they may be directed to their account, which may show their purchase(s) and dispersement options.

Thus, a user may log in to their account, view their dispersement options for purchase(s) within their account, and choose cause(s) for dispersement.

If an email address has been provided by the user, there may be provided a 'LINK' protocol, whereby a user and cause can be linked via users email address. This may be particularly interesting in a case where a cause has a mission to fulfil so that the cause can inform, and connect with, users who have dispersed to them, (or are configured to disperse to them).

For example, if there are provided options for dispersement causes with respect to purchase of the pet cleaning device not limited only to dog care, but also including animal care (which is logical considering dog lovers tend to be animal lovers), there may be provided a cause which can be dispersed to in order to aid, for example, a project with a mission to build look-out towers in a forest area to deter poachers who are known to poach animals in an area.

In such an example, when a link is set up, user may be provided with information pertaining to mission fulfilment of the cause, such as whether enough liberation amount has been dispersed to the cause to carry out a mission of building four look-out towers. The cause (and those associated with the cause) may be able to film a video (or provided any other information), and send to users via the link. The link need not be provided by way of an email address and may be an integral feature of the account system, whereby information can be sent to users who have an account. LINK protocol may be established with any form/method of communication.

Thus significant information may be made available to a user about a cause after a purchase has been made, and it can be seen that cause choice can be made after a purchase.

In such a case where there is a provided a choice of causes for a user to choose from purchase of an item(s), the selling system is said to be using an 'OPEN' configuration. In a case where cause choice is not provided, and the cause(s) are pre-determined, the system is said to be using an 'AUTO' configuration.

However, as aforementioned, it is also possible, if there is provided an account for a user, that settings can be configured by the user, preferably from within the account of the user. Some users may not want a particularly interactive experience, whereby choices constantly need to be made. Such users may want to set their account to 'AUTO', which automates, or substantially automates, dispersement decisions. Thus items can be purchased and dispersements are sent to pre-determined (or intelligently systematically determined) causes.

There may also be provided an 'OPEN' configuration option, whereby user can set their account to a most interactive experience, whereby choices are required for choosing causes for dispersement etc.

Options may also be provided whereby, for example, user can define whether 'LINK' protocol options are provided to the user—thus such options may be turned on and off by a user.

In a case where an item, such as the item as shown in FIG. 6 is provided, which incorporates a choice of possible causes to disperse to, if a user has set account settings to 'AUTO', such a choice may not occur. Thus it would be desirable if either:
1) seller or brand manufacturer of item or any other entity has apportioned an 'AUTO-U' choice for the item for users who have accounts set to 'AUTO', so that a cause is chosen by default for a user who has an account set to 'AUTO';
2) a random protocol is set up so that one of the causes is randomly chosen for dispersement to, the random protocol preferably substantially evenly dispersing to the causes over time;
3) dispersement amount is evenly distributed to the causes
4) dispersement calculation is carried out intelligently by the system Thus if AUTO setting has been chosen by the user, preferably via their account settings, choice options may be by-passed by the user.

Significant limitations, regulations etc may be provided by the system and/or provider of the system. The system is founded upon a new system of selling that incorporates dispersement to a cause(s), information and settings preferably relayed to user. Preferably sellers can set parameters for dispersement, and choose cause(s) for dispersement etc. It is also feasibly significant automatic features are provided for sellers using the system, so that, for example, they can set cause choice to be decided intelligently by the system. In such a case, system may intelligently decide on relevant (or random) causes for liberation amounts to be dispersed to. For example, system, due to information provided by causes at cause set up page (basic example embodiment FIG. 11) and due to information provided by user, (where user, for example, may have provided information as to where they reside at user set up page) may intelligently provide locally relevant cause choices for where an item is sold. For example, if a purchasable item that liberates a dispersement when purchased is sold in Cambridge, relevant local cause choices may be provided for such items when purchased if seller has set system to decide on cause choice. Similarly, if desired and/or calculated by system, system may put an item on 'AUTO' where no choice of cause is given to user when item purchased, if system calculates that the cause is worthy and/or requires dispersement.

Preferably cause(s) are facilitated by the system in setting up causes. Restrictions may apply, Authorization may be required, or may not be.

Preferably the system provides required elements for causes, for as, for example, scannable (and the like) elements, which can be printed for use in posters and the like, or for use on a website and the like. Preferably, the system automates a 'PUSH and/or LINK' screen and function for users who require and/or desire such a function.

Setting up a cause may automatically generate a website for a user, which may be useful to achieve more PUSH users, and LINKs.

Preferably the system intelligently disperses dispersements about a community, group and/or area (feasibly not limited in size).

An interesting result of the system is that it may substantially, or wholly immunise a community against recession, since vast quantities of financing is dispersed into the community, even in times of recession. Growth is not particularly important to the system. System generates creation, and is self-sufficient.

For Use on Website

Figure 15:
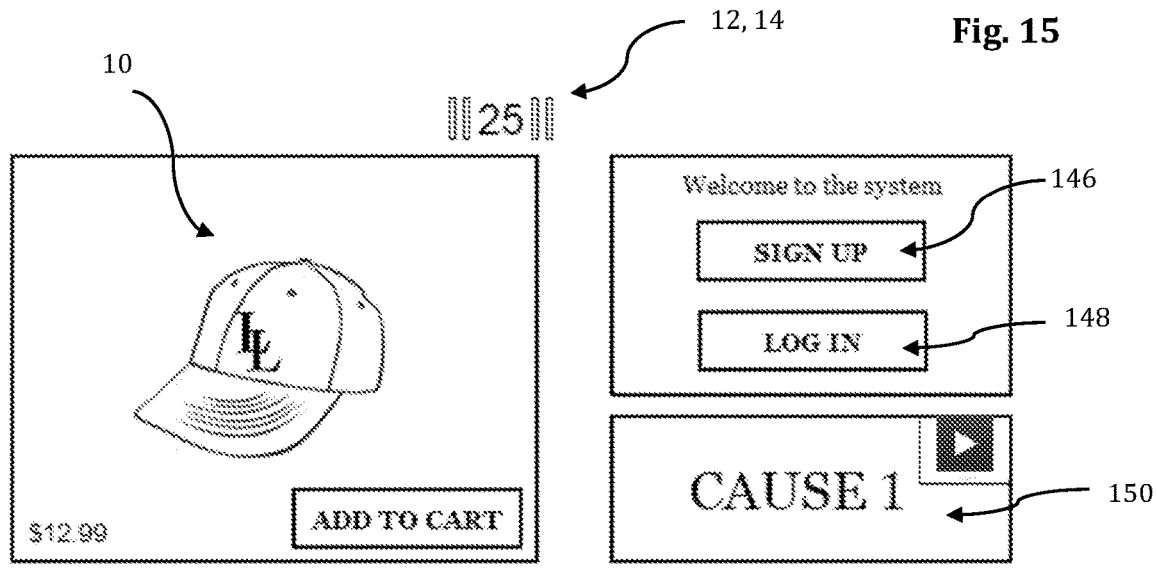
FIG. 15 is an example of the invention used to sell an item on a website.

There is shown in FIG. 15, a purchasable item 10 sold online on a website, utilising the present invention. There is shown a dispersement indicator 12, which for the present example, is also a dispersement amount indicator 14, revealing that 25% of profit generating from selling of the item is liberated for dispersement. (Equally a total amount rather than a percentage may be used).

Preferably the website, company, and/or brand that are selling the items are branded in a way that makes it communicatively obvious that the brand disperses money and/or financing and uses the present invention. Thus the website, brand, and/or company, which will herein be described as 'brand', and is a seller, may be called a name that heavily suggests or indicates, for example, name of a town, city etc, if it is a brand for dispersing about the said town, city, etc.

Site is browsed by the user, and may decide they would like to buy an item of clothing. For the sake of the present example, an example is provided where a user wants and/or chooses to buy a baseball cap.

Before landing on a buying page, or a page specific to buying said item, which, in a present example, is a baseball cap 10, there may be provided for a user various media, which may explain and/or showcase a cause or causes which a user may disperse a, preferably percentage of profit, amount of a sale to. Thus there may be provided media such as video, imagery, and information for a user, for example, on a homepage of said website, which may provide information regarding a cause or causes that can be dispersed to, as well as how the invention, functions.

Thus there may be provided on a homepage or any page a 'sign up' 146 or 'log in' 148 facility so that a user can sign up for a user account. An account may include a payment method not dissimilar to a paypal type payment account and/or system so that a user may, for example, sign in with an email address and a password, and thereby be able to buy an item or items without having to repeatedly pay via a credit card, which may be cumbersome. Alternatively the present invention (system) may incorporate a payment method (such as its own bank system) so that no other payment method is required. There is shown a cause media button 150, which may be clickable to view a video about cause dispersed to. User can easily sign in and out of using user account, and may be able to change settings of their account in one click on a site (for example between AUTO and OPEN, or any other setting).

Figure 16:
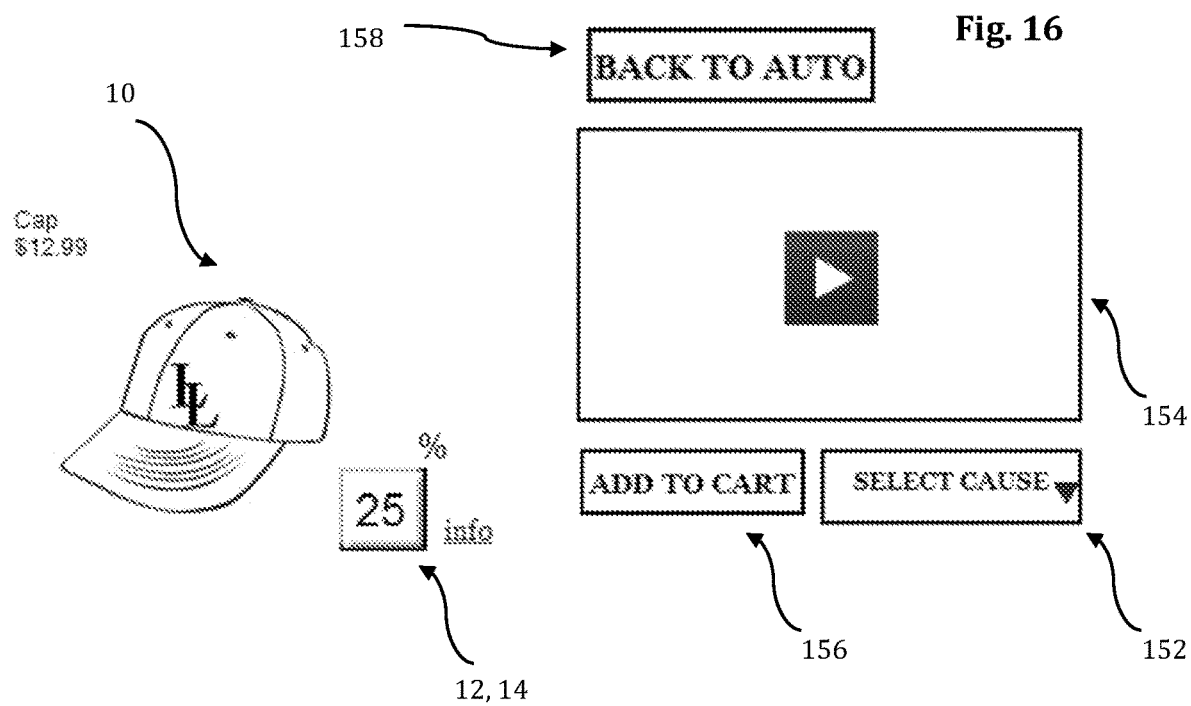
FIG. 16 is an example of the invention used to sell an item of the website where a user has logged in and is using user settings.

There is shown an example in FIG. 16 of the invention being used on a website where a user is signed into their user account, and setting is on OPEN. They are provided with a screen where an item 10 is for sale. Dispersement indicator 12 is shown, which is also here a dispersement amount indicator 14. There is provided a drop down menu 152 for selecting different causes that can be dispersed to when cap is purchased. There is shown a video 154 for a cause, which may provide user with information related to cause and mission to be fulfilled. When cause it altered on dropdown menu 154, different video for different cause may be shown. Thus user is provided with video of each cause, preferably, and may choose which cause to disperse to when purchasing item.

An 'Add to Cart' 156 button is shown for purchasing the item.

Once item is purchased, and cause dispersement chosen, there may be provided PUSH and LINK options, etc, which may also feasibly be provided before item 10 has been purchased.

There may be provided social media sharing buttons, etc so that the webpage, item, cause etc can be shared. There may be provided a button (such as social media button) exclusive to the system (provider) so that the item, cause, page, etc can be shared to other users of the system.

There is shown a 'BACK TO AUTO' button 158, which allows a user to revert back to AUTO dispersement setting for their account (and therefore user experience) in one click. User may be signed in at all times, for example, sign in may continue after computer is turned off, or may be restarted whenever user starts and uses computer.

If the 'BACK TO AUTO' button 158 is pressed, if seller (or any entity with authorisation to do so) has, for example, set selling settings so that purchase of item results in dispersement to only one cause, then the only one cause may be only cause showcased on webpage. Cause selection options may be removed, or greyed out, and 'BACK TO AUTO' button may alter to 'GO OPEN' button and the like. Thus dispersements (and user experience) settings can be changed dynamically by a user when on a website, not limited to being within user account.

It is feasible, for example, that if a user hovers a cursor over the percentage dispersement amount that they are given further information, such as total dispersement amount, cost price of item, etc, and not limited to such information.

This is an extremely interactive buying experience which adds an added dimension to the buying experience. Furthermore, this can instigate significant change in the outside world, such as building of new buildings, etc.

If a user purchases the item without having an account or signing in, they may not have access to dispersement information, which may only be accessible via a user account. Nevertheless, in such a case, it is feasible a dispersement is nevertheless made to a cause in an automatic (or substantially automatic) manner by the system and/or seller, even if user is not a user. It is also feasible liberation does not occur when item is bought by a user who has not signed up for an account and/or is not signed in. Preferably a dispersement is nevertheless made to a cause.

If user is signed up, and has signed in, they may be provided with PUSH and/or LINK options either before, and more preferably after, a dispersement has been made.

It is feasible signing in is not required in order for data/information to be stored on a user account, if payment system used is integrated with the system, or if payment method used for buying is an incorporated payment method of the system.

User may be able to toggle between different colour items, etc.

It is feasible figures, pricing, may be wholly transparent on the system, so that vast amounts of information are available for users, such as total-cost-price-for-unit calculations by sellers. This may deter sellers from using false calculations, which may be reportable by users. Such information may be mandatory, or not.

It is feasible dispersement amounts may be alterable by a user. In a preferred embodiment, dispersement amounts are not alterable by a user.

Prices of items, despite dispersement, may not significantly, (or at all) rise above standard retail items, especially if the brand, seller, etc is either run substantially non-profit, or is run for a community. It is feasible such a brand, etc may be in part, or wholly, owned by a community.

As aforementioned, settings may be significantly alterable by a user, and not limited to simply AUTO or OPEN setting, but with any amount of optimisation possibilities. Therefore one user may have an extremely interactive experience, with vast amounts of information provided when using the system, whereas another may set to AUTO so they can buy substantially as normal, whilst retaining ability to disperse, and track dispersement information.

Alteration of settings by a user may lead to dynamic alteration of a website selling such items, even if the seller is not the provider. This may require dynamic type coding and integration of the system with the seller website, much of which may be carried out via code and/or coded buttons and the like, which code may be provided to seller for use on seller website.

If user goes to new website, preferably user settings are remembered/unaltered for the new website. Thus if user has a favourite setting, it will be applied globally to any website they land on that uses the present system for selling.

It is feasible there is provided a 'CHANGE SETTINGS FOR THIS WEBSITE' whereby a user can set user settings locally for a particular website without altering favourite and/or default user setting. Setting is preferably thus remembered or 'stored' for the particular website. This may be done dynamically on a website, or via user account.

The system may integrate with a payment method, such as a Paypal type payment method, or may incorporate one. Information may be required from a user such as name, date of birth, address, etc. It will be obvious that such details may be extremely important for system to optimise experience for a user.

With reference to LINK function, if use has purchased an item (for example a cap) that liberates a dispersement which is dispersed to cleaning of a street, once a milestone (or any new information) has been reached, user may receive a message from the cause, stating, for example: "Thanks user! New £10,000 road cleaner machine purchased!! See it at work!" and there may be provided a link to see the machine in use. One of the primary functions of LINK is for user to see result when a mission, for example, has been fulfilled.

When used in an external environment for selling (not the internet), it will be obvious due to recent technology, that a code and the like is not necessarily required to initiate a communicative connection with a smart device. New technology exists that allows user to hover a smart device over any picture image, etc, and watch as the image alters on their smart device (though not in real life). Therefore it will be obvious to those with skill in the art that, either for PUSH function, where smart device is used to connect with a cause, or for feasible embodiments of a sales purchase using the system whereby user can gain information about a cause, cause dispersement information, etc via use of a smart device, that a scannable element (and the like) may not be required. Nevertheless, if the scannable element prompts a user to take action, and indicates to a user that dispersement can be made (in which case it could be said to be a dispersement indicator), a scanning element may be useful and/or preferred.

A community (if the system is used for dispersement to a community) may be a physical community (such as a town, city, country, etc), or a virtual community (such as a group). An example of a virtual community is dog-owners, who are a group, and are not limited to a physical location.

The system may be used to support cause(s) in great times of distress.

For example users may be allowed and/or requested to PUSH causes, such as an earthquake fund, when a disaster occurs, dispersing vast amounts to help. However, it is feasible such cause(s) may only be allowed if either 1) authorized, or 2) created by the provider. Thus primary function of the system is not affected.

It is feasible causes are not 'paid' dispersements, but dispersements are logged in cause account as digital numeration alone, whereby when a mission fulfilment total is reached, finances are released. It is feasible financing is taken care of by the provider and that cause never receives dispersement money. Thus, for example, provider may release accrued dispersement amount to a company to buy a street cleaning machine, cause never receiving the money, but receiving the street cleaning machine that was bought with money accrued by dispersements to the cause.

Safety features may be implemented to stop causes accessing dispersements amounts, such that dispersement to the cause is not accessible and/or may not be convertible into real money by the cause. Such safety procedures may, or may not be temporary.

There may be provided significant safety procedures to make sure that dispersement money dispersed to a cause is not simply withdrawn by the cause and not used for causes stated intended purpose, or is simply withdrawn for personal use. This may include legal agreements, and systematic procedures, etc.

The system may, feasibly, use cookies, etc and other data to intelligently optimise user experience and show user new causes that may be similar to causes user has dispersed to. Such features may feasibly be optional, so that they can be turned off by a user. Thus if a user has dispersed to dog causes, system may intelligently display, or provide choice with regard to, causes that are intended to help animals, and the like.

A cause may, for example, be an entrepreneur who wishes to start up a company.

It is feasible that a small fee is exerted from the seller, cause, etc, for using the system, or simply that a very small fee from dispersements is retained by the provider.

If a smart device is used by a user to gain dispersement information, for example, showing a dispersement amount for an item 10, the smart device may be said to be a dispersement indicator 12, and may be a dispersement amount indicator 14. If it provides dispersement cause information, it may be a dispersement cause indicator 16.

The embodiments described above are provided by way of example only, and various other modifications will be apparent to persons skilled in the art without departing from the scope of the invention as described in the appended claims.

Preferably the system and/or platform and/or a brand is configured to disperse 33.3% (one third) of the profit generated from each sale of each item to a cause (or causes), with some interactivity from yourself, and often to causes in some way associated with the items or brand you're buying from. It can literally give people (το δημος) the Power (κρατος) to build buildings. Whilst 33.3% of profit is the preferable amount dispersed, any amount, or percentage may be dispersed.

One of the things' that's unique about it is that it preferably does this on a sale-by-sale level, and on a buyer-by-buyer level.

The user is at the centre of this experience—in its preferred embodiment, each user has their own user-interface (much like a Paypal account), where they can see all the items they've bought, see how much money (Power) they've dispersed, and in some cases, even make choices where dispersements (ie Power) goes, and choose interactive functions to stay in touch with the causes you've dispersed to (eg LINK).

It allows the user to create the world around them

The system preferably recognises each sold item on an individual level, and preferably recognises exactly which user has bought it.

The causes tend to be related to a particular community that's relevant to the brand the product is bought (purchased) from. (This may become important in terms of this new form of Democracy's ability to substantially (or wholly) immunize particular communities from Recession). Examples of this include a brand concept called 'Liverpool For Life' (a trademark of this applicant of a company of this applicant), where preferably 33.3% (or any amount) of all profit generated goes to various causes relevant to the city of Liverpool; a brand concept called 'ishine Baby' (ishine being a registered trademark of this applicant of a company of this applicant), where preferably 33.3% (or any amount) of all profit generated goes to causes associated with health and wellbeing of kids; and a brand concept called 'idog' (idog being a registered trademark of this applicant of a company of this applicant), where 33.3% of all profit generated goes to causes associated with dog and animal welfare.

The community of the brand can be a geographical location (such as a town or city you live in—e.g. 'Liverpool For Life'), or an abstract community (such as 'the animal-loving' community—e.g. idog, or the 'kid's health' community—e.g. 'ishine Baby').

In this new form of Democracy and/or selling (which may be claimed), simply buying an item is the equivalent of a vote, because the user disperses their power to a party or cause.

Over one individual purchase, or one individual's spending, the amount dispersed may seem very small. But over a whole community, or large amounts of spending, the amount dispersed can be vast.

A user's influence, in the preferred embodiments, directly correlates to the amount the user spends, but each person's experience is preferably highly individualized.

Amounts dispersed from purchases a user makes could lead to buildings being built, could lead to wild animals being helped or saved, or could even lead to an elderly person being given a frame to help her walk safely, when otherwise she would have fallen and got injured—all because the user bought a product that resulted in dispersement toward that particular cause.

It could also have huge benefits for disaster relief. [See disclosure of 'BIG PUSH (Disaster Relief)']

In this way, each individual of a community now has the power to govern, and make decisions that affect the community (whether it be a geographical or a virtual community), and the world around the user.

To recap how this works, in its preferred embodiment, this new form of Democracy hijacks the power of Capitalism by dispersing 33.3% (one third) of all profit generated from the sale of each item/product to a cause or causes—usually one that's relevant to a or the community of the user, but it does this in an extremely unusual way that gives the user a huge amount of power The whole thing is envisioned as running through a computer system.

The system preferably recognizes who's bought the item/product on a buyer by buyer level (because the user preferably needs an account in order to use it), and it preferably recognizes exactly what product's been bought on an product-by-product level. The product tends to be a physical item, but could be any product (eg service, piece of software, or any product at all).

Because such a huge amount of funding is dispersed (preferably one third of all profit), it literally gives the user the power to create the world around them.

The causes that are dispersed to are usually relevant to the brand the user's buying from, and are often relevant to the user's particular life and community. For example, if the user buys from the brand idog, for example, dispersements always go to causes related to dog and animal welfare (a virtual community, not limited to a geographical location, although it is feasible geographical location aspects may even be involved in dispersements from purchases from a virtual community brand—eg a user may be able to buy a product from the brand idog, and disperse funding towards dog and animal help in their particular geographical community. So may be the same for the brand ishine baby, where the brand may function in such a way that it supports child health and wellbeing (and abstract/virtual community not limited to geographical location), but perhaps, for example, in a particular geographical community (eg Liverpool) sales from ishine baby in that particular geographical community (or from members/citizens of that particular geographical community (eg online sales from such users, eg when logged in) may go specifically (or largely, or partly) to children's health and wellbeing cause(s) in that particular geographical community (ie Liverpool in this example). Since it's clear a user who buys from the brand idog is already a dog and animal lover (by virtue of being a dog owner, buying from idog), dispersements from buying products from that brand will always go to causes relevant to the passion of the user.

It works for geographical communities too—The main example shown will be a brand called Liverpool For Life, which disperses to causes associated with the city of Liverpool. Another example given will be a brand concept called SUN SHIINE® STATE (which disperses to causes associated with the state of Florida). (SHIINE® is a registered trademark of this applicant, or a company of this applicant).

In some cases, the user may get to choose which cause the amount goes to. Other times, it's pre-determined on a product-by-product level.

And there's a huge amount of room for interaction with the causes. All the information about every time a user buys, how much funding a user disperses/liberates, and each cause the user disperses to is preferably relayed to the user's account, which the user preferably can log into online. The account is preferably a platform-wide account, so that the user only needs one account to use this new form of Democracy, throughout multiple brands, with the brands preferably each being specific to a certain community (geographical and/or virtual/abstract). The user can preferably even optimize and personalise their account settings (eg PUSH function). So this new form of Democracy leverages the power of the Internet and Technology to create a new breed/brand of Democracy.

Buying a product is the equivalent of a vote—just like a vote in old (outdated) Democracy, it allows the user to apportion their power or decision(s) throughout society (and/or a particular community). But this time, no politicians are required—the user's power is syphoned directly into the social experience. And with this new form of Democracy, it's far more dynamic, and it happens far more often (every time you buy). 'Money is Power' never felt so good.

It goes without saying that social media (either traditional mediums or one created as part of, or for, this system) could play an important part in this.

Played out over an entire world or community, and the amount of power/influence generated may be vast; buildings may be built; you could save wild animals on the other side of the world; jobs could be created; a user could even buy an item that leads to funding going to a cause that helps the elderly—that could lead to an elderly woman with walking problems getting a walking frame to help her walk. That could lead to her avoiding an injury from a fall she would have had if she hadn't been given that walking frame—all because you dispersed towards that particular cause.

In a way, this is really a remembrance of what Democracy is—with an extremely modern twist. And because the poor outnumber the rich by so many, by sheer weight of number alone, the spending of the poor (and therefore the amount they disperse—ie their (Power/Influence)) far outweighs the rich.

It could also have huge benefits for disaster relief. [See disclosure relating to 'BIG PUSH (Disaster Relief)']. (BIG PUSH may feasibly be used for other important causes, not limited to disaster relief).

In this way, each individual of a community now has the power to govern, and make decisions that affect their community and the world around you.

In order to understand how this works, we need to look at some examples, but before that, we need to understand the concept of 'Buying in 3D'.

Buying in 3D

When a person buys an item/product, normally the person gets the item, and the seller gets their money for what you've bought.

This will now be referred to as '2 Dimensional Buying', because there are just two things going on: 1) Payment goes one way; and 2) The item/product goes the other.

Figure 17:
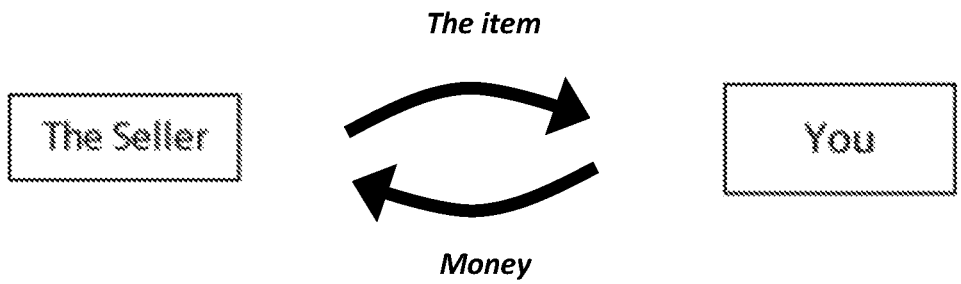
FIG. 17 is a basic representation of 2 dimensional buying.

So to put it in a basic graphic (as shown in FIG. 17), the person (The Buyer) gets the item, and (The Seller) gets money. The arrows clearly show a 2-way (or '2-dimensional) experience. The term 'You' in the Figures here represents the buyer. The term 'You', with reference to the Figures related to the present invention(s), may be taken as being a 'user'.

Figure 18:
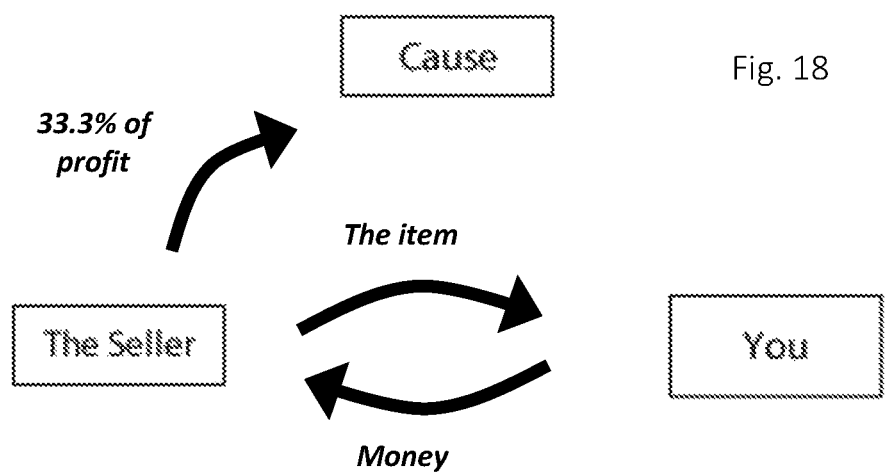
FIG. 18 is the same representation as FIG. 17, wherein a portion of profit generated from a sale is dispersed to a cause, forming the beginning of a '$3^{rd}$ dimension'.

That's not how things work with this new form of Democracy. With this new form of Democracy, preferably 33.3% (one third), in its preferred embodiment, of all profit generated from the sale of the item/product is dispersed to a cause. (Shown in FIG. 18)

Figure 19:
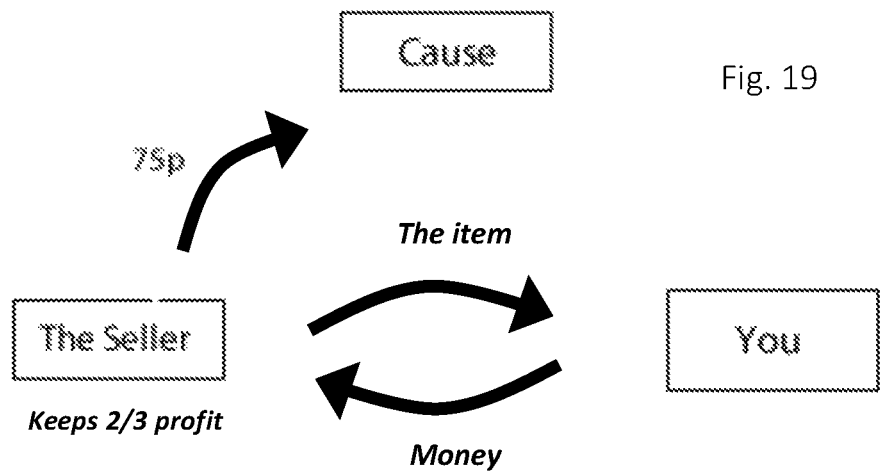
FIG. 19 is the same representation as FIG. 18, wherein the portion amounts to 75*p*.
Figure 20:
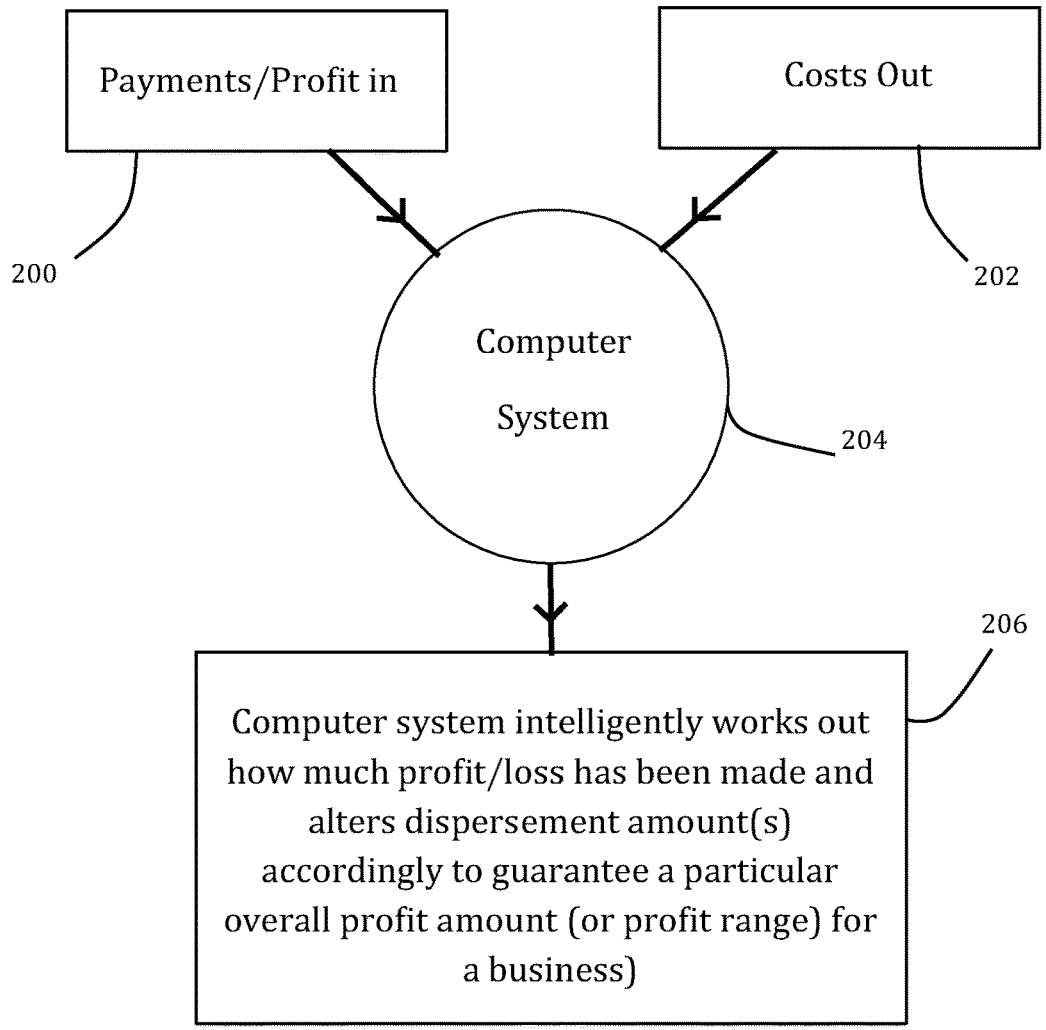
FIG. 20 is a basic flow chart of how a computer system can intelligently guarantee a particular profit or profit range for a business (or any party using the system for selling)

Taking an example that the item/product sells for £6, and that it's been worked out that it generates £2.25 profit for the Seller when it's sold. Because 33.3% of all profit goes to the cause, that means one third of the £2.25 profit goes to the cause. 33.3% (one third) of £2.25 is 75p, so 75p is dispersed to the cause when it's sold. (Shown in FIG. 19). (33.3% is a preferred embodiment, but this new form of Democracy may feasibly disperse 100% of profit, and/or may feasibly run non-profit, so that no profit is generated from the product being sold and/or is generated by the overall brand and/or business and/or platform that uses this new form of Democracy, and/or so that a pre-determined amount of profit is generated by the overall brand and/or business and/or platform that uses this new form of Democracy. This 'pre-determined' amount of profit (or no profit) may be programmed into the platform and/or (back-end) computer system of this new form of Democracy (or any concept related to it, or not so), so that the platform and/or brand(s) computer system intelligently and/or automatedly makes sure a certain profit amount id generated for the platform and/or brand(s). This may be used, for example, to make sure a business only makes, for example £5 Million profit per year (or any profit amount, or any profit range), or, for example, to balance the books of a business, especially if the business is running non-profit. This is shown in FIG. 20, where it is shown a computer system(s) of the platform and/or brand(s) (or any party using the new form of Democracy) can program the system so that it intelligently guarantees a particular profit or profit range for the business. There is shown a 'payment/profit in' input 200, which represents that the computer system receives data relating to how much money and/or profit the platform and/or brand(s) and/or business has received; there is shown a 'costs out' input 202, which represents that the computer system receives data relating to how much money has gone out/been lost by the platform and/or brand(s) and/or business (examples may include staffing costs, for example, bills, or any other outgoing costs); there is shown the computer system 204, which may represent any computerized and/or programmed system(s) (not limited to hardware) of the platform and/or brand(s) and/or business that are configured to execute the shown process, and there is shown a result 206, where the computer system(s) alter dispersement amount(s) to guarantee a profit result. For example, once the computer system(s) works out the platform and/or brand(s) and/or business has generated £5 Million profit for that year, the dispersement amount(s) from selling a product may go all the way up to 100%, so that no more profit is generated. Or the system may configure profits to simply be lessened (eg more profit and/or amount from (each) sale is dispersed to cause(s). This may include fairly complex computation(s) related to expected (or previous) outgoing cost(s) over a future time, and may include repetitive monitoring by the system to repetitively check on profit generated (or expected future profit generated), dependent on (external) factors which may or may not include: how many product(s) are being sold; further data being received relating to outgoing costs, etc. Thus the new form of Democracy may further comprise using data to guarantee a particular profit or profit range not being exceeded by the platform and/or brand(s) and/or business (eg annually).

Figure 21:
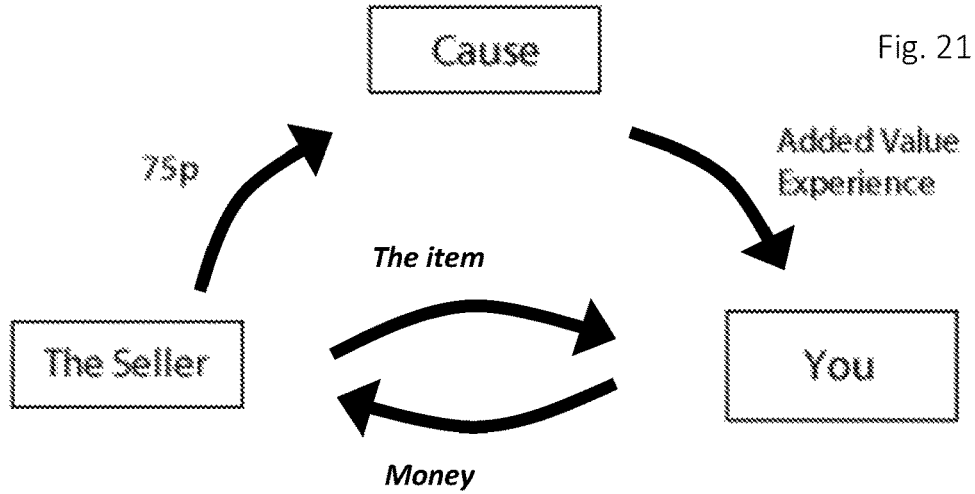
FIG. 21 is a similar representation as FIG. 19, wherein an 'added value experience' for the buyer with relation to the cause is denoted.

With this new form of Democracy, there is an 'added value experience' for the buyer/user in the relationship they have with the cause (shown in FIG. 21), because the cause (and therefore dispersement to the cause) tends to in some way affect the society, or more particularly, to affect a community, relevant to the buyer/user. The community benefitting is often related in some way to the type of item/product sold, and there may be provided ways (ie 'means) for the user to become interactively involved with the cause. (eg LINK)

This creates (or opens up the door to) an 'added value experience' for the buyer/user, completing a circle—it's as if the Buyer is 'buying in 3D'. (Shown in FIG. 21, the arrows denote a cyclic sequence).

Figure 26:
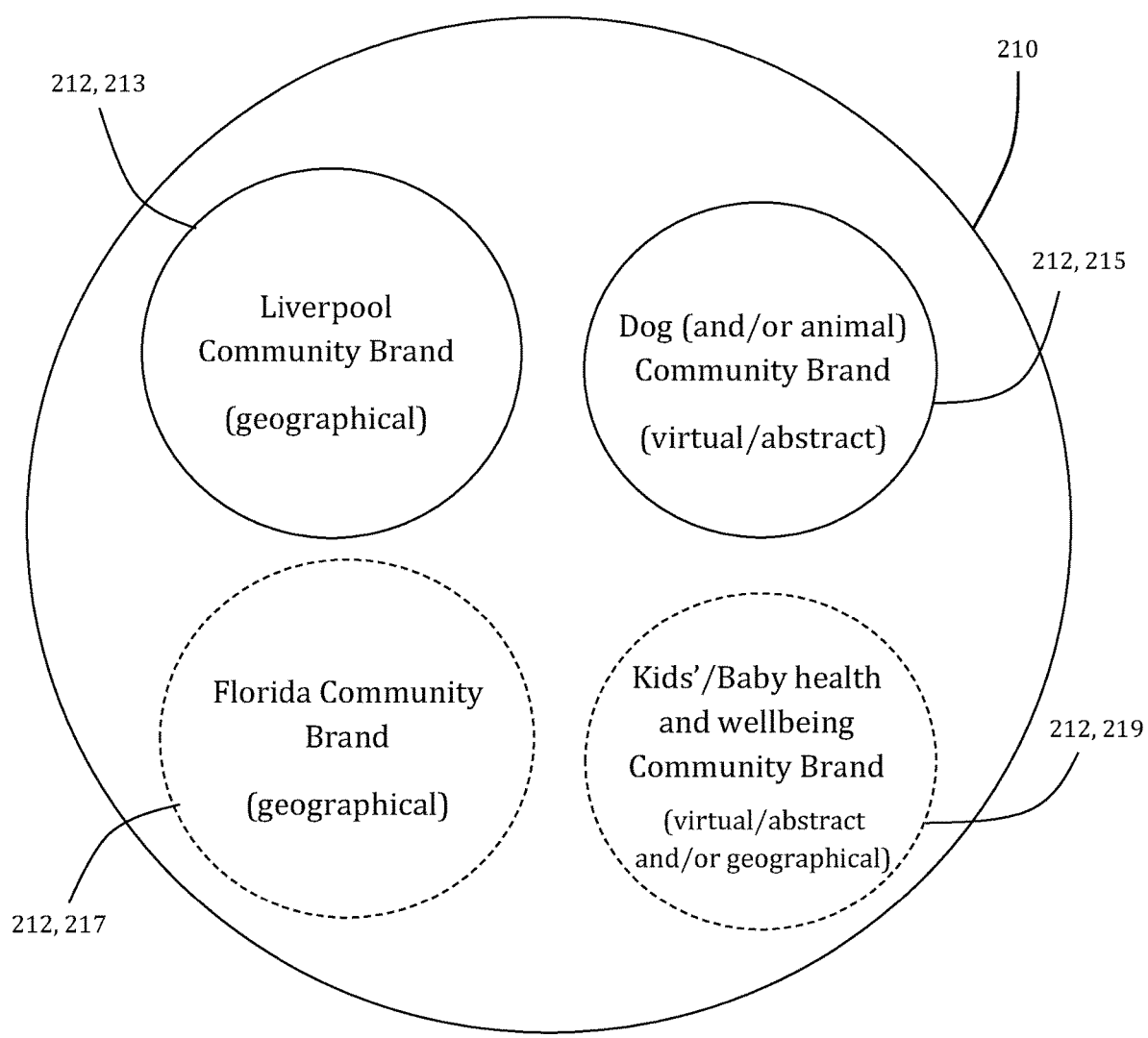
FIG. 26 is a representation of a platform, comprising a plurality of brands, each of the brands being related to a specific community.

FIG. 26 shows a circle/closed system has formed (denoted by the arrows), showing symbiosis between Buyer (user), Seller, and Cause. The circle is completed with the arrow on the right side, with the Buyer experiencing an 'Added Value Experience', which may simply be an emotional benefit in helping a cause, but which may be accentuated if the user interacts with the cause and/or if the cause is relevant to a particular (eg geographical) community of the user/buyer.

In some cases, the added value experience may be more important or motivational to the Buyer/user than the item itself. The user does not always need to be a buyer in all aspects of the invention, as will be shown with regard to the PUSH function, which can be initiated without a purchase being made.

The dispersement of this Power (money) may happen in real-time, via computer systems/technology. This is potentially important, because experience of the Buyer/user is heightened if the world is being changed in real-time as the purchase/cause decision is made.

If the cause the dispersement goes to is pre-determined, (ie the dispersement liberated from sale of the item goes to the cause without any choice from you), the item is said to have a 'set cause', or the cause may be referred to as a 'set cause'.

Causes may have 'missions', and are preferably 'mission-based', so that all dispersements made to them go towards 'completing their mission'. In this sense, the invention may act a little like crowdfunding. This serves several important benefits; firstly, if the cause is 'mission-based', then it's obvious to you exactly what your money is going towards (rather than just a vague notion and never quite knowing); secondly, if all the funding is going to the 'mission' the cause has designated, it's easier to police the system to make sure that all the funding liberated goes to the cause.

The system for selling (or any invention included in this application) may comprise a system to make sure the cause is using the money correctly to complete their mission, rather than wasting it (or even fraudulently using it for an alternate purpose). This may be carried out by an escrow system for example. One example of an escrow system may be where the dispersement is syphoned into an account that the cause themselves cannot access (or at least cannot access whilst dispersements are being made. Perhaps once the mission total is achieved, only then can the money be accessed. However, even at that point, it may be that the cause cannot access the money, and it may be that the money goes then directly to the appropriate parties who will be paid to carry out the mission. (eg a tennis court repairer if the cause is to repair a tennis court). Thus it is feasible the cause themselves (or cause 'owner') never themselves gains access to the dispersement money, and may never themselves gets paid. This may prevent fraudulent stealing or wasting of dispersement money.

Dispersements amount may be paid into a bank account. Thus it is feasible, in one embodiment of the system, that the dispersements for a cause mission are paid into a bank account.

Thus in this, or any other embodiment, the Cause may not be able to access their funding until the mission amount has been met.

Missions may also incentivize users to disperse to the cause in order to help the cause complete its mission (it may require a certain amount of money being raised, and users may be able to see how close the cause is to achieving its target amount, or 'mission amount', a bit like Crowdfunding). In that sense, this new form of Democracy, in one shape or form, may, with respect to certain aspects, be seen as a type of (or related to) crowdfunding.

Dispersement may happen in real-time, (or substantially in real-time, such that it is carried out at the first available opportunity). Dispersement (which may also be referred to as 'funding') may be carried out at the first possible opportunity (which may be immediately) after a user has chosen a cause (if there's a cause choice).

EXAMPLE

Liverpool for Life™

Liverpool For Life™ is a community brand, shown by way of example, to show the invention (and/or this new form of Democracy) in action, by way of example only. It's primarily a clothing brand but not necessarily limited to clothing. It may sell other (eg household) items.

The community it supports is Liverpool, England, UK.

Liverpool's a unique city in that it's large, (with a population of around 465,000 in its city area), but has a powerful community spirit that's usually reserved for much smaller towns. Because of this, Iterative™ Democracy starts here.

Buying a Liverpool For Life™ item results (in this example) in 33.3% of profit generated from the sale of that item being dispersed to a cause(s) associated with Liverpool. There could be many many causes associated with the brand, and many many items to buy.

Many of the items preferably have a set cause associated with them (ie when the user buys the item, the dispersement amount goes to a pre-determined cause, without the user having to make a cause choice); some items may have several (or more) causes associated with them, giving the user the chance to make a cause choice when the user buys the item. (Preferably the user can alter their account settings to avoid this (ie having to make a choice).

The Liverpool For Life™ range may include a huge amount of items. In FIG. 4, there is shown a baseball cap that may form part of the clothing range. But there may be a whole range of clothing items, such as a shirt(s), tracksuit trouser(s), etc (and/or products not limited to being clothing).

Different causes may be associated with different items, with some items having set causes and some items initiating a cause choice from the buyer/user). It's feasible (though not preferred) that items may have a different dispersement percentages associated with them—eg buying the cap may liberate 25% of profit generated from its sale, whereas, for example, 50% of profit may be liberated (ie made available to be dispersed to a cause(s)) when you buy the shirt. These different dispersement percentages (or even dispersement amounts, since the system is not limited to functioning via percentage dispersements), may be denoted to a user/buyer via a tag 12, 13, 14, or the like, or information on a webpage, for example.

In a preferred embodiment, 33% of profit is liberated. Thus, for example (taken as an example), If a user buys the shirt, 33.3% of profit generated from its sale goes to cause(s) associated with helping the elderly in Liverpool; if user buys the baseball cap, 33.3% of profit generated from its sale goes to keeping the streets of Liverpool clean, and if user buys the Liverpool 04 Life™ tracksuit trousers, there may be a cause choice, where you get to choose between three causes to disperse to, with 33.3% of profit generated from the sale going to whichever cause(s) the user chooses. (The platform and/or computer may make the choice for the user, or disperse between all causes (or any other cause) if the choice is not made by the user).

Because of the nature of the preferred method of selling (where a percentage of profit is dispersed to a cause(s)), it may be easiest (or necessary) to implement the system when:

1) the items are sold via a website owned by the brand; or
2) the items are sold in a shop owned by the brand.

(ie that the items are not sold through a $3^{rd}$ party sales outlet).

If the items are sold by a $3^{rd}$ party seller (for example, a high-street retailer who stocks the Liverpool For Life™ items), it may complicate calculations as to what profit is generated from sale of the item. It may also significantly lessen dispersements for each sale of an item, may lead to set amounts (rather than percentages) having to be dispersed to causes, and may make it impossible to implement dispersing to causes in real-time.]

Basic Example of a Liverpool For Life™ Item Being Sold

In this example, the baseball cap shown in FIG. 4 retails for £6.99.

It's been worked out that if it sells, it generates £2.70 profit. This data may be inputted into the computer of the platform and/or brand(s). Alternatively, it is feasible data may be inputted into the computer system (of the business and/or brand and/or platform) that allows the computer to calculate the amount of profit generated from the sale of a particular product(s). eg cost price of the product, plus sales price, may be inputted into the computer (which may also be referred (and/or claimed as) a 'machine', which is a general term including, but not limited to, all computation aspects or algorithms and/or programs, (including but not limited to hardware(s) and/or software(s)) or the like which facilitate computation).

The baseball cap can be seen with a tag 12, 13 on it.

The tag (seen in close-up) says '25' (signifying that you liberate 25% of profit generated from sale of the cap when you buy it). However, for the present example, we will imagine the tag says '33.3' on it.

And the tag also shows the cause dispersed to when the cap is bought (Liverpool For Life™ Street Clean). (This may be fluidly changeable by the system, such that the system can change the cause that is dispersed to when the product is sold). So this is an item that has a set cause associated with it that's always dispersed to when the item sells-you don't make a choice with this one. If bought online, all this information may be displayed on the webpage with the item. This tag concept is shown by way of example only. T may be that a code or scan-able element, for example, is provided. This may, for example, allow a user to use a smart device (such as a smartphone, or a tablet, for example) to view information relating to what cause is dispersed to.

It's possible the items may also have a QR code (or the like, or any means to facilitate providing of extra information to the user (especially via video, and especially on a smart device such as a smart phone)) which can initiate a cause video on a smartphone of the potential Buyer). Cause videos certainly may be shown on internet sites for product(s)).

When the user buys the cap, 33.3% of -2.70 (90p) is dispersed (preferably immediately or at the earliest opportunity) to the Liverpool For Life™ street clean cause. This could go towards things like buying new cleaning equipment (such as cutting edge machinery), advertising to promote keeping the streets clean, staff costs (eg staff to clean street, or any other associated staff related to the cause of cleaning the streets), etc. It may be possible for the user to play an interactive part in what the money is spent on, and may be possible for the user to follow their dispersement and see exactly the change it makes. (eg LINK function).

Certain computer systems/software/coding etc may be required to carry such functions and/or dispersement(s) out.

This was a simple example, and one where a brand supported a physical community (the city of Liverpool).

But this new form of Democracy can also support communities not defined by physical location; for example, one brand, Idog™, preferably intelligently disperses 33.3% of all profit (or any amount) generated from sale of each item to dog and animal causes, thereby supporting the 'virtual' community of the animal and dog loving world. That is a worldwide community of hundreds of millions of people.

And one brand, ishine Baby, preferably disperses 33.3% of all profit (or any amount) generated from each item to causes associated with kids' health and wellbeing. (Parents are thus able to buy baby clothes (and other baby items) and at the same disperse money to kids' health and wellbeing causes, helping kids all over the world?). That is a worldwide community of hundreds of millions.

Example of a User Account (Getting Set Up)

In order to start, preferably user needs to set up an account, which is preferably set up online. Just like setting up a Paypal, Ebay, or Amazon account, user may just give your email address, and create a password. (System alerts and notifications may be sent to the email user gives). More information (such as address and/or bank details, etc, may be required).

User may also have a more personal username, which will be the name user wants to be called by. User might be given some options as colloquialisms for your full name. So if user's name is Robert, user may get options like 'Bob', etc.

Purchases Logged

Every purchase user makes (every single item/product) is preferably logged and relayed straight to user's account. It may be similar to having a Paypal account and being able to view all transactions—user is preferably able to view their purchases, see how much they've dispersed, check their monthly totals, and even interact with the causes they've dispersed to. (eg be able to choose to LINK or PUSH a cause, from within their user account—eg by clicking a button (or selecting an option) next to, for example, a previous transaction, where they dispersed to a cause).

In order to do this, the system would need to know what user has bought (ie what products), and which use it is that's bought the item/product.

The system can achieve this because each item (or type of item) preferably has a code* (or any other recognizing means and/or method) that's recognized by the system when it's sold (a bit like swiping an item at the supermarket), and each user preferably is individually recognized by the system when a purchase is made (preferably via use of information from the user's user account, although any recognizing means or method may be used and/or any information may be used, not limited to information stored as part of the user's account)*. (One possible recognizing means may be that the system is able to associate (or allow the user to associate) bank account(s) (or any payment method) with their user account, or have its own bank account system). Thus when a payment method is used by the user to buy a product(s), the system may be able to recognize who the user is by virtue of the payment details and/or bank details, etc.

Thus the system, in is preferred embodiment, comprising a recognizing system to recognize the item that is sold. (or at least the 'type' of item that i sold, as same type items may simply be of different colour (for example), or size (for example), but have the same dispersements amounts, price, etc. In its preferred embodiment, it also comprises a recognizing system for recognizing who the buyer of the item is.

(With reference to the term 'recognizing system', the word 'system' includes any solution under the Sun to facilitate recognizing. Therefore within the definition of a solution for recognizing, the term 'system' should be read as an infinitely broad term).

If user is purchasing or acting online, it is preferably possible to sign in to their user account on any website that's selling product(s) related to this method of selling (or providing any aspects related to this invention (such as PUSH function, etc). Thus the recognizing means may simply be provided by way of the user signing in to their account before taking an action and/or making a payment.

However, user may pay for these items in cash or card at a retail outlet (eg store)—this may require a different recognizing system. One solution may be to provide user with a card.

Thus, as part of user setting up an account, user may have to give some basic information, (such as home address, for example), so user can be sent a card.

The card may be important for when user makes purchases in cash at shops (or for any other reason and/or purchase(s))—user may be able to swipe the card over the scanner at the till, for example, and the system may then recognize the user that bought the items, via the card. It's also possible user may in fact be able to pay with the card. (ie it could act as a recognizing system (or part of one), and/or as part of a bank system itself).

Once user pays (and is recognized as the buyer), the system can send information about the purchase to the user's account (preferably immediately or at the earliest time possible.

Integration with Bank Accounts

It's possible user may be able to integrate their user account with their bank account(s) or other payment methods—potentially as many as user likes. This is not limited to traditional bank accounts—user may, for example, be able to integrate a PayPal account, or a credit card, for example.

As an example of how this could work, when user sets up their account, they may be asked/required/able to input details of your bank account(s). The banks card(s) and/or account(s) and/or PayPal account(s,) etc that user has associated with that account may be synchronized (sync'd) with user's account (and/or vice versa). It is feasible user may be able to choose individual bank cards to associate, if desired.

Now that accounts, etc are integrated, and user has the/a card, all the purchases user makes via the card can be (and preferably are) relayed to user's account so user can view them. This type of integration is not limited to including (and being used via) the card—for example, once user has a user account, user may be able to simply sign in to the account on any website (or the like) selling items using this system, and if user buys items whilst signed in, the same (or substantially the same) process may take place, whereby user is recognized as the buyer, and the information is relayed to the user's account.

The system (ie the present invention), could comprise its own bank system, which banking system may comprise the card as part of a payment system. (eg functioning similarly to any bank card/debit card/credit card].

To give an idea of a part of the screen user may be able to see when user logs in to user account, user may see listed items that user has bought—eg a Liverpool For Life™ cap, a pack of Dogi™ treats from Idog®, and a pair of kids pyjamas from Ishine® Baby in the last few days (and a few other items in the days before).

Preferably user can see how much was dispersed, what percentage of profit (and/or amount) was dispersed, and the cause(s) the funds were dispersed to. Preferably user can see/view more information about any cause and/or its cause mission. There may be an option to view this further information, which may be provided by video. There may be provided a breakdown of how much dispersement went to any PUSH cause (The PUSH function will be discussed further shortly), and there may be provided further information about the PUSH cause (or a means to access further information), preferably via video.

User may see on user account that the kids pyjamas have a red alert under the cause column. This is preferably an indicating means (just one example) that user has a cause choice to make. User may be able to to find out more about the causes, possibly even watch cause videos explaining about each cause and what their mission is (to which user dispersement will go if user chooses them). Then user can choose which cause to disperse the money to. If a cause choice is not made (within, for example, a certain time parameter), the system itself may, (preferably intelligently) decide how the dispersement is apportioned to the or any causes.

User may also be able to watch cause videos about the causes user has already dispersed to.

But the user account is preferably not just about viewing purchases; user can also preferably see a LINK option, and/or a PUSH option. PUSH is one of the most powerful functions of the whole system.

Examples of LINK Function

When user liberates a dispersement amount to a cause (particularly when it's a cause user has made a cause choice to disperse to), user may get a chance to 'LINK' with that cause. The LINK function links the user with the cause and allows the user to receive updates and/or be updated as to how the cause (and the cause mission) is going. It could also open up other interactive features. It could provide other functions/benefits too, such as notice of future missions for that cause, possibly forums, interaction with other LINKers to that cause, maybe even voting on future missions.

Preferably the LINK option to LINK to a cause is only provided once the cause has been dispersed to by the user. However, it is very possible the LINK option may be provided irrespective of whether a cause has been dispersed to, or that limited interaction may be provided via the LINK function to a user, until the user has dispersed to the cause, at which point they might receive for more interactional possibilities and/or updates regarding the cause and/or mission(s) (including future mission(s)) of the cause.

At the very least, preferably user gets a (preferably video) update once the cause mission is complete, or perhaps when important milestone(s) are reached. A milestone may be the target amount of the cause/mission being reached. A milestone may be the mission of the cause being completed.

This adds a level of interactivity/connectedness. It allows the user to see how their money (ie funding/dispersement) has been spent, and what it's been spent on. It also allows the user to see how their action is affecting society around them.

Example 1

Jungle Lookout Towers

If a user has bought an item/product from the Idog® brand* (Note: it is feasible cause choice may be done on an item by item basis, or on a shop-by-shop basis, or on any other basis. Thus it is feasible, rather than each item having a cause or cause choice, that a user completes a whole shop, and may then decide (or have apportioned) a cause or causes that the dispersement(s) from that whole shop (ie everything that is bought in that shopping experience) go to). and that buying that item initiated a cause choice. As an example, amongst a choice of causes, a user chooses to disperse to a cause to build lookout towers in the African jungle to stop chimpanzees and gorillas being poached. The cause video convinced the user to disperse to this cause, showing how these lookout towers at various entry points of the jungle would make it hard for poachers to get into important areas where they've been poaching from. The user made a choice to disperse to that cause.

Once the cause has been dispersed to, an option to LINK with the cause will preferably be given to the user. If user has bought the item(s) online, this may appear as a pop-up screen on your computer immediately. If user has bought from a shop, the option may be given to you there and then, or more likely the choice may/will be accessible to user later via user account, and usermay receive an alert (eg email alert) to alert user to the fact user can LINK with that cause.

If user has sync'd mobile phone or smart device (tablet/laptop, etc), a LINK alert could be sent to user's smart device, e.g. via email, or appearing on a computer screen/monitor. An example of this (a screen 300 showing an option to LINK 302 to the Jungle Lookout Tower cause) is shown in FIG. 22).

Figure 22:
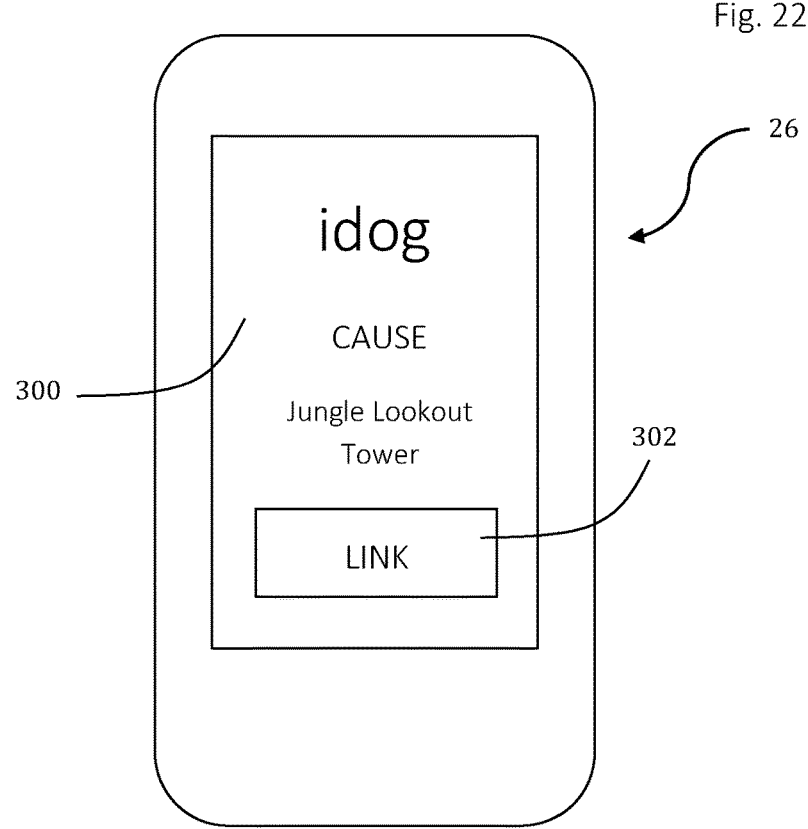
FIG. 22 shows a basic representation of a possible user experience for how to LINK to a cause via a smartphone, for example.

If user chooses to LINK with the cause (which user may be able to do just by clicking/selecting the LINK button 302 in the example as shown in FIG. 22), (but may also be able to do, for example by clicking a link, on a webpage/inside user's account, or any other way), user is preferably sent important update(s) as the cause progresses, or when the mission is complete. There could be social media interaction too, so user can involve user's friends or even be in touch with other users who have dispersed to, and who are LINKers with, the cause. LINKers may even be shown equipment, building work, etc after the mission amount is raised, and/or the mission is complete.

Four months after having bought the Idog® item, user may be walking down the street, and may get an alert on their smartphone. (which may have an App installed, which may facilitate use of or interaction with this computer implemented method/system, or user may have sync'd their smart device (eg smartphone) to their user account) [the link may also be sent via email]. (Thus there may be provided an App (application) for a smart device, etc to facilitate use and/or linking of the smart device (eg smartphone) with the user's account and/or experience). With or without the App, it is feasible the smart device (eg a smartphone) may be usable as a payment method—eg it may be possible to pay for items via the smart device (eg preferably a smartphone), which may feasibly be done in a not dissimilar way to using a credit card. This may require a login, whereby user must input password (and may also require username, or the like).

The alert has may have a link in it. The link may take user to a video (eg on or via a webpage). The video may show an African wildlife reserve keeper saying thankyou to all those who dispersed to the cause, and showing you the result—the four lookout towers that have been built and are now successfully helping stop poachers from poaching Chimpanzees and Gorillas, with an update on a new baby gorilla that's been born in the reserve. User may get to see the whole interior of the lookout towers.

Example 2

Liverpool For Life™ Baseball Cap

Earlier was disclosed an example of buying a Liverpool For Life™ baseball cap (a brand specific to the community of Liverpool). For the sake of example, we will suppose the cap cost £6.99 and generated £2.70 profit, with one third of that (90p) going to its set cause, Liverpool For Life™ Street Clean. Thus 90p has been liberated to Liverpool For Life™ Street Clean—helping keep the streets of Liverpool clean. Now we will imagine the user LINKS to that cause.

Once user has LINK'd, user may get more updates, such as updates showing the equipment user's funding (ie dispersement) has bought, giving information if the money has gone towards wages, etc. User may gain access to archive information on that cause, and what funding has been spent on (and how it was spent in the past.

There may be an interactive entrepreneurial element to this; for example, user may be able to choose where user's funding goes. This could be done on an individual level, but it could also be done on a group level; for example, perhaps it's made clear what amount has been dispersed to the Liverpool For Life™ Street Clean cause that month/week/year, etc, and perhaps user has to vote on what this money/funding is used for. For example, perhaps there's an excess of available funding this month, or saved throughout the year. Now perhaps user get to choose whether to:
1) Buy a new high-tech street sweeping machine with ultra cool new technology
2) Take on a new member(s) of staff—maybe that would be of more use to keep the streets clean . . . .
3) Use the money on an advertising campaign—maybe on advertisements throughout the city asking passers-by to throw away their mess and bubble-gum in the bin, rather than leaving it on the street User may now be involved in budgeting.

User may not want to be prompted to LINK every time you disperse to a cause. Thus user may be able to personalise and optimise settings from inside (or via) their user account.

Altering Settings Inside User Account

Some users may want a very interactive experience. Some may not. If user wants, user may be able to alter their settings in their user account to change their user experience.

If user doesn't like constantly being asked whether they want to LINK with a cause, and doesn't like having to make cause choices, user may be able to alter that in user account via user's account settings.

For example, user may be able to switch off LINK requests, which means user will never be prompted to LINK to a cause once user has dispersed to it. (User may still be able to manually LINK via user account to any cause, it just means user will not be constantly bothered by prompts to LINK for every single cause once you've dispersed to them).

And user may also be able to alter settings so that user doesn't have to make cause choices. In terms of user's overall setting, there may be provided two main settings options—OPEN, and AUTO.

OPEN:

OPEN may be the default—it means all options are 'OPEN', so every time there's a cause choice, user may or will be able to make a choice.

AUTO:

AUTO is preferably the opposite—it means choices are made automatically for the user. So user will not have to make cause choices at all—the system will automatically make them for then user. This may be done intelligently by the system, which may require significant back-end programming, coding, etc. Algorithms may be set up so that the system can decide how dispersements should be apportioned to different causes, and how much should be apportioned to each cause(s)].

User may be able to make changes globally to user account, but also locally. For example, if user does not like making cause choices (so user wants to set user's account to AUTO), but user loves dogs, and because of that, user want a more interactive experience when user buys items from Idog® (so user wants to have user account setting as OPEN when user buys from Idog®). That's no problem—user can have user's overall global setting for user's account on AUTO (so user won't have to make any cause choices), but user can change user's local setting on Idog® (or for any other brand(s)) to OPEN (so that user gets to make cause choices, and have a more interactive experience when buying from that brand). Thus settings may be alterable locally, and may be alterable on a 'brand' level, and/or on a 'community' (ie dog-loving community) level.

Similarly, user may not like getting constant prompts to LINK, but because of user's love of animals, yuser may want to keep LINK prompts on for causes dispersed to when user buys from Idog®. Thus user may be able to switch off LINK prompts globally, and to then alter user settings locally so user gets LINK prompts when user buys Idog® items. This preferably can all be done via user's account, and/or in any other way.

Examples of PUSH Function

The PUSH function is an extremely powerful function of this computer implemented method. When user PUSHes a cause, it biases user's account and/or dispersement patterns to to disperse a portion or a whole of user dispersement(s) to that cause. This can be a small amount for one person over one sale (perhaps pennies), but over a whole community of a great size, it can have a huge effect. Thus in certain examples of the PUSH function, it is like the user giving 'extra help' to that cause.

If user is PUSH'ing a cause, even if user buys an item totally unrelated to that cause (eg from a brand that has nothing to do with it), some of the profit generated from buying that item may be dispersed to your PUSH cause. This may depend on the type of PUSH. There may, for example, a something called a 'brand-local' PUSH, wherein a portion or a whole of any dispersement(s) liberated by the user are only dispersed to the PUSH'd cause if the product(s) purchased that liberated the dispersement(s) are from the same brand and/or community as the PUSH'd cause. (eg the PUSH'd cause is related to the specific community of Liverpool, and the brand purchased from was Liverpool For Life™. A different type of PUSH would be a 'global' PUSH, which would mean that whatever brand a product is purchased from, if it liberates a dispersement to a cause, a portion or a whole of such dispersements (either at time of purchase/dispersement, or at a later point once dispersement(s) have been tallied or stored by the system) is dispersed towards the PUSH'd cause.

A type of PUSH that would be intermediate between these two options (ie between 'brand local' and 'global') would be a 'multi-brand' PUSH, where a portion or a whole of user's dispersements are dispersed to the PUSH'd cause when they purchase from certain brands within the system, but not others. The term 'brand global' PUSH may also be used instead of just 'global' PUSH.

PUSH'ing a cause is usually or often done without there even being a sale in the first place. (ie without any spending).

Rather than PUSH being done on an item-by-item level (where a small portion of the dispersement amount from one item is PUSH'd towards the PUSH cause(s), it's feasible it may be done on a different level—eg a portion of one spend, or as a portion of user's monthly dispersements (or any other time scale, eg week, every 2 weeks, etc).

(It's feasible 'PUSH'ing could be done by a way other than via a small portion of your dispersement(s) going to that cause). Eg, items could have a bonus PUSH amount apportioned to them, or the system could apportion a PUSH amount for a user, which may be worked out dependent on certain (preferably spending) factors.

The best way to understand the PUSH function, to see it in action. Here are provided several examples.

Example 1

Library Audiobook Wing

In FIG. 13, there is shown a donation pot at a public library in Cambridge, United Kingdom. It is intended to make people donate and put money into the box. This is an extremely unsuccessful way of generating funds. Extremely small amounts are placed into the pot, which hardly grows from week to week, month to month. The donation pot is located near to the exit of the library, to increase likelihood it will be seen when people leave, but it's nearly always ignored or avoided.

This is a popular library, but almost no donations are made. Here are several reasons why this donation system fails:

Forcing the person to think, and take significant action: ie activate their mind and reach into their pocket to get change The psychological effect of spending outside of your normal spending: people don't like losing money.

You've got to have money on you: people might not have change on them.

You don't know where your money's going: no interactional element where you see the result of any donation you make, or exactly what it will go towards.

Figure 23:
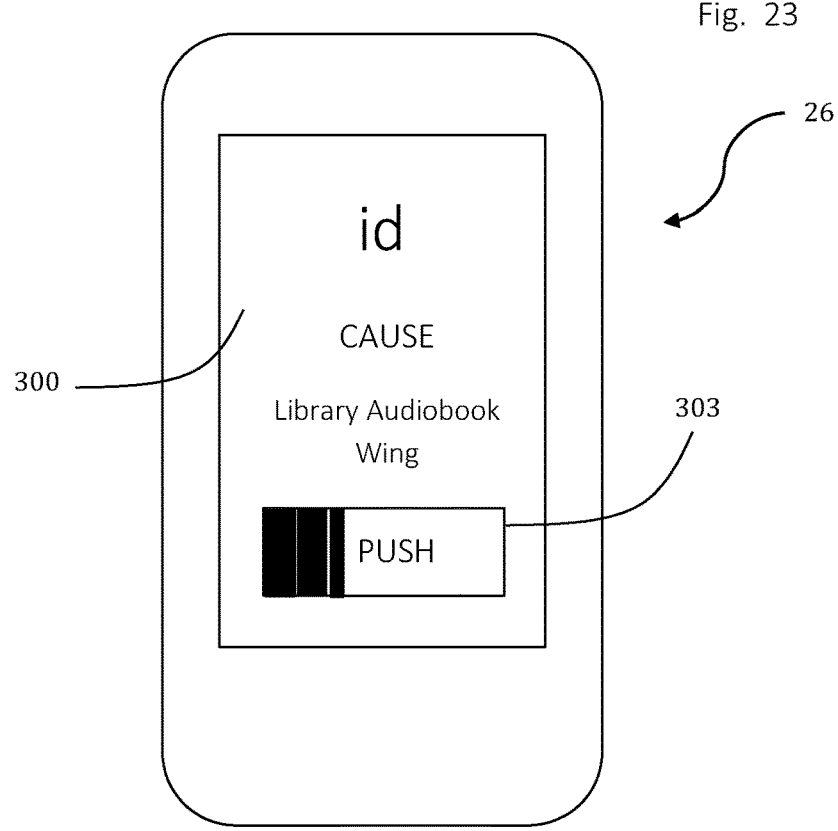
FIG. 23 shows a possible user interface a user may be presented with on, for example, a smartphone, when initiating the PUSH function as shown in FIG. 32.

There is shown in FIG. 14 a basic example of how an embodiment of the PUSH function may work, replacing library pot. The representation in FIG. 14 is intended to show the same scene as where the donation pot previously was. It could be located in exactly the same location, by the exit of the library. But there's no pot.

Where there used to be a poster ad saying 'SUPPORT YOUR LIBRARY SERVICE', with a girl reading, there's now a poster ad with an old-fashioned, slightly humorous looking man (possibly with a monocle), which says "PUSH US OVER THE EDGE DEAR CHAP!!", and a message underneath, which says "Push our cause to create a new audiobook wing. Link up". So you now know exactly where any money will go—toward building a whole new audiobook wing, which you might benefit from, or be interested in seeing happen. There's an icon just to the right of that, which says PUSH, which has a scan-able part (ie any element you can use that interacts with a smart device), just to the right of the word PUSH. User can just run, scan, swipe, or hold your smartphone over the scan-able part (or in any way engage it), eg engaging the scan-able/interactive element with the camera of the smartphone or smart device) and preferably without further action needed, user will preferably be asked whether user wants to PUSH the Library Audiobook Wing cause. There is shown in FIG. 23 an example embodiment of what may appear on the smart device/smartphone. (It is feasible an App (eg a scanning app and/or an app specific to this computer implemented method for dispersing funding, (ie an app relevant to and/or tailored for this system) may be required to achieve this).

The user may be able to move the left shaded part on the left side of the PUSH bar 303 at the bottom of the screen by holding a thumb (or finger) over it, and 'swiping' the thumb (or finger) from the left of the bar to the right. When this is done, a new screen may appear, stating words to the effect of that the user has PUSH'd the cause. This is just one example—any button or any means or any method may be provided.

User may be able to see a cause video before deciding whether to PUSH, (This video (or any information) about the cause may be viewable on a smartphone/smartdevice, and access to it may be facilitated by interacting the phone the interactive/scan-able element), or some more information about the cause and its mission. It may be required that a password is inputted in order to PUSH in this way, to prevent anyone stealing someone's phone and using it to miscellaneously PUSH a cause without consent of the true user account holder and/or smartphone owner.

The phone, in one way or another, is preferably sync'd with the user's account, so details that the user has PUSH'd this cause may then be relayed to the user's iaccount. (This may require an internet connection, thus the phone/smartdevice may be internet connected. Such internet connection may be required to relay the information to the user's account and/or simply to execute the PUSH command (or other commands, such as LINK). It is feasible, even if the device is offline, that the setting may be saved and/or stored by the system so that, once internet connection has been re-established, the command(s)/information can be relayed to the user's account. Alternatively, technology may be used so that an internet connection for the user is not required—for example, the user may PUSH a cause using their smartdevice when offline. This information may, in some other way, be sent to the system (eg to a system mainframe), which may then relay the information to the user's account (via internet connection or any other means). Mobile phone network(s), for example, may be leveraged to facilitate flow of such information from a user's smartphone to the system (eg a system mainframe), which mainframe may then be able to dynamically relay the information to user accounts. This is just an example.

In order to activate the PUSH function like this, user may need to download an App, or some sort of scanning technology and/or Iterative™ Democracy scanning technology so your phone can carry this out. If user has not already got this on user's phone, there is shown by way of example, in FIG. 14, below the PUSH icon, another example scan-able code/interactive element 18 below. User may be able to find the App by, for example, searching for it on user's phone (as user would search for any App), or, for example, scanning the lower scan-able code (as shown in FIG. 14), (or any other element that facilitates as such), and it will either set user up automatically, or get user started with the set up process.

There may be many different ways of user sync'ing their phone/smart device—one way may be that user's phone is sync'd when user first sets up user's account, just by user inputting user's mobile number when user sets up user's account. In other words, user's phone may become associated with user's user account. Another way may be to download the App on user's phone (which may be a programmed App), and then sign in with user's account username and password (or sign in in any other way).

A user running their smartphone, card, device, etc across the PUSH icon 142 (or any other element) may allow them to watch a cause video on their smart device about the cause mission and how their dispersements will be used.

So if user PUSHes the cause, user's account settings and/or dispersement patterns are altered to PUSH the cause.

Now, whenever user buys a product from the platform and/or system that disperses a dispersement to a cause(s), a portion or a whole of the dispersement amount (perhaps a very small fraction of the overall profit generated, or perhaps more, or perhaps a whole) is PUSH'd (ie dispersed) to the Audiobook Wing Library cause.

For example, if the user bought an item from Ishine® baby—a pram that cost £45.00. By example, it generates £20.00 profit, 33.3% of which (one third) goes to a kids health and wellbeing cause for kids with eyesight disabilities in your community (user may even be able to limit dispersement to within user's own community or area). This means £6.67 would be due to go to that cause, but because user is PUSH'ing the library cause, a portion or a whole of that amount preferably goes to the PUSH'd cause. 23p (as an example) out of the £6.67 may now go to the library audiobook wing cause. This is all happening without the user spending any more than they would usually spend, and most of it (or all of it) is happening automatedly, without action required from the user.

The example described above is represented in FIG. 24, where, if the user has PUSH'd the Audiobook Wing library cause, and then gone out and bought an Ishine® baby baby pram later that week, then a small portion of the £6.67 dispersement (in this case 23p) is routed to the PUSH cause. (Significant back-end coding/programming may be required to implement this).

A user may have (ie be allowed to have) more than one PUSH cause. It is feasible number of PUSH causes may be limited for each user.

User got a pram, dispersed £6.44 to a cause to help kids with eyesight disabilities in your area, and also dispersed 23p to the PUSH'd cause of building the library audiobook wing.

This 'Added Value Experience' of the computer implemented method may sometimes be even more important to the user than the product purchased itself?. This is what is termed 'buying in 3D'.

Returning to the library donation pot example, it is clear that this method is superior, and it by-passes all of the problems associated with the donation pot:

The problem of forcing the person to think, and take significant action: With PUSH, user hardly needs to take any action—in this case, just swipe/hold phone over the PUSH icon. Of course, PUSH could be initiated by any other means, eg a user could search for a PUSH cause, similar to how users of smartphones can search for an App and then install it—so a user could search a PUSH cause, and then PUSH. Thus the system may comprise a search engine for causes to PUSH (and may have a database of all PUSH causes). The system may comprise a database of all causes.

Another means of how to PUSH may be via a user's account, where they might be able to PUSH a cause (eg listed as a dispersement cause on one of their previously purchased items). They may be able to search for a PUSH cause from within their user account. Similarly a user may be able to PUSH a cause from within a website (not necessarily their user account), which may require them to sign in.

The problem of the psychological effect of 'spending outside of your normal spending': In this example, no spending needed at all—so it never triggers your 'I'm losing money/power' circuitry.

The problem of having to have money on you: With the PUSH function (as shown with the library example), there's no need to have money on you—all dispersements to the cause come from your future spending.

The problem of not knowing where your money's going: With the example shown, the user knows exactly where their money is going (to building the library audiobook wing), but on top of this, user may even have seen a cause video, or more information on their phone about the whole concept. User may even have LINK'd to the cause so user gets updates/is updated on the mission and preferably an update video when it's complete. Maybe user even gets a special alert when it's the mission is complete (ie audio wing built and opened) to come to the opening. So user has huge motivation compared to the old donation pot system.

So user can PUSH a cause without even buying anything, and user can disperse funds to that cause in the future when buying items, even from a brand(s) in no way related to the cause.

The PUSH function can be particularly powerful in terms of Disaster Relief.

Examples of BIG PUSH (Eg for Disaster Relief)

BIG PUSH is a function that may only be initiated in times of Disaster Relief, to generate tens of millions of dollars (or more) when needed, in a very short amount of time.

The best way to understand how BIG PUSH works is via an example. An example will be given relating to the Ebola crisis (2014).

In the Ebola crisis of 2014, there was a shortage of high quality equipment and organizational facilities. This was leading not only to unsanitary conditions that were increasing transmission of the virus, but was also leading to many of the health workers themselves contracting the virus, many of whom died.

This is a type of situation where the BIG PUSH function could be used, perhaps on a global level, to generate tens of millions of dollars in a very quick amount of time.

If a global BIG PUSH was initiated, every single user account holder worldwide (which could number in the billions) will be sent an alert. Any 'segment' of users could be targeted. A segment could be a segment of users who live in or are from a particular community. In this example, the segment targeted in this BIG PUSH example is the whole user database, because all users are targeted. An alert could be provided in the form of an email, (instant) message, via smart device (eg phone), or even on a website where user has signed in to user's account (preferably a platform user account), or as a message for the user when signed in to their user account.

When a BIG PUSH is called, user may see an alert inside user's account, or if user is browsing through user's account or a website where user has signed in to user's account, user may see a small graphic or ad notifying you about the BIG PUSH.

If user opts in to the BIG PUSH, then, in on embodiment, a portion (or perhaps all ie a whole) of user's PUSH dispersement(s), (which would usually go to your PUSH cause(s)), goes to the BIG PUSH cause instead, which in this case, is the Ebola 2014 crisis. In an alternate embodiment, a portion or a whole of any or all dispersement(s) (not limited only to PUSH dispersement(s)), is dispersed to the BIG PUSH cause.

Figure 31:
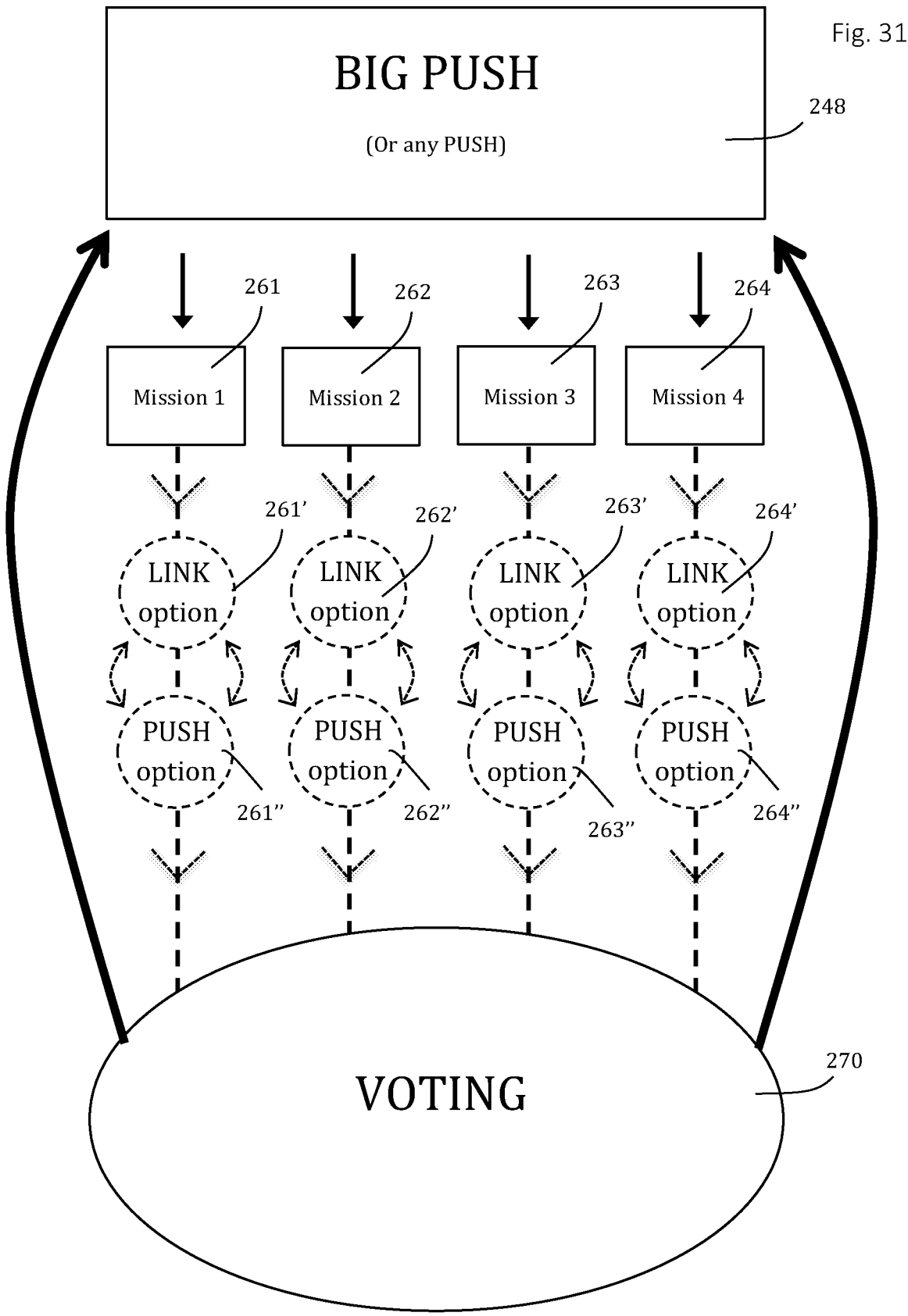
FIG. 31 is a flowchart of an example of steps that may be provided or completed during a BIG PUSH, which may or may not include interactive feature(s).

The BIG PUSH cause may have different missions (please see FIG. 31, and description thereof). So the Ebola Crisis 2014 may have one mission set up (with a required total, for example, which may be called a 'mission target' or 'target amount') to buy and deliver high quality protective suits to health workers; it may have one cause (with a required total, ie 'mission target' or 'target amount') to send extra health staff to the area; there may even be a mission set up (although this would be more a medium/long-term goal) to put funds towards medical research to find a cure for the virus. (This could be an optional PUSH cause when the BIG PUSH is over).

The truth is, such is the ability of this computer implemented method for dispersing funding to generate vast amounts of funding, that with the issue of funding taken care of, the secondary aspect of how the funding is used, and how effectively it is used, is really of more concern than the ability to fund the total itself.

User may play a far more interactive part in the crisis than with present donation systems or news outlets; at the moment, when a person watches the News and sees news of a crisis such as this, the user is remote from the crisis—user has no real power to affect the situation. This inventor sees a future where, on the News, instead of the News channel reporting to a viewer in a non-interactive way, the News reader will inform the viewer (and keep the viewer up-to-date on) on mission statuses of the BIG PUSH, and may inform the viewer/user about cause missions user can PUSH as part of the BIG PUSH, or even engage the viewer/user in voting to make decisions regarding the disaster relief (or any other aspects relating to any BIG PUSH).

User may even play a part in how the missions progress (and therefore how the Disaster Relief progresses). This could be done by deciding which missions to PUSH, or there could even be a vote for which mission(s) should be PUSH'd, with perhaps all users involved in the BIG PUSH having a vote, potentially run via the user account system, where each account gets one vote. By voting, user plays a part in deciding how the crisis is resolved. Again, no spending is required on the part of the user, although preferably the amounts dispersed, ultimately, originate from spending by the user (which result in dispersement(s). User may be able to donate too. The computer implemented system may include means for the user to donate, as an added way the user can provide assistance. Donation may not be required if large amounts of funding are generated.

This system is economically positive because it incentivizes spending; if a crisis like this is ongoing—if user (or a vast amount of users) are involved in the BIG PUSH of the Ebola crisis, (eg they have already opted in and/or had their dispersement patterns altered to PUSH the BIG PUSH), next time user is shopping at Ishine® baby for their two children (whether it be online or at a retail outlet), they are more likely to buy a product(s) for their new child—and possibly buy extra things for their kids—after all, because some of that money is preferably going to go to the Ebola Crisis cause, and user can follow it next time user is watching the News to see what their money (ie spending/funding) has done. Other means to follow the crisis and/or BIG PUSH may be provided; for example the platform may itself provide updates and/or reporting on the crisis and/or disasater relief and/or BIG PUSH.

And there may alos be provided an option to 'spend outside of user's normal spending'. Eg there could be an option to also donate an amount, eg £5, or, if there are any charity songs associated with the BIG PUSH overall cause, they could be buyable from within a user's account, or they could be marketed from within a user's account. Preferably, however, the system runs purely off spending that is not outside the user's normal spending. (ie not requiring donation, etc).

Example of BIG PUSH™ Set to Default

It may be that all user accounts are set to BIG PUSH by default—ie whenever there's a BIG PUSH, user is opted in by default, eg unless user chooses not to be. This could lead to far better saturation. User may be able to alter this setting from within their user account so that, by default, user is not opted in to BIG PUSH unless user actively makes a choice to opt in.

BIG PUSH™ (Global Vs Local)

The Ebola Crisis was an example where BIG PUSH may be activated on a 'global' level. The Ebola crisis, however, was probably a small example (from a financial point of view and others) compared to examples like the Boxing Day Tsunami of 2004, where 200,000 people died and many towns were either desolated, or wiped off the map.

But BIG PUSH may also be possible on a more 'local' level (ie on a national or community level). An example of where a local (in this case, national) BIG PUSH may have been initiated would have been Hurricane Katrina in New Orleans, USA. This computer implemented method may have allowed people (including US citizens) to take on a more active role in rebuilding damage and/or these communities after Hurricane Katrina. A BIG PUSH could have led to drinking water getting to the survivors quicker in the direct aftermath. If a BIG PUSH were initiated, citizens of the United States may have had the power to prevent communities remaining in a state of disrepair, years after the disaster. Even today, neighbourhoods in New Orleans remain in ruins due to Hurricane Katrina's effects. If a BIG PUSH were initiated globally (perhaps for one week), followed by 4-5 weeks locally (nationally to America—ie to all user's who live in and/or are from the United States), followed by months locally to Louisiana and New Orleans, it may have been possible to re-build every community and/or all damage. Even a local BIG PUSH (ie local to American iD™ users) could have generated a vast amount of money.

Similarly, perhaps the Ebola Crisis (or even funding to have created a vaccine in the first place) could have been generated by a BIG PUSH local to the African continent. (ie a BIG PUSH with the segment being all users based in (and/or from) Africa). Thus such information of what community and/or territory the user lives in and/or is from may be required for a user's account and/or set up and/or use of the system and/or platform. That information can then to used to target segments for a BIG PUSH, or for any other reason.

Another benefit of 'local' BIG PUSH (rather than a global BIG PUSH) is that it means all the other communities not involved in the BIG PUSH will continue to PUSH dispersements to their standard PUSH causes (and may have all of their dispersement(s) to any cause(s) from purchases unaffected). Many of which causes are very worthy causes and would be negatively impacted if their dispersements were taken away or diminished, which could happen in a time of global BIG PUSH.

Delaying of PUSH™ Dispersements by 24 Hours

Regular PUSH dispersements (or any dispersement(s) not limited to PUSH dispersement(s)) could be on a 24 hour delay cycle (or a delay cycle of any time amount) before they' are actually processed/sent to their relevant cause. This could be useful for when a BIG PUSH is initiated—for users that are involved in the BIG PUSH may have the delayed PUSH dispersements routed to the BIG PUSH instead, which may create an initial boost of funding. This may occur by default, or may be provided as an option (ie choosable) by the user, eg via their account settings, which may be alterable from within their account.

So BIG PUSH can send all (or a portion of) your PUSH dispersements (or any or all dispersement(s) to the BIG PUSH cause, and it can help user to play an interactive part in Disaster Relief, maybe even playing a part in deciding how to help those in distress.

A next feature which will herein be discussed is how a user can create their own cause.

Spontaneous Cause Creation

A user (or ay person) may be able to create their own cause.

An example would be a run-down set of tennis courts in a park. In this example, we may imagine there are two courts next to each other, but there's no fence around it, the trees have overgrown the area, and the court surface is very bad, so it's of no real use for playing tennis.

One of the reasons bad things like this happen (even in nice areas) is that there's no real means for people to actually do anything about it. If a person wanted to get this court repaired, that person would have to take on a lot of work, finding out who to go to, applying to the council, etc. Then they would have to persuade them to fund the repair, which in all likelihood, they just won't do. There's just too many barriers in the way of getting this done (or even getting started). So nothing gets done.

But with the PUSH function, for example, (or any other function of this computer implemented method, not limited to the PUSH function), a user may be able to spontaneously set up a cause that other people can PUSH and/or disperse dispersements to.

As an example, a user (or any person) has set up a cause. A user may become aware of this either by a sign or icon near the court (similar to the library example, you might be able to interact your phone with an interactive element to find out more information or facilitate PUSHing the cause), or by user's smartphone buzzing to denote user is near (ie in proximity to) a cause. Thus the system may include a proximity system to alert a user that a cause or PUSH cause is near. This may or may not be programmed as part of the App aforementioned, or any App and/or software usable and/or downloadable and/or installable and/or installed on the device.

As an example, they cause creator may have made a quick cause video, which might be as simple as a video they took direct on their smartphone showing the court, and stating their intent to repair or rebuild it.

It's also possible, especially if user lives near this area, or have their user account optimized/personalized to find out about these types of causes, that user may see information, or even an ad, for this cause from within their user account, or that it is sent out to user, eg by email. It's even possible that when causes are nearby, user's phone may buzz (or alert you in any way). Thus, when walking in the park, your phone (or any smart device, computer, etc) may alert you as to the fact that there is a cause (especially if it is a PUSH cause) in proximity to your location. Thus the system may comprise a cause proximity system (which itself may comprise an alert system). It may also be possible for a user to search for causes within a certain area or place. For example, user may input into the search engine the name of the park. The system may, as a result of the search, show the user all causes (especially PUSHable causes) within (or to do with) the park.

However user becomes aware of the cause, the PUSH function now functions a lot like crowdfunding. Once user accesses the cause (eg via user's smart device if user is in the park, or, for example, on any device (eg PC, laptop) at home, on a computer, etc), user might be able to get more information about the cause, and in particular about the mission.

In this case, the mission may be simply to repair the court, but user might see more details—for example, with the overgrown trees, it might only be possible to re-build the court sideways as one high quality tennis court (rather than two).

Perhaps there's also a plan to build a high-quality scoreboard as part of the tennis court re-build. Maybe there's a plan to make it an indoor court. That might cost more. Maybe there's even a choice of different possibilities for how the court could be built. Perhaps it's even been put forward that, instead of a tennis court, a small indoor, heated basketball court could be built, or maybe an indoor multi-purpose sports area. And maybe it goes to a vote from users (including the example user) for which option is chosen as the mission for this cause. The vote could be limited to PUSHrs of the cause, or LINKrs, or both, and/or may be limited to those living locally to the cause. (Those living locally within that area may be segmented by the platform into a segment, with only those users in that segment able to take part and/or PUSH and/or disperse, and/or LINK, etc, in this example. The vote may only be available to people who are PUSH'ing the cause.

It's possible that the system is set up so that users can put forward suggestions for what the mission should be (ie what should be carried out).

As mentioned in the previous chapters, if user PUSHes the cause, a portion or a whole of user's overall dispersements preferably go to this cause. If six thousand people PUSH the cause, then an amount such as £15,000 could be funded very quickly. That could be all that's needed to complete the mission and get a beautiful court re-laid and built—one user can walk past every time user walks through the park, or even use themselves.

Further example; next to the tennis court, there's may be an outdoor kids' playground. The playground is used by a lot of kids, who seem to enjoy it. But perhaps it gets too cold in the winter, and the parents decide to create a cause to build an indoor section of the playground. Perhaps this becomes a cause associated with Ishine® baby, for the area or city the park is in—(it's possible certain types of causes will only be fundable (even via PUSH) via certain brand(s), especially ones relevant to that area and/or community). With so much kids' wear being bought, this could be funded in no time. It's possible all buyers of Ishine® baby within that area will be notified, or it that the cause will be featured, which could be done via a message and/or display within the users' user accounts—and possible it could be community based round just that area, so that only users local to that area are notified. The platform could isolate them as a segment.

And there could even be a small cause set up for an outdoor table tennis table, so there's a little heated, indoor area, with a better quality table—perhaps all of these causes (tennis court/indoor sports court, indoor playground section, and table tennis area) could be incorporated into one cause, to build one centre that does this all. Some may like that idea, some may not, so again it could be voted upon (preferably voted on by users of the platform).

Immunization Against Recession

In times of Recession, trillions of dollars are spent every month. In the UK alone, billions of pounds are spent every month. And in a community such as Liverpool, with 465,000 inhabitants, vast amounts of money are spent every month.

If there were a community brand selling clothing, cutlery, and other items, where one third of all profit generated, (for example), was dispersed back into the Liverpool community, invigorating the community and giving the people of Liverpool the power to create the world around them, it would have these two affects:

1) Simply by nature of the vast amount of money dispersed back into society, it would, to a certain degree, immunize the community against Recession, and 2) Due to the heavy incentivizing nature of buying from such a brand, it would incentivize spending. This is phenomenally important as it is well-known that one of the major exacerbating factors of Recession is the psychological effect of fear and caution in buyers that leads to them stopping spending, caused by the fear of Recession itself.

Points 1), and 2), in combination, make this computer implemented method a highly effective system for immunizing, or substantially immunizing, whole communities (physical or virtual) from Recession.

What is the Present Computer Implemented Method?

The present computer implemented method for dispersing funding is a recycling of Energy/Money. Society, ultimately, is a system, and the system runs off Energy, including money.

In our current socio-economic system, Energy/Money is lost. This may be one of the reasons why we continue to experienced recessions, and why the recession of 2008 hit so hard. No system can haemorrhage Energy (Money), and continue to function effectively. (The haemorrhaging of Energy/Money is, in itself, a sign of lack of efficiency).

Figure 24:
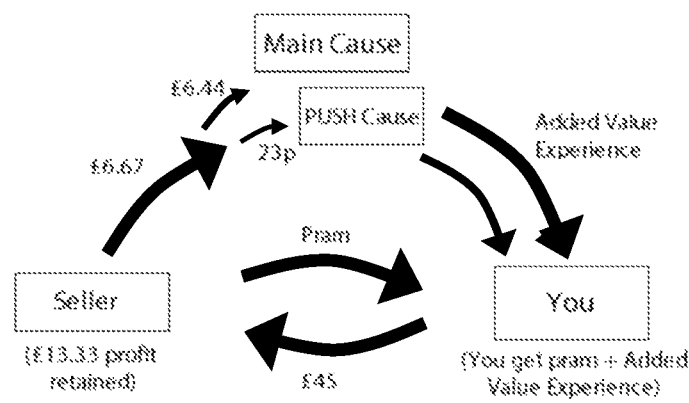
FIG. 24 is a more developed representation of an example three dimensional buying experience of the present invention and/or method.

With the present computer implemented method, this does not happen—Energy (even in every particular sale) is recycled back into society. (This is shown in FIG. 24).

Figure 25:
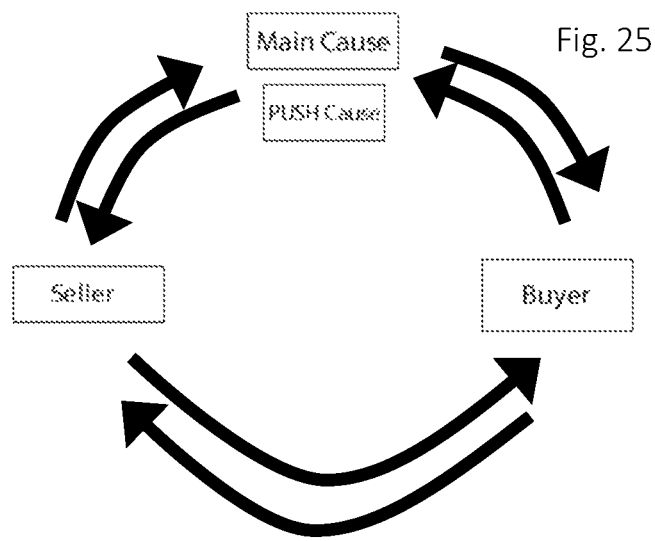
FIG. 25 shows symbiosis achieved in the selling system.

This aspect of what has been disclosed is shown best in FIG. 25, where it can be seen that there is symbiosis between all elements of the system.

Nature does not require profit. It does not give you life and ask for something back. Nature is harmonious; in a state of balance. Our present society's selling system, (without the inventive concept(s) disclosed), (characterized by Capitalism primarily defined by profit), is not, or may not be.

The present computer implemented method for dispersing funding, particularly using brand specific to a community, is in balance. It recycles Energy (Money) (to the benefit of the community and/or users).

It both enhances, and problematizes, the idea of 'profit'.

Until our economy is more representative of Life (Nature) itself, it will continue to be out of balance, and will continue to suffer from intermittent recessions.

Staffing/Job Creation

The system (ie, the present invention(s) disclosed) may require staff, and may create many jobs. For example, it is possible persons may be employed as 'cause checkers' or in a role similar or related to this.

The job of a cause checker may be to check that causes (especially those created or spontaneously created) conform to what is considered appropriate for a cause.

The system may allow for a party to create a cause, and then put forward that cause to the system with a view to having that cause dispersed to. It goes without saying, then, that it may be necessary to have a cause receiving system, and may be necessary to have a cause checking system (which may both be integrated to form one wider cause 'receive and check' system). Thus the cause may be checked to see whether it is deemed to be appropriate and allowable for it to be included as part of the system.

Obviously self-benefit of a cause creator is not the intent of the present invention(s)/disclosure. Thus it may be checked that the cause creator has not created the cause for self-benefit (especially financially, but potentially for other self-benefit reasons).

Furthermore, the present disclosed concept(s) is intended not to segregate. Therefore it is very likely that religious organisations and establishments will not be allowed to create causes (and go on to have dispersements made to those causes) in order to have money dispersed to themselves (ie their own organization(s)). This is not out of any malice at all towards such institutions (or allegiances), but it will be obvious that, despite good intent, religion (and beliefs relating to religion can, in certain situations, lead to both normal (which may be positive), and even to problematic, segregation. It is therefore likely that such parties must rely on 'spending outside the normal spending' of their following (ie donation), as they have done up to this point without the benefit of this system. They may, however, be able and/or allowed to leverage/this system (and any of its feature(s)/disclosure for causes such as charitable causes they are carrying out eg building of schools, etc in Africa. But it it will likely not be allowed for such a party to simply set up itself (its own church) as a cause, and have people disperse (money) to them. This is disallowed on two counts:

1) on the basis that the cause (whilst it may be positive) is segregational, and not a celebration of what makes us the same 2) on the basis that it is a clear act of self-benefit (which is not allowed)

Furthermore, if the African school cause (example, above) is segregated in that the school only allows for Christian teaching, or that all attendants must be Christian, it is possible (dependent on the nature of the segregational aspect) that it may not be allowed. This is in no disrespect to any religion in any way.

These rules may be the same for any religion, for example (and other groups).

This may require significant policing, and therefore significant staffing. With the example given above in mind, it will be clear the system may comprise a cause checking system, whereby a party can create a cause, and send it (ie deliver it in some way) to the system, thereby requesting that it be allowed as a cause on the system (that can be dispersed to). Such a system may include a means for sending (Ie delivering) the cause (ie cause request) to the system. Thus a means may be provided for the cause creator to deliver the cause (ie cause request) to the system. The cause (ie cause request) may then be evaluated (and/or checked) via the cause checking system (which preferably comprises at least one cause checker).

The means for delivering the cause request may include an online disclosure form, which may allow the cause creator (who may be a persons, multiple persons, an organization, etc ie any party) to disclose the cause, and may allow them to disclose information about the cause (eg target mission funding amount), and may allow them to disclose information about themselves.

Thus the disclosure means may comprise an online means (of any type). The means may comprise a paper form, for example. The online means and the paper form means may be templatized, so that cause requests can be checked and evaluated quicker.

Causes to do with weaponry (especially creation of weaponry) may not be allowed.

It will be obvious that the system (ie the present invention(s)) could be a target for fraud. Therefore the system may be endowed with (ie comprise) all kinds of (or any) protective system(s) to protect against fraud.

One example of how fraud may be attempted may be an attempt by a cause creator to profit from (ie steal, or via some other method) dispersement money dispersed to the cause, or to be deceptive and/or fraudulent in such a way that they financially benefit.

One protective system which may be used to prevent this (or as part of a wider system or set of systems to prevent this) may be the use of 'escrow' account(s). Thus the dispersements may be held in an escrow account, or in any account the cause creator does not have access to. This may be the case whilst the mission target funding amount has not been met. Even once the mission target amount (which will now be called the 'mission amount') has been met, it is possible the system may comprise further prevention system(s) to prevent fraud.

One such prevention system may be that the party(s) to which the dispersement will go to carry out the mission may be paid directly via the Escrow (or any account inaccessible to the cause creator). In other words, it is possible the cause creator themselves never gets access to (ie receives) the money, but that, instead, the dispersements are held in an account they do not have access to (eg Escrow), and from there go straight to the party(s) carrying out the work for the mission when the mission amount has been reached.

For example, in the earlier mentioned Jungle Lookout Tower cause example, the dispersement amount may be dispersed into an account (eg escrow) wherein the money is not accessible to the cause creator. When the mission amount is reached, the money may be paid directly to the workers who are building the lookout towers, so that they can start building.

If the cause creator is also a party carrying out the work, it is possible a cause planner or overseer may be provided to oversee (and possibly take control of) the cause, so that once again, it is made impossible (or extremely difficult) for the cause creator to either steal, waste, or wrongly use/take the cause dispersement money. Such a cause overseer may be used and/or provided for any cause, not limited to a cause where the cause creator is a party who must be paid to carry out work on the cause mission.

The system (ie the present invention(s), or including any invention(s0) may recognize when a mission amount has been reached, and may immediately stop all dispersements to that cause. For example, if the lookout tower cause required £46,000, once that mission amount is reached, the system may immediately (and automatically when programmed so to do) halts dispersement to that cause. The system may be intelligent so that it can then 'work out' where dispersements that otherwise should (or would) have gone to that cause should now go to. For example, if a user is PUSHing two causes (including the lookout tower cause) and the lookout tower cause mission amount is reached, all the user's PUSH money may now go to their other PUSH cause (instead of it being split between the two). Alternatively, the user may have a new PUSH cause 'queued' in preparation for when one of their PUSH cause mission amounts is reached, at which point the system may then automatedly (and/or intelligently) halt dispersement to the cause which has reached its mission amount, and send PUSH dispersements to the queued PUSH cause instead. (The user may be notified that this has happened. Such notification is also preferably programmed into the system and is thus automated). Eg user may receive a message stating "Mission amount completed for Jungle Lookout Tower. Dispersement to new PUSH cause 'London Youth Music Studio' activated."

The system may send a message to users when a mission amount for any cause has been reached. Similarly the cause creator may be sent notification when a mission amount for their cause has been reached.

If a cause has multiple missions (perhaps set up in a staggered order), once one mission amount has been achieved, the system may immediately send all new dispersement to the new/next mission of the cause.

Preferably the system is set up so that it can administratively make important changes in a dynamic way. For example, the baseball cap example, shown earlier, had a set cause of Liverpool For Life™ Street clean. Preferably the system is set up (preferably software-based) so that an administrator, for example, can dynamically (and instantly) change which cause is associated with the cap (or any item) for dispersement. Similarly, a cause choice could perhaps be dynamically set up for the cap. Thus preferably an administrator, preferably via software for the system, can, preferably via a computer interface, alter cause associations, and many other things about the system—eg potentially alteration to percentage amount dispersed could be keyed into the software, and this would dynamically (and instantly) alter the system with reference to the new input inputted by the administrator. Thus the system is preferably dynamically alterable. This may not be limited to the stated examples— eg price of the items may be dynamically alterable, and many other features. Such software (where the system functions via such dynamically alterable software) may be licensable. Thus sellers and/or any party (eg a famous fashion brand) may want to use the system. Thus they may pay the proprietor of the system in order to use it. They may either use the software themselves, or hire a specialist (who may be a staff member of the proprietor) to set up their selling with the software (which software allows them to use the present system(s) for selling). They may decide that 33.3% of profit to be dispersed is just too much for their business model. Therefore with the software, they may be able to alter this amount to, for example, 20% for all items, so that only 20% of all profit generated from sale of the item is dispersed. They may be able to input into the system the price of the item, and its cost price to them (The software can then work out what the profit is when the item is sold). Once they've inputted the percentage of profit they want to have dispersed, the software can then automatically work out how much will be dispersed when that item is sold. Therefore the party using the software need not input all information— much of it can be automatically worked out by the software).

(If in the future, any means other than software is developed to execute such action and/or function, it still falls within a scope of the present invention(s) and/or disclosure, and where the word 'software' is used, it can or may be read as meaning 'any executable means or thing under the Sun'.

(As stated earlier, dispersement amount need not necessarily be a percentage (of profit or any other amount), and may simply be an amount.

The software may feasibly allow the party using it (whether it be the proprietor or any third party that are paying a licensing fee for using it) to apportion different dispersement amounts (eg percentages) to different items), or allow all dispersements amounts to be changed globally. Eg during a 'POWER SALE', all dispersement amounts may go up from 33.3% (one third of all profit generated) to 50% (one half). Preferably, as suggested with description of the software (and/or any back-end programming and/or code, and/or any means to carry out the same) that may facilitate dynamic alteration of features with regard to the selling system, this could be done globally using the software (and/or any back-end programming and/or code, and/or any means to carry out the same) with a very simple alteration that would then globally change all dispersement amounts for all items from, (in this case), 33.3% to 50%. This may be done by an administrator.

In terms of fraud protection, it may be extremely important (or required) that precise (or exact) budgeting is set out before the cause is allowed to go active to receive dispersement. This is to prevent disorganization such that a mission amount may be achieved, but the cause creator then fails to complete the stated cause mission (eg building the lookout towers) on account of the fact that the mission amount turned out not to be enough. (It may also help prevent fraud).

Therefore it may be required that all such budgeting is organized, pre-planned, drawn up, and well thought out before the cause is allowed to go active for dispersement.

It is feasible the system (ie the present invention(s) and/or disclosure) may employ (and therefore may comprise) staff (who may, for example, be called 'cause planners') to make sure the cause concept (eg business plan/funding plan) is sound. These cause planners (or any staff member) may even oversee the mission as it is taken on (ie they may be an overseer). Thus, for example, a cause planner/overseer may travel to the Jungle to oversee the Lookout Tower cause, or may oversee it remotely (ie not being there).

Since significant staffing may be required, which may require the system pays an extremely large amount to staff, it is feasible that the system (ie proprietor of the system) may take a portion of money from the system (eg feasibly from the dispersement money) in order to pay staff. For example, in the same way a well-known online payment system charges a transaction fee for every time it is used as a payment system by a user charging a customer, so the iDT™ system may take an amount (feasibly from every transaction), or any amount based on any other method for extracting money from the system. This may come out of dispersement money (eg PUSH dispersement amounts), or, for example, each user may be charged a (small) amount, (eg 30p per month) to use the system. If the system has its own integrated payment system, this could be used to charge the user in such a way. (Any method may be sued to generate money for staffing). The system may be run at profit or may be non-profit.

It will be obvious that such a system may require extremely significant back-end coding/programming and the like. Thus a significant amount of technical staff may be required, both to create and maintain the system (which may primarily be software-based and/or back-end coded, and/or the like to carry out the invention concept (s0 as disclosed) and to create and maintain its website (and other) interface. There may also be required significant staffing for customer service issues. Again, payment for these staff may be funded by the system receiving a portion of money from the users and/or from any other means/avenue with respect to the system (eg from dispersements and/or sellers, or any other avenue). Such payments (ie staff payments) may be factored into the system and/or platform as 'outgoing payments'. As mentioned previously, this (and any other information) may be used by the system to generate a 'target profit' or 'target loss' amount (or non-profit amount), which may be programmed into the system to target an overall profit the platform and/or system generates.

The system may be licensed out to sellers, who may be charged for using it (thus generating money for proprietors of the system).

It will be obvious that brands mentioned (such as ishine baby, etc, which is preferably an in-house brand of the proprietor of the system) may themselves create jobs, and may function via retail store(s), and may also function via an online store(s), thus creating jobs.

It has been stated that cause creation (eg by cause, charities, etc) may be an important aspect of the invention, and also that spontaneous cause creation (eg by an individual in order to repair a tennis court in a park, for example) may also be possible. It will be obvious that help and/or a templatized system may be required for this.

For example, to give an example of a templatized system, when a cause (such as the tennis court cause) is spontaneously created by a party, they may have to fill out information on a template (preferably this can be done via computer, smartdevice/smartphone etc. Some of the information may be personal, some may be for viewing by viewers who view information about the cause. There may be provided an upload system so that a video, for example, can be uploaded to the system. Alternatively, a video may be inputted simply by inputting its URL (eg from a video webhosting site).

Other questions may include things such as 'cause name?', 'mission amount?', 'Overall intent of the cause/cause mission?', (or questions to that effect, etc. Once information has been inputted, it may be sent to the system, and/or directly put onto the system. (eg for viewing and/or dispersement by users).

It will be obvious that high quality video (and perhaps other aspects, such as graphics) may be useful in getting more people to PUSH a cause (or buy items to which the cause (mission) has been apportioned). For example, for the tennis court example of a spontaneously created cause, if, as part of the information available to viewers, high quality renders of the proposed finished repaired court were provided, it may help people understand and be more motivated by the vision, and therefore they may be more likely to PUSH the cause. Similarly, in certain cases, this could be useful with more standard causes (eg charities, or a cause to help kids with certain health problems), where a cause video may be particularly useful in quickly helping people understand what the cause (and cause mission) is for and what the intent of the mission is, which may lead to more motivation of users to PUSH that cause (or disperse to it in any way, eg by buying at item to which that cause has been apportioned, or deciding to disperse to that cause if there is a cause choice).

Such video and/or graphics, (or any other assets to help a cause) may be offered to the cause creator. This may be done as part of the system. The proprietor of the system may gain financially if such things (graphics, video, etc) are bought by the cause creator. For example, a team (or individual) may be paid by the cause creator to create such assets (video, graphics, or anything else). The proprietor may get a share or portion of such payment. Thus the system may feasibly comprise a database of such cause asset providers, who may provide (and create) assets such as video, graphics, which may be paid for by the cause creator. The system may include means for the cause creator to find and/or hire such asset provider(s). Eg they may be able to post their cause job via the system, and find asset providers in that way, or have asset providers contact them with a view to carrying out the work (or bidding to carry out the work). There may be provided means for communication between the cause creator and asset provider (which asset provider may be an individual or team, etc). There may be provided means of secure payment for the cause creator to pay the asset provider, which payment may feasibly be held in escrow whilst the work is done by the asset provider. It has already been stated the iD™ system may comprise a payment system—this payment system may be used to facilitate payment by the cause creator to the asset provider, and the proprietor of the system (or the system itself) may retain a portion of the payment (which may be a percentage, which may be approximately 10%, for example).

In use, (with reference only to cause activation), to give an example featuring ishine baby, a kids charity (not related to the brand) may contact ishine baby with a desire to have their cause activated for dispersement. They may disclose/deliver their cause/cause request to Ishine Baby via an online disclosure means (eg a form, with questions).

A cause checker may check the cause (request) to check the cause meets with criteria of the system and is deemed appropriate.

A cause planner may check the cause is financially sound and is planned effectively and realistically to meet its objectives (ie complete its mission), which may include checking the mission amount and/or budgeting is correct. The cause planner(s) may help the cause plan such things correctly and appropriately. Thus this stage may feasibly include 'help' for the cause to set out their cause/mission correctly.

A cause overseer, if the mission amount is achieved, may oversee the mission being completed.

Thus the system may comprise a cause checking system/stage; a cause planning system/stage; and a mission overseeing system/stage. Note, it is feasibly all these stages/systems could be carried out by one person and/or team, or by many).

If allowed, an escrow account (or an account not accessible to the cause creator) may be set up. This may potentially be a real bank account.

The cause (and thus dispersements to the cause) may then be given a position within the system. This may include the cause being apportioned to sales of certain item(s) so that when those item(s) are sold, dispersement(s) are made to that cause. Alternatively, the cause may be set up as a PUSH cause, and thus it is feasible a cause may be set up for dispersement in such a way that does not include it being apportioned to a certain item(s). It is feasible a cause may be set up both being apportioned to certain item(s), and also as a PUSH cause, so that it is PUSHable.

In certain situations, (or for certain item(s)), the cause may be set up as a cause choice for when certain item(s) are sold.

How the cause is set up and/or apportioned on the system for dispersement is preferably dynamically alterable within the system via the system software (or the like). Such alteration may be done by a member of staff, eg an administrator.

Once set up and apportioned, dispersement may begin.

Once the cause's mission amount is reached, dispersement may be terminated. This may be done intelligently/automatedly by the system. A next cause may already have been allotted (eg to the item(s) to which the cause was previously apportioned, so that dispersements immediately start to go to the new cause (or new mission of the same cause) once the mission amount is reached. Thus the system may include 'queuing', where the system comprising means (preferably via its system software) to 'queue' causes (or cause missions) so that once a mission amount is reached, a new cause or cause mission is allotted to the item(s) that previously resulted in dispersement to the mission whose mission amount has been reached.

The embodiments described above are provided by way of example only, and various other modifications will be apparent to persons skilled in the art without departing from the scope of the invention.

Referring to FIG. 26, there is shown a representation of an embodiment of a computer implemented method that may be claimed. There is shown a platform 210 (represented by the large outside circle 210, which comprises a plurality of brands 212, each of the brans being related to a specific community. There is shown an example brand 212, 213 which is shown as a brand that supports and relates to the UK city of Liverpool. This is a geographical community. The brand may be called Liverpool For Life™ (or Liverpool 04 Life), for example, thus having a name that makes clear that it supports/relates to that community. The brand may in fact support the whole Merseyside area (a UK 'county'). There is shown a brand 212, 215 that supports and relates to the dog and/or animal community. Purchases of its products lead to dispersements towards dog or animal causes/missions. The brand may be called Idog®, for example. This community is a virtual/abstract community, in that the dog and animal community/dog and animal loving community has no geographical boundaries. It is feasible though that the platform may be configured so that geographical limitations could be relevant to such a brand. (eg a user based in a particular city or country (ie territory), when they buy a product(s) of the brand, incurs a dispersement to dog and/or animal causes related to that particular territory/community.

There is shown an optional second geographical community brand 212, 217, which by example is to support/relate to the U.S. state of Florida. This brand may be called SUN SHIINE® STATE, for example, a name that denotes the state (ie territory/community) is supports, with dispersements liberated from sales of its products going to Florida related causes. There is shown a brand 212, 219 that supports and relates to kids' and baby wellbeing. Purchases of its products lead to dispersements towards kids' health and wellbeing causes/missions. The brand may be called Ishine® baby, for example. This community is a virtual/abstract community, in that kids' health and wellbeing has no geographical boundaries. It is feasible though that the platform may be configured so that geographical limitations could be relevant to such a brand. (eg a user based in a particular city or country (ie territory), when they buy a product(s) of the brand, incurs a dispersement to kids' health and wellbeing causes related to that particular territory/community.

The term 'computer implemented' does not limit all steps of the example (or any invention) being carried out by computer. However, it will be obvious that the present invention(s) disclosed cannot be simply carried out by humans. The invention discloses extremely advanced computer implementation, and may require some of the most complex bespoke back-end coding of any computer system (including any programming and/or software) ever built. It is not a process that is standard, and simply uses any old machine.

Thus, in one example, there is provided: a computer implemented method (for dispersing funding (in a dynamic and organized manner) across a plurality of different communities), comprising: a platform 210, the platform comprising: a plurality of brands 212, the brands each being related to a specific community; and a computer system facilitating account set-up for a user, wherein the account is usable for the user across all the brands 212, and is thus defined as a platform user account; for each brand, collating causes, the causes being related to helping the specific community of each brand 212; releasing a variety of products across each brand 212; apportioning a cause or causes of the community-specific causes to a product within one of the brands 212, and repeating this with many of the products of the said brand 212, such that when the product is purchased, a funding amount is dispersed to the community specific cause or causes apportioned to the product; carrying out the previous step, throughout the other brand or brands 212 of the platform 210, so that all the brands have products with a cause or cause apportioned to them, such that funding is dispersed to the cause or causes when the products are sold, the causes being related to the specific community of the brand 212; receiving a purchase; recognizing the user who made the purchase; recognizing the product that has been purchased; dispersing the funding amount to the cause or causes.

Preferably the computer implemented method comprises a further step of relaying the purchase and/or dispersement information to the platform user account. It will be obvious that there could be a vast array of community specific brands 212 as part of the platform. It will also be obvious that having an over-arching platform such as this, especially if the user need only have one account usable across the whole platform, and thus all the brands 212, may be extremely useful. The user may also be provided with/sign up for separate accounts at each brand, separately, or in combination with the platform user account.

When the purchase is received (ie recognized), preferably the platform recognizes the purchase. Thus a purchase is received, with a user having made the purchase. It may also be claimed in language such as 'receiving information that a purchase has been made'.

Preferably the method also provides brand-specific viewability for the user, such that the user able to see their spending and dispersements, specific to a particular brand, or all together. This may be done from within the user's account as has already bene discussed in previous disclosure. The user may be provided with a brand specific account.

Preferably the method further comprises receiving an amount data defining an amount to disperse when the product is sold. This is preferably a percentage of profit generated from the product being sold. Preferably this amount is 33.3% (one third of all profit being dispersed), but it may be more or less, and may, for example, be 100%.

Preferably the method further comprises receiving a cost price for a product. (preferably for all products to be sold that lead to a dispersement. Preferably the sales price is received. The computer (any aspect of the platform and/or brands) calculates profit generated from the sale, via use of the sales price, cost price, and percentage amount to be dispersed. Such automation may be highly beneficial within this system, as percentages can then be changed, with the computer implemented method not requiring human calculation to work out and change dispersements amounts for each product. Preferably the percentage amount to be dispersed is alterable (or any amount to be dispersed is alterable), locally (ie to any individual product), or globally (across many or all products). Thus, by changing the percentage amount to be dispersed, the system can alter all dispersement totals, without human action, and execute dispersement of the new amounts.

Dispersements (ie funding) to cause(s), may be sent direct to the cause, or funding may be 'pooled' until the funding target amount is reached. This amount may be called the 'mission' amount' or 'mission target amount', or 'target amount'. There may be set causes (pre-determined with the user not choosing where the dispersement/funding goes. There may be provided cause choices (as previously explained. The computer (ie platform, or any computerized part of the platform, inclusive of action of any brands and computer action of the brands) may intelligently decide which cause(s) to disperse funding to is a user does not make a cause choice within an allotted time. The platform (and computer system(s) thereof) may recognize the product and/or user. The brand(s) (and computer system(s) thereof) may recognize the platform and/or the product and/or the user.

Information related to purchases and/or dispersements, across all the brands, is preferably sent to the platform user account of the user, preferably storing preferably viewable by the user.

Preferably (especially in brands relating to a geographical community) staff are hired that are citizens of the community. Thus for Liverpool 04 Life™, preferably the clothing is made in Liverpool, which can create a large amount of jobs for the community the brand supports/relates to. Similarly, preferably web designers, clothing designers, product designers, accountants, etc who work for the brand are citizens of Liverpool. Thus preferably all or most, or a very high percentage (eg more than 90%, or more than 80%, or more than 70%, or more than 60%, or more than 50%, of the staff of the brand are from the community that brand relates to.

Preferably the brands 212 of the computer implemented platform 210 comprise a mix of geographical and virtual communities, wherein a virtual community is defined as being a community not defined by geographical location. This is shown in FIG. 26. It will be obvious that if one platform (especially one with advanced computer implemented technology, especially if the platform provides provides technology which all the brands depend on (or the user depends on) houses/comprises all the brands, it may have significant user benefits. It may comprise a vast array of community brands—for instance, there may be a community brand for every major city in the world, and perhaps for far more territories. This preferably the platform comprises a plurality of brands related to a geographical community. (eg FIG. 26—Liverpool brand, as well as Florida brands (and perhaps hundreds or thousands more). There may be brands for a whole country, the community of the brand thus being the country. In certain examples, the community of any of the brands may be any of: a city; a county; a country; a state. These are just examples of geographical communities. Preferably at least one of the communities is a dog or animal loving community, wherein funding from purchases of products of the brand goes toward helping and improving wellbeing of animals or dogs. Percentage profit amount to be dispersed may be alterable globally, for a whole brand.

Percentage profit amount to be dispersed may be alterable globally across multiple brands of the platform, or for the whole platform.

User may be able to LINK to a cause the user has dispersed to, such that they are updated about the cause which they have dispersed to. Preferably this option is only made available once the user has dispersed to the cause (or the user is only given full LINK functionality and feature(s) once they have dispersed to the cause. Those that LINK to a cause may together form a 'segment' such that the cause and/or brand and/or platform may be able to isolately communicate and/or engage with those that have LINK'd (who will herein be termed 'LINKers'). They may be stored on a database. The computer implemented method may comprise or allow for or facilitate voting from those that are linked to the cause, the voting related to a future mission of the cause. This may allow LINKers to have a direct say/vote on future missions of the cause (or even on ongoing mission(s). Votes could be received via the platform or out of the platform (and/or the process could be carried out outside of the platform)—nevertheless it is considered within a scope of the present invention and may be claimed)

It is possible 100% of all profit is dispersed to the cause or causes, the computer implemented method thus running non-profit. This may be 100% of dispersement amount, or the computer implemented method may be configured (either for the platform and/or any brands and/or business using the system) to alter dispersement amounts to guarantee 100% of all profit from the brand is dispersed. This may include receiving information relating to incoming sales and outgoing costs, the computer implemented method further comprising alterting dispersement amounts to guarantee a particular profit or profit range for a business and/or brand using the system (and/or the entire platform). The platform, or any brand within the platform, may thus be configured to balance the books, receiving data related to payments coming in, and receiving data related to payments going out, and adjusting dispersement amounts to balance the books, or to try to reach a certain result with regard to any profit (or loss) generated. The target profit is not limited to being a non-profit total. The target profit which the computer implemented method is programmed to target (and alter dispersements to reach the target) may be any amount, eg £5 Million.

The computer implemented method preferably further comprises allowing a user to push a cause, such that a portion or a whole of the user's dispersement amounts from a future purchase or purchases are dispersed towards the cause the user has pushed, even when the cause has not been apportioned to the future product or products purchased.

In certain PUSH situations, it is extremely possible that no payment is made by the user in the process of pushing the cause. An example of this has been described with reference to the library example, where no payment is made at the time of PUSHing the cause. As disclosed with regard to the library PUSH example, there may be provided a coded element, or programmed element, or scan-able element, to facilitate the user in pushing the cause. This may be provided to a cause, and may be printable (eg printable QR code) which they may then display, thus facilitating users in PUSHing their cause. If PUSH function is provided and/or carried out via a website/webpage, the element provided to facilitate the user in pushing the cause preferably comprises a web button (eg clickable/selectable button), which initiates altering user settings to push the cause. It may be required that the user signs in to their user account in order to carry such an act out, or to initiate a PUSH of a cause. (exceptions may include a BIG PUSH, where the computer implemented method may alter settings of the user account (and/or initiate a PUSH to the BIG PUSH cause on the user account), without the user taking an action (or being signed in).

Rather than a web button, a web link may be provided (eh a hyperlink, for example, or an HTML coded link, or any coded link/element, or the like. As aforementioned, a a printable coded element may be provided for a cause, to facilitate the cause in getting users to PUSH their cause. If the cause has a website or webpage, they may be provided with a coded button/link or the like for display on a webpage, to facilitate a use in PUSHing the cause when selected. Whether in the real world (eg printed QR code) or on the web (eg link/button/image, etc), this is termed a PUSH facilitating element, and tends to comprise a code, to initiate altering setting of the account of the user t PUSH the cause. As shown previously with reference to the library, this may be accrued out with a smart device (preferably a smart phone, but feasibly a tablet, or any other device).

A PUSH may be carried out wherein the push is a 'brand local' push, such that the cause is only PUSHED (ie dispersements only sent) when other products within the same brand as the cause that is being pushed, are purchased by the user. This will now be termed a 'brand local' PUSH, because dispersements are only dispersed to the cause on purchases within the brand (and therefore related to the community) the pushed cause is related to. Thus it may be that a portion or a whole of the user's dispersement amounts from a future purchase or purchases are only made to the pushed cause on purchases made by the user from within the same brand as the pushed cause.

Alternatively, it may be possible that a cause can be PUSH'd, and that dispersements can be dispersed to the cause even when products are purchased by the user that are from a brand (and thus related to a community) outside the brand (and related community) of the PUSH'd cause. Thus if a user PUSHes a cause for kids wellbeing (or for the library), and purchases then made, for example, from a dog and animal related brand (eg the example Idog®) result in dispersement to the PUSH'd cause, then that is said to be a 'non-brand-local' PUSH Thus examples may include a push being a non brand local push, an example being such that user's dispersement amounts from a future purchase or purchases can be made to the pushed cause on purchases made by the user even when the purchase or purchases are made on product or products from brands outside of the brand or community of the pushed cause.

A PUSH where purchases from all brands (and/or companies), ie not limited at all to any one or several brands) leads to dispersement(s) to the PUSH'd cause may be termed a 'fully global' PUSH. User may be able to alter settings (eg from inside user account) to immunize certain brand(s) and/or spending and/or purchases from having dispersement(s) sent to the PUSH'd cause.

The computer implemented method may further comprise receiving a command to alter the amount pushed on a global level, wherein the command alters dispersement amounts that are pushed for multiple products, with a single command.

With regard to library example (and other similar examples) of how to PUSH a cause using a mobile/smart device, there may be provided a computer implemented method comprising: receiving a request on a device (eg smartphone) of a user to push the cause; relaying the push request to the platform, from the remote device; altering settings of the platform user account to push dispersements to the cause; dispersing a portion or a whole of the user's dispersement amounts from a future purchase or purchases to the cause. This may requires application(s) and/or software, and/or a back-end system to manage communication between the device and the platform and/or brands and/or companies within the platform. As stated, if a cause is PUSHed, future purchases by the user from brands not related to the cause may result in dispersement to the pushed cause, the method thus further comprising making dispersement amounts to the pushed cause on future purchases from brands not related to the cause.

The computer implemented method may provide a BIG PUSH function, which may be particularly useful in times of disaster relief or help, where preferably the computer implemented method comprises altering settings on the accounts of a large segment of the users so that the users PUSH the BIG PUSH cause, preferably by default, without the user initiating the push. In an alternate embodiment, it is feasible user's settings are not altered by default, but that the user needs to opt in in order to PUSH the BIG PUSH cause.

Figure 28:
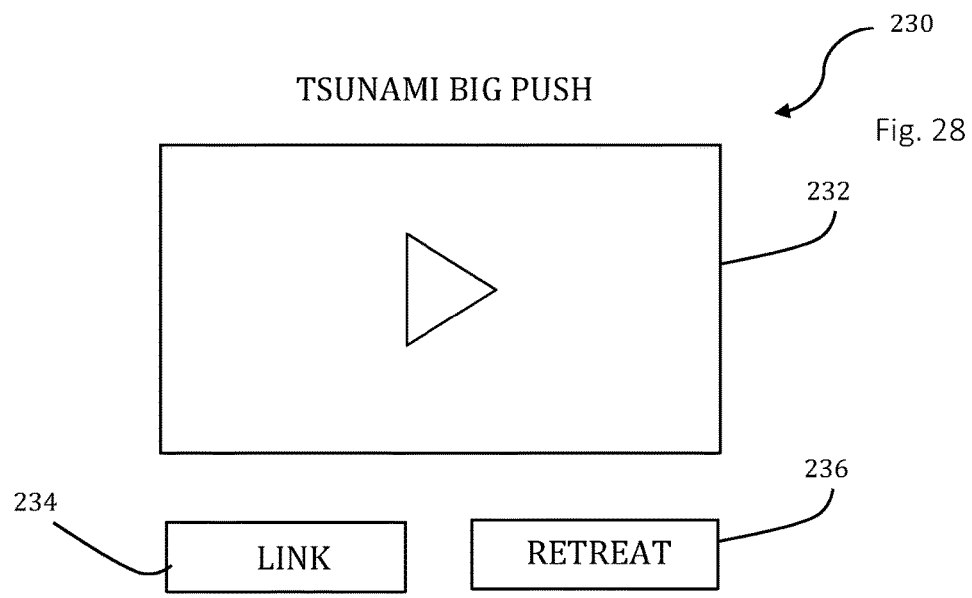
FIG. 28 is an example portion of an example webpage showing a video, related to a disaster relief cause or effort.

The large segment may be a whole community. (eg the community could be all of Britain (ie all users based in, and/or from, Britain, if Britain is facing bad floods in a particular area. Or the segment could be a county, for example, where the floods are taking place, with all users in or from that county being engaged for the BIG PUSH. The segment could be the whole world, if there is a huge disaster, like the Boxing Day Tsunami. Thus the whole world (all users) may be involved in the BOG PUSH. The segment may be a whole geographical community. They may be taken to a webpage and/or video such as shown in FIG. 28. Users may be able to LINK to the BIG PUSH cause, or splinter missions/causes that stem from it. Those who LINK to the BIG PUSH cause may be able to vote, relating to present or future mission(s) related to the BIG PUSH. It is feasible users even who have not LINK'd may be able to vote on such matters.

There is shown in FIG. 28 an example portion of a webpage (which user may have been sent a link to), showing a video 232 (in the example, about the Tsunami disaster). There is shown a button to LINK which the user may select. There is shown a button to 'opt out' of the BIG PUSH, which is here shown as a button that has the word 'retreat' on it (ie retreat from the mission/BIG PUSH). Any word or element may be provided to allow the user to opt out. These are just examples shown—any means (not limited to a button) may be provided for these actions. As stated, preferably during a BIG PUSH (which will usually be initiated due to a significant disaster, but may also be initiated for a special event or mission), the users who are within the segment targeted for the BIG PUSH (which may be a geographical territory, and/or may be a community), preferably have their settings altered by default by the computer implemented method. It will be obvious this cannot be done by humans, because there may be millions of users within the segment, and the PUSH action is an unusual action that standard computers/machines are not programmed to carry out. Thus there is provided an opt-out option (shown as element 236 in FIG. 28).

The system may also comprise means by which user can alter their account settings (or simply decide) whether they want to be entered into the BIG PUSH by default, or whether they want to have to take an action (ie opt in) in order to be entered into the BIG PUSH. They may be able to do this from within their user account (ie when signed in). One reason why the users in the segment preferably have their account settings altered by default is to maximize numbers involved in the BIG PUSH, and to make sure all are involved who would wish to be, without them needing to take an action to do so.

Figure 29:
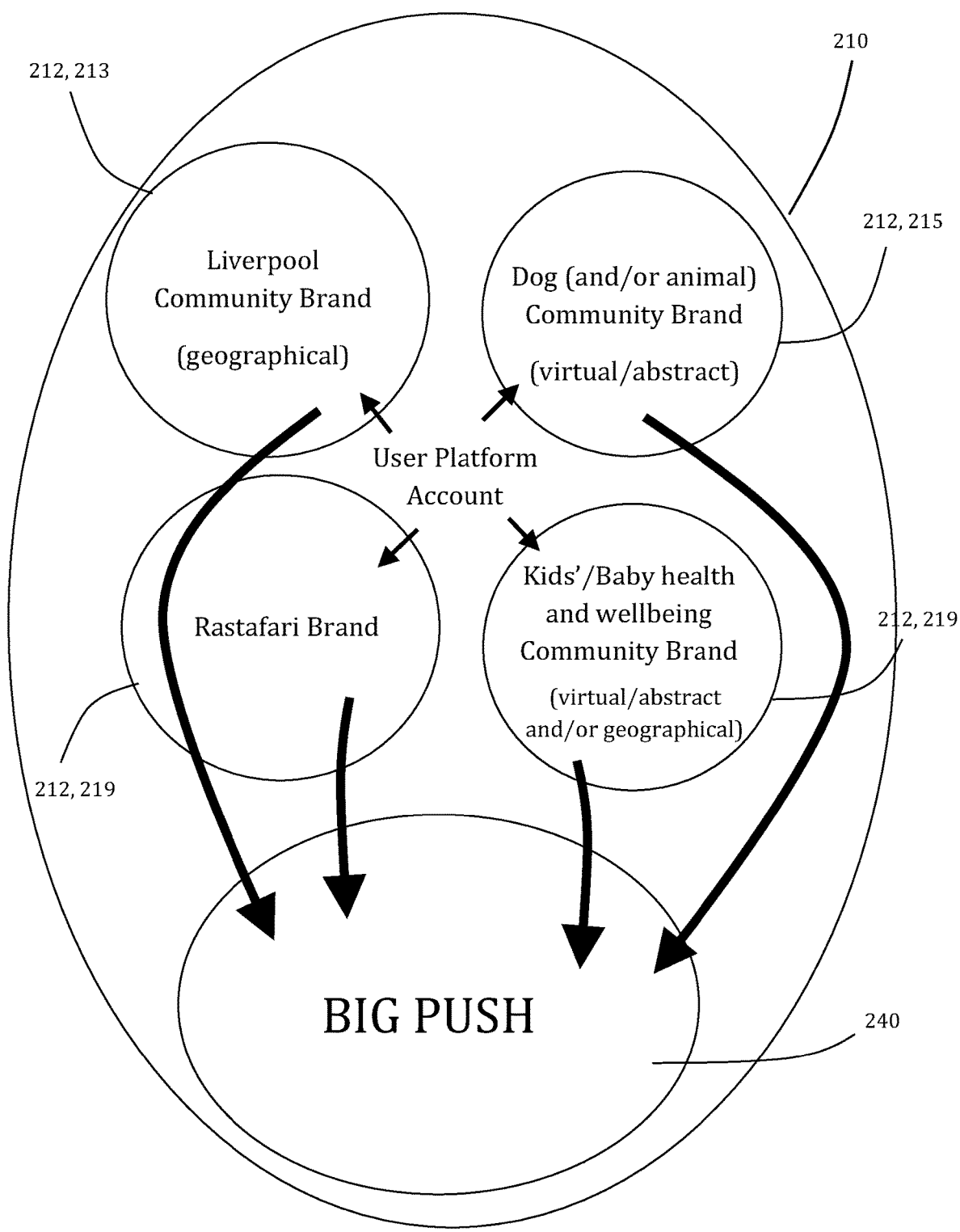
FIG. 29 is a representation of a BIG PUSH function, wherein user settings and/or dispersement patterns of a user can be altered.

In FIG. 29, there is shown a representation of an example of what may be possible during a BIG PUSH, and how a user's account/dispersements may be altered. There is shown a representation of the platform 210, and the text shown centrally with arrows stemming from it shows a user's account. The arrows signify that the user is or has been buying product(s) from four shown brands each relating to a specific community. One is the Liverpool community (eg a brand called Liverpool 04 Life™); one is relating to the dog and/or animal community (eg a brand called Idog®); one is related to the Rastafari community, and may support and relate to the rastafari community, or the Rastafari community and the Caribbean community combined (this brand, may, for example, be called Rasta SHIINE®); and one is relating to kids' health and wellbeing (eg a brand called Ishine® baby). Thus the user is (or has been) spending at these brands, and preferably these brands are configured so that 33.3% of all profit generated from the sale of each item is dispersed to a cause or causes relevant to that specific community. Now, though, a large icon 240 is shown within the platform, which represents the BIG PUSH. This may be a BIG PUSH called, for example, due to a disaster such as the Boxing Day Tsunami, where vast amounts of money, aid, and help are needed. Now the system has (preferably by default, without opt-in or action from the user needed) altered settings on the user's account, so that, on purchase(s) with those brands, where dispersement would normally have gone to certain causes related to that particular community of the brand (and/or user's own PUSH'd causes), a portion or a whole of those dispersement(s) are now dispersed to the BIG PUSH cause. This is signified by the four large arrows. Thus it can be seen that the Big PUSH function has the ability to 'over-ride' normal dispersement patterns and arrangements.

The BIG PUSH may also override the user's own standard PUSH'd causes, so that those a portion or a whole of those dispersement(s) that would have gone to their standard PUSH'd causes are now dispersed to the BIG PUSH cause.

Figure 30:
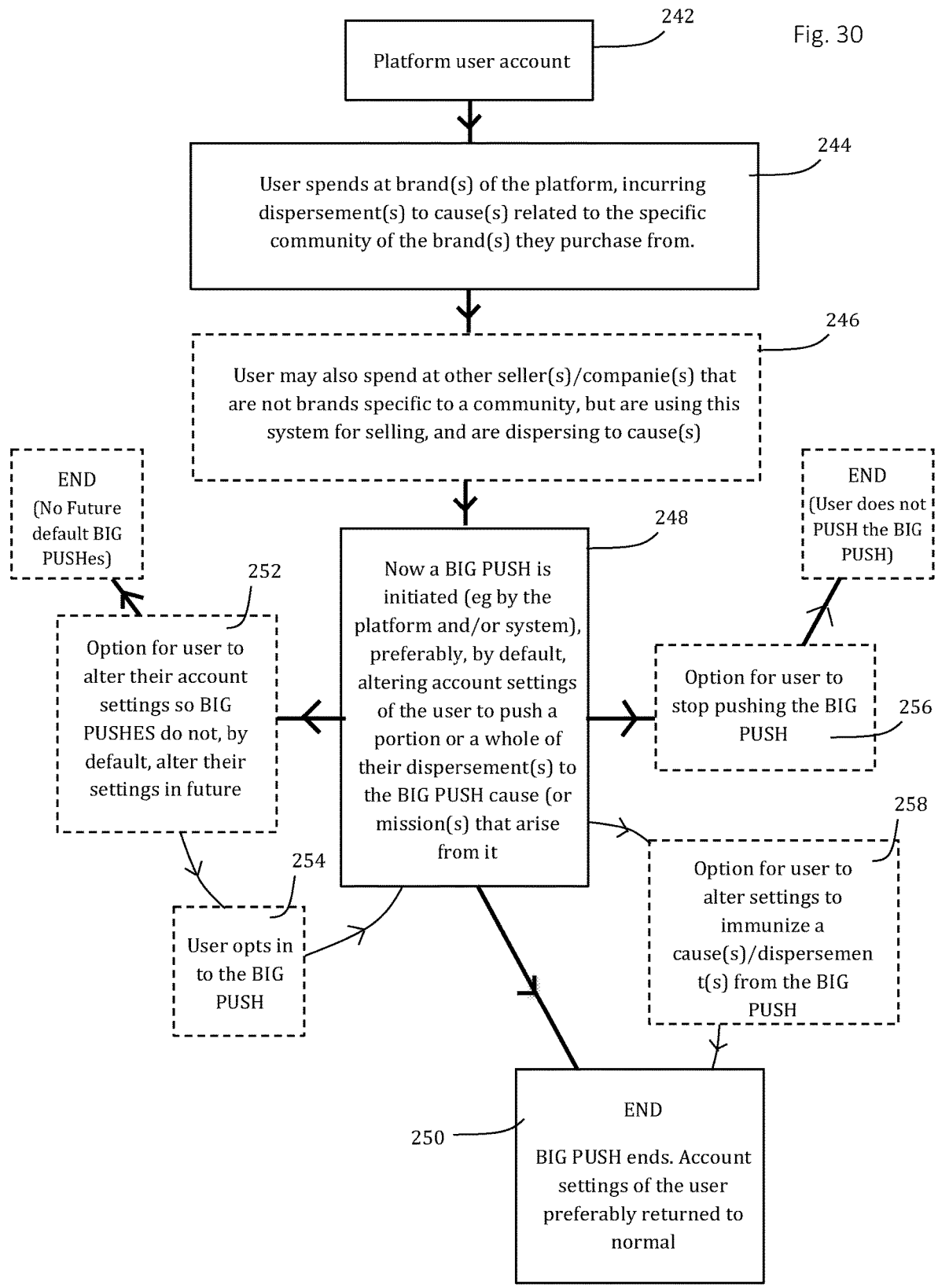
FIG. 30 is a flowchart of an example of steps a user may go through before and during an example BIG PUSH.

An example is also explained/represented in FIG. 30, where it is shown the user has a platform user account 242. In the example, before the BIG PUSH, the user spends at community-specific brands of the platform (denoted in element 244), with normal dispersement patterns wherein dispersements are made to the specific community of the brand. It is also noted (shown in element 246) that the user may spend at other parties (eg other businesses, sellers, retailers) that are not specific to a community. An example of this would be a company such as Nike. Nike, may, (taken by way of example), decide to start using this system for selling. They may not be able to disperse as great a percentage as some of the brands within the platform, but may be provided with (eg loaned and/or licensed) software or the like (or any means) for them to implement this system of selling for their brand and products. Thus they may use the software/implementation means to have 15% of profit generated from sales of their products go towards cause(s), which may or may not be community based/specific. Thus, in such a situation, such a party is said to be within the platform 210. They are using the system for selling. Thus the platform is not limited to only comprising brands specific to a community, It may or may not be limited in such way. Providing means for such a company (or any company/seller/party) to implement this system for selling (and to act within the platform) may be claimed. The platform (or proprietor of the platform) may charge a fee for such usage. This fee may include be a one-off fee, for example. It may include any fee, for example. It may include a fee/amount/percentage of each or any product(s) sold using the system, for example.

In box 248 (FIG. 30) a BIG PUSH is now initiated by the platform and/or system. Preferably, by default, without user having to take action or opt-in, account settings and/or dispersement patterns of the user are altered, so that a portion or a whole of their dispersements now go to the BIG PUSH. In 252, user, if they don't like having their settings/dispersements altered without their consent, may be able to alter settings (eg from within their account—ie in a computer implemented manner) so that, from now on, their settings/dispersement patterns will not be altered, without their consent (eg via an opt-in). if they do that, they may still be involved in this BIG PUSH, but an END box stemming from box 252 signifies that the exact example shown will; not happen in future; in future, they may perhaps be sent an alert if a BIG PUSH is called by the platform, so that they can opt-in if they want to PUSH the BIG PUSH. This is signified by box 254, where a user (if their settings/dispersement patterns are not altered by default) is able to opt-in to PUSH the BIG PUSH.

There is shown an option 256 for user to OPT-OUT of (ie stop PUSHING) the BIG PUSH. If they do this, the process ends. There is shown an option 258 for a user to immunize a cause/dispersement (or a PUSH they have set up), so that the BIG PUSH does not alter those dispersement(s). This may be important if the user wants to join 9ie PUSH) the BIG PUSH, but has certain causes they don't want dispersements to stop to whilst they PUSH the BIG PUSH. Thus they may be able to 'immunize' these cause(s)/dispersement(s). This may be possible to do from within their user account (preferably a platform user account).

Once the BIG PUSH ends 250, preferably the user's settings and/or dispersement patterns return to normal, with dispersements to the BIG PUSH now ended. This may happen, for example (taken by way of example), 5 weeks after the Boxing Day Tsunami, is $6.5 Billion has been raised, and it is considered or thought that all help needed, desired, or expected, has been provided (and/or all missions completed). Patterns may then return to normal.

BIG PUSH may allow for more interesting interaction from users. An example is shown in FIG. 31. This is a depiction shown by way of example only. It shows, at the top, a BIG PUSH 260 has been initiated. It is shown that the BIG PUSH has been split into four missions, Mission 1: 261, Mission 2: 262, Mission 3: 263, Mission 4: 264. Taken by way of example, we will imagine the BIG PUSH is called because of the Hurricane Katrina disaster, and that New Orleans has been flooded, with terrible consequences. A worldwide BIG PUSH is called (to all users throughout the world. Mission 1 may be buying and provided water and food to New Orleans residents who have had their homes destroyed and are now housed (and trapped) in a sports stadium; Mission 2 may be buying and/or proving sleeping bags to those people; Mission 3 may be helicopter work to look for and help survivors, some of whom are trapped on their roofs; Mission 4 may be specialist care to help and rescue the elderly and infirm, from elderly care homes and hospitals.

It may be that the user must choose which mission(s) to PUSH, whether it be just one, or multiple. They may be given a limit to how many of the missions they can PUSH/disperse to. Preferably they are only given full LINK functionality and/or feature(s) once they have chosen which cause(s) to PUSH (thus there is shown a LINK OPTION 261', 262', 263', 264' for each Mission. The LINK and PUSH option may be provided in any order. The PUSH option signifies the option for the user to decide to PUSH that particular mission. The mission may also be defined as a cause in this case, because it is, in a sense, a sub-cause of the main BIG PUSH cause. The option to commit to PUSH the mission(s) is shown as PUSH option 261", 262", 263", 264". As stated, the user may be able to PUSH the cause before the LINK option is provided—all elements/features shown may be provided in any order. It is feasible, until a decision is made by the user (if a decision which mission(s) to PUSH is required) that the system may disperse dispersements from the user's spending in any way it sees fit. This may include sharing the dispersements amongst the missions/causes 261, 262, 263, 264. This may include dispersing dispersements to the cause(s) deemed most urgent. It is also possible the dispersements of the user are simply 'pooled' for a time (eg 48 hours). They may then be dispersed after that time. They may be dispersed once decision has been made by the user which mission/cause of the BIG PUSH to PUSH.

There is shown a possible voting step (step 270). As aforestated, the process may involve or include interaction from the user. The user may be able to link with cause(s)/mission(s) they have PUSH'd, or even cause(s)/mission(s) they have not. They may be able to vote on what mission(s) should be created, or on any information relating to the mission(s)/cause(s). Thus the user may play an interactive part as the (in this example) Disaster Relief (or any BIG PUSH experience) unfolds. User may be able to constantly or repeatedly, or often amend their dispersement patterns, in reaction to how the event unfolds. The or any voting 270 by a user(s) may take place at the beginning of the BIG PUSH (suggested by the large arrows from the voting step 270, which arrows suggest the order in which the process is carried out could be very different, with voting potentially even happening before creation of the mission(s) 261, 262, 263, 264. It is feasible user(s) can vote on what the mission(s) will be, or any aspect regarding the mission(s). It is feasible users may vote on how much dispersement gets apportioned to each mission, or how dispersement is spread. User may thus, rather than deciding to PUSH a single mission/cause, be involved in decisions making as to how dispersement is apportioned to any mission(s) and/or what the mission(s) are and include. Users may be able to vote on other aspects, such as what a target amount should be for a mission, Users may eb able to communicate with each other. Some or any of these feature(s) may only be possible for LINKers, who have LINK's to a mission/cause, which may give them greater access for interaction feature(s).

It is believed by this inventor that, particularly in Disaster Relief efforts such as examples herein mentioned, rather than the present situation, where people tend to watch 24 hour new stations to simply watch developments in these situation (and possibly donate, with little interaction or knowledge of how the donation/funding is being used), using this computer implemented method, users may be able to play an interactive part in helping with the disaster, and may be highly involved in the process. They may also be able to donate, but, given the nature of the disclosure in the present application, it will be obvious that it may be possible to generate vast amounts of money, without a user ever having to spend any money outside of their normal spending (ie simply by buying product(s) we are used to buying everyday, whether it be an item of clothing, a book, a mug or accessory, or even a dog collar, because if these products ae part of brands that use this computer implemented method, the dispersements, played out through a vast amount of people, may total more than is currently being generated via donation.

(Referring to another possibility relating to the BIG PUSH function, it is also feasible a brand could call a 'local' BIG PUSH, local to the brand. For example, Liverpool For Life™ may call a BIG PUSH to all users in and/or from Liverpool/Merseyside, if there is an event or problem that must be taken care of and is specific to Liverpool (and which needs a lot of funding). However, preferably, BIG PUSHes are only called by the platform, ie at a higher level than the brand level).

Relating to the regular (ie non 'BIG' PUSH) PUSH function, user's may be given a quota of PUSHES, so that they can only push a certain number of causes, eg within a certain time period, or eg only a certain amount of causes can be pushed at once. Quotas may, or may not, also be provided for cause(s)/mission(s) pushed during a BIG PUSH.

Figure 27:
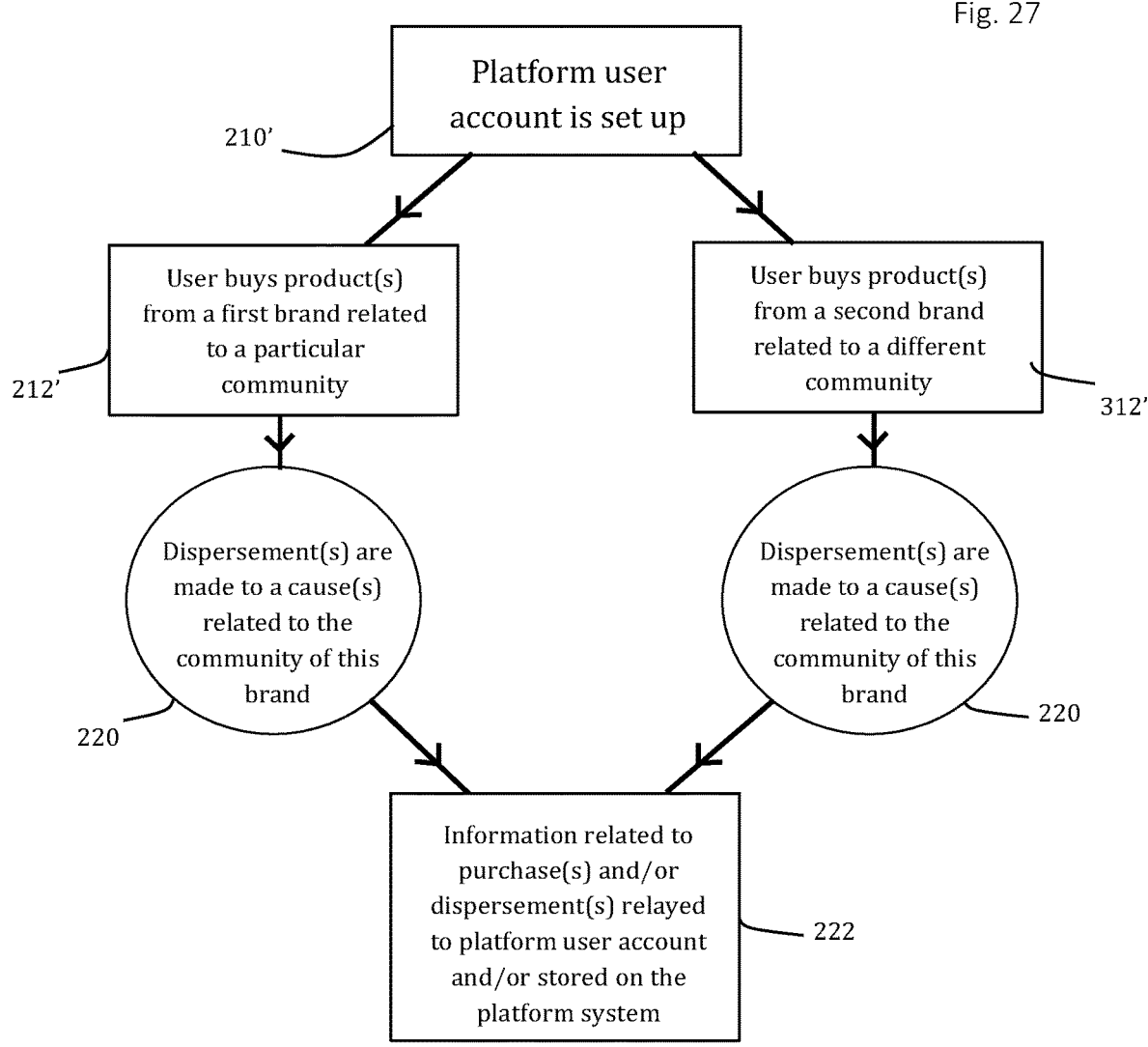
FIG. 27 is a flowchart showing an example of how a platform user account can be used by a user, and allow information regarding purchases and/or dispersements from multiple brands to be relayed to the platform user account.

Referring now to FIG. 27, there is shown an example of the platform, wherein a platform user account is set up 210'. In step 212', user buy product(s) that result in a dispersement (s) from a brand that supports and relates to a particular community (eg their geographical location/territory, such as a state or city). In step 312', user then buys product(s) that result in a dispersement(s) from a second brand that supports and relates to a different particular community (eg a product from a brand supporting and relating to the dog and animal world and dog and animal lovers). Preferably their platform user account 210' facilitates and/or is used in the process of and/or stores information relating to purchases made regarding, the buying at both of the brands. The user account is thus a 'mother account' for the user. (the user may also have 'child' user accounts at all or any of the separate brands within the platform, but preferably only one mother account is required. It is feasible user may have a mother account (platform account) and/or may have separate accounts ant any brand(s). Preferably only one mother account is required to facilitate purchasing the product(s) from the different brands, and/or to facilitate storing information related to purchase(s) and/or dispersement(s) with reference to the different brands) and/or to facilitate dispersement(s) to the cause(s).

In steps 220, having purchased a product(s) from each brand, dispersement(s) are made to causes specific to the community of that particular brand. In one preferred embodiment, 33.3% of profit generated from each purchase/ product sold is dispersed. In step 222, the example shown by way of example only, information relating to the purchase(s) at each brand is relayed to the platform user account, and/or stored on the platform system, which may include the information being stored in the platform user account of the user.

Referring generally, but also referring to an example as shown most particularly in FIG. 14, there may be provided a method for dispersing funding to a cause, comprising: providing a push-facilitating element to a cause; receiving a request from a user to push the cause; altering settings on an account of the user so that the cause is pushed by the user; wherein pushing a cause is defined as a financial amount being dispersed to a cause when an item is purchased by the user. The push-facilitating element may be a scan-able display element, scan-able by a smart device of the user to facilitate the push request by the user, the push request received from the user via the smart device. The push-facilitating element may be printable by the cause, so that it can be printed by the cause and displayed by the cause. The push-facilitating element may be provided to the cause as a code, which can be used by the cause to add a push button to a website.

The platform and/or system is not limited to 'community' related brands—other third party retail or sales companies may get involved. Eg standard retailers. They may use the system for selling and/or be licensed the system for selling (or any of its feature(s)) to make dispersement(s) to cause(s) and/or apportion cause(s) to product they have for sale, whether or not the cause(s) are related to a particular community. In so doing, they are now considered part of the platform, and may be given software to easily make their product sales result in dispersement (which software (or any created element(s) to facilitate the present system for selling) may be licensed to them). This may help and/or facilitate the platform recognize their buyers and/or products and/or any dispersement(s) made, and may facilitate the data appearing on (and/or being relayed to) the user's account. They are considered now to be within the scope of the platform (and/or to be using the platform (or acting as a seller as part of the platform); their buyers are considered to be users of the platform), but such a seller may not be a brand related specifically to a particular community, having causes related to a specific community. They may be able to create their own causes.

An example embodiment of what is referred to as the 'BIG PUSH' function will now be described, in use, in no way limiting a scope of the (or any) invention, and described by way of example only. The example may show many possible features of any invention that is claimed, not limited to invention(s) including the BIG PUSH function. The term BIG PUSH is used only to help understand the function, and is not a technical term.

Thus, as an example in use:

I am an inventor, based in Liverpool, UK, England. I set up a user account on the platform, and look forward to buying Liverpool 04 Life™ items (a brand, mostly of clothing, and some other items) t support my community. I start to buy Liverpool 04 Life™ items, and enjoy the fact dispersements are going to various Liverpool based or related causes.

One day I see a sign at the local library in town that they have a cause I can push, with the mission set as building a new roof-top semi open-plan audio menagerie, where music can be listened to, created, and specialised programs can be watched. I search for more information on my phone (or when back at home on my computer (or hold my phone close to a special code (such as a QR code) in the library, near or on the sign, and find some more information, which includes a CAD render of how the new wing of the library will look. It loos incredible, with expansive windows showing the sky, in a dome-like structure, with modern and impressive looking furniture and equipment. There may be a video showing and/or explaining this.

I see the mission target amount is £1.6 Million, and than £300,000 has already been raised. I decide to push the cause. In this example, I do it there are then by pressing a button on my smartphone, or swooshing by finger/thumb on a PUSH button displayed on the phone. I also LINK with the cause (possibly done immediately after pushing the cause, possible via the same means, eg a button/option on the phone), and I start to get updates over the following weeks and months about the cause. I hear that Liverpool-only citizens are being hired to build and design the new library wing, which, in conjunction with other jobs, has created 50 new jobs in Liverpool. I get video updates of all the new plans, and how things are going, also with videos from the workers showing the jobs they're going to try to do each day. The videos may be edited by editing professionals, again preferably hired from within the Liverpool community, thereby creating more jobs/opportunities. I find the videos more interesting than I thought, and it even teaches me some things are architecture and building.

I happily keep buying Liverpool 04 Life™ items, and notice, as time goes by, that the total of dispersements (ie amount of funding) I have made to the library cause/mission continues to rise, as part (or all) of my dispersements from buying Liverpool 04 Life™ items (like a nice hoodie top) goes to the library cause/mission. I am able to view this on my user account, by logging in, where I can see a breakdown of all my information and/or transactions and/or dispersements.

I also love dogs, and have a dog myself, so I start buying from Idog®, a new brand which disperses finding towards dog and animal related causes. I am a big fan of animals, so I buy regularly. I also push a cause 'locally' within this brand, which is to help save elephants in the wild by staffing a special reserve in Africa with anti-poaching staff. Whereas I push the library cause 'globally' throughout all my purchases, the elephant cause is only pushed on purchases within the idog brand, and only a portion of the dispersements goes to the elephant cause, with much of the dispersements going to set causes or causes choices I can make when I buy idog products. I often check my account after purchasing to see what the funding went towards, and often to follow (LINK) to them. One of he great features online is that I can log in to my account either globally, seeing all transactions, or I can switch modes, and just look at transactions related to my spending with Idog®. I may even have a separate user account just dedicated to Idog®. Preferably, though, I have just one account/login, and can then view various different information from different brands, especially information related to my spending.

Even though only a small portion of the dispersements goes to the elephant cause, idog is a large brand which sells many millions of dollars of products on many different territories. There are 33,568 people pushing the elephant cause, so even a small amount from each person makes a big difference.

I don't have children myself, but I have six nieces and nephews, and I often buy them clothing and other products/items. So I often buy things from Ishine® baby, which is another one of these community related brands, this time dispersing to causes related to the 'virtual' community of kids health and wellbeing. That said, I've heard the new system they have running means that all purchases from Ishine® baby goes specifically to Liverpool based causes for kids health and wellbeing (or that I have the option to specify that in my account (eg via account settings). I've started to PUSH a cause locally within that brand as well, which is a specialist eye unit for kids and babies in Liverpool. They need a special piece of equipment which costs around 232,000 as will help them diagnose and treat certain eye conditions for kids. So I've decided to PUSH that cause as well. For now, I've not LINKed to it, although I may do in the future.

The system (in this example embodiment) tells me I've reached my total of pushing three causes, and I'm not allowed to push any more, although I've heard there's a way to 'unlock' a fourth push case (so that I can push an extra cause), or maybe even unlock more.

I'm enjoying my day when suddenly, I get an alert on my phone (I notice later I've been sent an email too with a link to a video inside my user account, or on a webpage). The alert I get on my phone says: "ALERT: BIG PUSH INITIATED. HURRICANE KATRINA HAS HIT THE US WITH DEVASTATING CONSEQUENCES. THOUSANDS OF HOMES DESTROYED, NEW ORLEANS FLODDING AND MAY GO UNDER. WATCH VIDEO"

I choose the option to watch the video, and reach a screen, for example, much like that shown in FIG. 28, with a video including a person explaining what's going on, and footage. They mention that my account has been defaulted to PUSH the Hurricane Katrina cause, either partially, or fully (so that absolutely every dispersement goes to the Hurricane Katrina BIG PUSH). (Alternatively, I may have to take an action to give my consent). I notice the small-print on the webpage says I can de-activate the default BIG PUSH option so that, in future, I get the chance to decide whether to push it, rather than my account settings being altered to push it without my consent.

I hear in the video that they (which may be the platform, or any party related to the platform and/or a brand of the platform) have agents on the ground who have already isolated 4 key missions, which are 1) buying and handing outer water and food to people gathered in a sports stadium in New Orleans, who have escaped the floods caused by the storm, and are now homeless, and without electricity; 2) buying and/or handing out sleeping bags to those people; 3) Helicopter aid to look out for survivors and help people escape from their houses, some of whom are trapped on their roofs; and 4) Specialist aid for elderly care homes and hospitals, who are getting flooded, and have people who cannot walk out and escape on their own (eg elderly that are unable to walk).

It is mentioned I can LINK with all causes, but can only PUSH one at a time. I have to make a decision. It is difficult, but I decide to PUSH the water bottle and food cause first. I then LINK with that cause and start to get updates. My TV, when I watch at home, is now altered (because, in this example, I signed in to my user account, or pressed an option eg button on the remote control) so that I now get updates biased or specific to the water bottle and food cause. I'm also receiving updates on my phone. It is like being 'in' the News—rather than watching The News on TV, as a third party, it is as if I am now 'part' of The News, and I start top see the figures and numbers add up due to the dispersements. $23 Million dispersed in the first hour.

Although I may be able to adjust my settings to stop being part of the BIG PUSH, I want to help, so I keep things as they are. Now, even when I buy items from Idog® and Liverpool 04 Life®, a portion or a whole of my dispersements can go towards the BIG PUSH cause (or related missions). But just one thing troubles me—the cause for the new piece of eye equipment for kids that I was pushing locally on the Ishine® baby brand was close to completing its mission. It had received 215, 000 out of its 232,000 target, and I don't want to stop funding that cause. So I go into my account, and immunize these particular dispersements, which I can do with a button (in this example) which allows me to make those dispersements immune to my more global BIG PUSH setting. I heard someone down the road (who many people are not particularly fond of) said that he didn't want to help American people. He's in the minority, but he adjusted his settings so that he's not pushing the Hurricane Katrina cause, and he even adjusted his account settings so the system does add him to the BIG PUSH by default, and instead he has to take an action to agree/join.

Because I've joined the LINKers (or even if I haven't) for a particular cause/mission, as the situation clears, (or at any point) I get invited to vote on what will be done next to help and clear up the situation in New Orleans, and to stop tis happening in the future. Experts produce information and/or videos to explain, and it is voted (out of several options) that a new flood wall and defense system needs to be built. It is also voted that major repairs to several neighbourhoods will be done, totally hundreds of millions of dollars. As the worst clears, the BIG PUSH (which in this example was global around the world, or much of the world) is downgraded to a 'national' BIG PUSH. Users of the system in the United States go on pushing the cause for some time, including missions to repair many of the shattered neighbourhoods where thousands of houses need to be rebuilt. After a year, all the reparations have been done, and everything has been rebuilt and the defences sured up.

As the situation unfolds in New Orleans, many hundreds of millions (or billions) of dollars are raised from the BIG PUSH, because the platform has millions (possibly even billions) of users.

Without this system, some of those neighbourhoods may never have been rebuilt, because people had no means to help, and the neighbourhoods may just have been left as they were, forgotten.

Thus an example is described, in use, by way of example only.

Not all steps need be carried out by a computer/machine. However, it will be obvious that an extremely advanced computer system may be required for various feature(s) as disclosed in the present application.

Percentages of profit dispersed (or any dispersement amount) may be alterable locally (to any product) and globally (across many or all products). Percentages of profit dispersed (or any dispersement amount) may be alterable locally (to any brand), and globally (across many or all brands). staff may be hired by a or each brand wherein the staff are citizens of the community if the community is a geographical community. Percentage profit amount to be dispersed may be alterable globally, for a whole brand. Percentage profit amount to be dispersed may be alterable globally, thus altering profit amount to be dispersed across multiple brands of the platform, or for the whole platform. System and/or platform may provide a brand specific account or viewability for the user. (User may be able to see their spending and dispersements, specific to a particular brand, or all together). System and/or platform may send information related to purchases and/or dispersements, across all the brands, to the platform user account of the user. (It may store this information and/or provide for viewing by the user). 19. A command may be received by the system to alter the amount pushed on a global level, wherein the command alters dispersement amounts that are pushed for multiple products, with a single command, the platform and/or system preferably executing the command.

The method may comprise hiring citizens from within the geographical community to staff the method, thus creating jobs in the geographical community. For example, all or most of staff of the method may be citizens of the geographical community of the brand in such an embodiment.

Once target amount of a mission has been dispersed, funding/dispersement may be released. This is just one possible scenario with reference to how or when funding is released.

The embodiments described above are provided by way of example only, and various other modifications will be apparent to persons skilled in the art without departing from the scope of the invention as described in the appended claims.

The appended claims define limited inventions. However, it should be recognized and understood that the disclosure of the present application includes a vast array of inventions, not limited to inventions set out in the appended claims and/or any statement(s) of invention.

For example, if the present disclosure of the present application (inclusive of drawing(s) and/or description) discloses features a to z, it should be recognized and understood that any invention may be claimed, comprising any feature(s) out of features a to z. Thus if the appended claim 1 defines the invention claimed as comprising essential features a, b, and c, it should be understood that an invention may be claimed comprising solely feature a, or solely feature b, or solely feature c, or any combination of features a, b, and c. Furthermore, it should be understood that an invention may be claimed comprising any of feature(s) d to z, whether or not also comprising any of features a, b, or c.

I reserve the right to claim any invention, comprising any feature, or combination of features, disclosed in the present application (inclusive of drawing(s) and/or description). This statement (and/or final appended claim), if so desired, should be seen as a statement of invention, stating any invention, comprising any feature(s) disclosed in the present application. It is intended (or plausible) that such invention (s) may be claimed in a future application(s) which claims benefit of priority of the present application. The present disclosure of the present application supports such invention (s)/claim(s).

The invention claimed is:

1. A method of funding, comprising:
   a product being sold to a user, wherein funding is incurred as a result of the product being sold to the user, wherein there is a first level of funding, and a second level of funding, wherein:
   for the first level of funding, funding is disbursed to at least one cause not chosen by the user; and
   for the second level of funding, funding is disbursed to at least one cause selectable by the user, as a cause for second level funding, at a time prior to, and a location other than, where and when the product is sold to the user;
   wherein the second level of funding partially or wholly overrides the first level of funding, a portion or a whole of the first level of funding being directed to the second level of funding, instead of the first level of funding;
   wherein the method of funding further comprises:
   at a time prior to, and a location other than, where and when the product is sold to the user, a proximity alert being provided by a portable computer device of the user, to alert the user that they are in proximity to a cause that can be selected, for second level funding;
   the cause the user has been alerted to, via the proximity alert, being selected by the user, as a cause for second level funding, via the portable computer device;
   the product being sold to the user;
   funding being disbursed to the cause the user was alerted to, via the proximity alert, as a result of the second level of funding partially or wholly overriding the first level of funding.

2. A method of funding, comprising:
   a product being sold to a user, wherein funding is incurred as a result of the product being sold to the user, wherein there is a first level of funding, and a second level of funding, wherein:
   for the first level of funding, funding is disbursed to at least one cause not chosen by the user; and for the second level of funding, funding is disbursed to at least one cause selectable by the user, as a cause for second level funding, at a time prior to, and a location other than, where and when the product is sold to the user;

wherein the second level of funding partially or wholly overrides the first level of funding, a portion or a whole of the first level of funding being directed to the second level of funding, instead of the first level of funding;

the method further comprising:

at a time prior to, and a location other than, where and when the product is sold to the user, the user selecting a cause as a cause for second level funding, via a scannable element being scanned, the scannable element being scannable by a portable computer device of the user, to facilitate selecting the cause as a cause for second level funding, the method thus comprising the scannable element being scanned by the portable computer device of the user;

the product being sold to the user;

funding being disbursed to the cause selected by the user, via the scannable element being scanned, as a result of the second level of funding partially or wholly overriding the first level of funding.

3. A method of funding, comprising:

providing a user account to a user;

a future purchase being made by the user, wherein funding is incurred as a result of the future purchase being made by the user, wherein there is a first level of funding, and a second level of funding, wherein:

for the first level of funding, funding is disbursed to at least one cause not chosen by the user; and for the second level of funding, funding is disbursed to at least one cause selectable by the user, at a time prior to, and a location other than, where and when the future purchase is made;

wherein the second level of funding partially or wholly overrides the first level of funding, a portion or a whole of the first level of funding being directed to the second level of funding, instead of the first level of funding;

at a time prior to, and a location other than, where and when the future purchase is made by the user, a proximity alert being provided by a portable computer device of the user, to alert the user that they are in proximity to a cause that can be selected, for second level funding;

the cause the user has been alerted to, via the proximity alert, being selected by the user, as a cause for second level funding, via the portable computer device;

settings of the user account of the user being altered, to reflect that the cause the user was alerted to has been selected by the user, as a cause for second level funding;

the future purchase being made by the user;

funding being disbursed to the cause the user was alerted to, via the proximity alert, as a result of the second level of funding partially or wholly overriding the first level of funding.

4. A method of funding as claimed in claim 3, wherein, for the first level of funding, there are a plurality of causes not chosen by the user, and there is provided a cause choice for the user, to choose at least one cause out of the plurality of causes, for funding.

5. A method of funding as claimed in claim 3, wherein the second level of funding partially overrides the first level of funding, a portion of the funding incurred as a result of the product being sold to the user being disbursed to the first level of funding.

6. A method of funding as claimed in claim 3, wherein the portable computer device is a smartphone.

7. A method of funding, comprising:

providing a user account to a user;

a future purchase being made by the user, wherein funding is incurred as a result of the future purchase being made by the user, wherein there is a first level of funding, and a second level of funding, wherein:

for the first level of funding, funding is disbursed to at least one cause not chosen by the user; and for the second level of funding, funding is disbursed to at least one cause selectable by the user, at a time prior to, and a location other than, where and when the future purchase is made;

wherein the second level of funding partially or wholly overrides the first level of funding, a portion or a whole of the first level of funding being directed to the second level of funding, instead of the first level of funding;

at a time prior to, and a location other than, where and when the future purchase is made by the user, the user selecting a cause as a cause for second level funding, via a scannable element being scanned, the scannable element being scannable by a portable computer device of the user, to facilitate selecting the cause as a cause for second level funding, the method thus comprising the scannable element being scanned by the portable computer device of the user;

settings of the user account of the user being altered, to reflect that the cause selected by the user, as a cause for second level funding, via the scannable element being scanned, has been selected by the user, as a cause for second level funding;

the future purchase being made by the user;

funding being disbursed to the cause selected by the user, via the scannable element being scanned, as a result of the second level of funding partially or wholly overriding the first level of funding.

8. A method of funding as claimed in claim 7, wherein, for the first level of funding, there are a plurality of causes not chosen by the user, and there is provided a cause choice for the user, to choose at least one cause out of the plurality of causes, for funding.

9. A method of funding as claimed in claim 7, wherein the scannable element being scanned itself initiates selection of the cause, as a cause for second level funding.

10. A method of funding as claimed in claim 7, wherein, as a result of the scannable element being scanned by the portable computer device, there is provided on a screen of the portable computer device a touchscreen element, to select the cause as a cause for second level funding, via using the touchscreen element.

11. A method of funding as claimed in claim 10, wherein the touchscreen element is a swipe-able touchscreen element, to select the cause as a cause for second level funding, via swiping the swipe-able touchscreen element.

12. A method of funding as claimed in claim 7, wherein the scannable element is provided to the cause, by computer, as a non-physical printable element, that is then printed, and displayed, for users to scan.

13. A method of funding as claimed in claim 7, wherein the second level of funding partially overrides the first level of funding, a portion of the funding incurred as a result of the product being sold to the user being disbursed to the first level of funding.

14. A method of funding as claimed in claim 7, wherein the portable computer device is a smartphone.

15. A method of funding as claimed in claim 1, wherein, for the first level of funding, there are a plurality of causes not chosen by the user, and there is provided a cause choice for the user, to choose at least one cause out of the plurality of causes, for funding.

16. A method of funding as claimed in claim 1, wherein the second level of funding partially overrides the first level of funding, a portion of the funding incurred as a result of the product being sold to the user being disbursed to the first level of funding.

17. A method of funding as claimed in claim 1, wherein the portable computer device is a smartphone.

18. A method of funding as claimed in claim 2, wherein, for the first level of funding, there are a plurality of causes not chosen by the user, and there is provided a cause choice for the user, to choose at least one cause out of the plurality of causes, for funding.

19. A method of funding as claimed in claim 2, wherein the scannable element being scanned itself initiates selection of the cause, as a cause for second level funding.

20. A method of funding as claimed in claim 2, wherein, as a result of the scannable element being scanned by the portable computer device, there is provided on a screen of the portable computer device a touchscreen element, to select the cause as a cause for second level funding, via using the touchscreen element.

21. A method of funding as claimed in claim 20, wherein the touchscreen element is a swipe-able touchscreen element, to select the cause as a cause for second level funding, via swiping the swipe-able touchscreen element.

22. A method of funding as claimed in claim 2, wherein the scannable element is provided to the cause, by computer, as a non-physical printable element, that is then printed, and displayed, for users to scan.

23. A method of funding as claimed in claim 2, wherein the second level of funding partially overrides the first level of funding, a portion of the funding incurred as a result of the product being sold to the user being disbursed to the first level of funding.

24. A method of funding as claimed in claim 2, wherein the portable computer device is a smartphone.

* * * * *